US011507337B2

(12) United States Patent
Guralnick

(10) Patent No.: US 11,507,337 B2
(45) Date of Patent: *Nov. 22, 2022

(54) WORKOUT MUSIC PLAYBACK MACHINE

(71) Applicant: Brian Howard Guralnick, Lachine (CA)

(72) Inventor: Brian Howard Guralnick, Lachine (CA)

(*) Notice: Subject to any disclaimer, the term of this patent is extended or adjusted under 35 U.S.C. 154(b) by 789 days.

This patent is subject to a terminal disclaimer.

(21) Appl. No.: 16/441,747

(22) Filed: Jun. 14, 2019

(65) Prior Publication Data

US 2019/0374842 A1   Dec. 12, 2019

Related U.S. Application Data

(63) Continuation of application No. PCT/CA2017/051551, filed on Dec. 20, 2017.

(51) Int. Cl.
*G06F 3/04847* (2022.01)
*G06F 3/0482* (2013.01)
(Continued)

(52) U.S. Cl.
CPC .......... *G06F 3/165* (2013.01); *A63B 71/0622* (2013.01); *G06F 3/0482* (2013.01);
(Continued)

(58) Field of Classification Search
CPC .... G06F 3/165; G06F 3/0482; G06F 3/04847; A63B 71/0622; A63B 2017/063;
(Continued)

(56) References Cited

U.S. PATENT DOCUMENTS 5,137,501 A    8/1992  Mertesdorf
5,215,468 A    6/1993  Lauffer et al.
(Continued)

OTHER PUBLICATIONS

PCT/CA2017/051551 International Search Report dated Mar. 28, 2018.
(Continued)

*Primary Examiner* — Jay Trent Liddle
*Assistant Examiner* — Alyssa N Brandley
(74) *Attorney, Agent, or Firm* — Anglehart et al.

(57) ABSTRACT

A workout music playback device for playing workout music during a workout with given workout parameters by arranging and assembling song segments of original musical recordings in accordance with workout parameters. The device has a media output manager configured to receive the workout parameters and prepare audio output information by arranging a sequence of song segments into an edited song recording. It has an instruction relay module configured to receive the audio output information, and transmit the workout audio output instructions. The device has a media output generator configured to receive the audio output instructions from the instruction relay module, retrieve and assemble the song recording data of the original musical recording from the memory in accordance with the audio output instructions, and transmit a data stream of workout music corresponding to the workout parameters.

19 Claims, 18 Drawing Sheets

(51) Int. Cl.
*G06F 3/16* (2006.01)
*A63B 71/06* (2006.01)

(52) U.S. Cl.
CPC .... *G06F 3/04847* (2013.01); *A63B 2071/063* (2013.01); *A63B 2220/12* (2013.01); *A63B 2220/14* (2013.01); *A63B 2220/40* (2013.01); *A63B 2220/62* (2013.01); *A63B 2225/50* (2013.01)

(58) Field of Classification Search
CPC ............ A63B 2220/12; A63B 2220/14; A63B 2220/40; A63B 2220/62
USPC ........................................................ 434/247
See application file for complete search history.

(56) References Cited

U.S. PATENT DOCUMENTS

| | | | |
|---|---|---|---|
| 5,315,057 A | 5/1994 | Land et al. | |
| 6,175,072 B1 | 1/2001 | Aoki | |
| 6,232,540 B1 | 5/2001 | Kondo | |
| 6,344,607 B2 | 2/2002 | Cliff | |
| 6,518,492 B2 | 2/2003 | Herberger et al. | |
| 6,746,247 B2 | 6/2004 | Barton | |
| 6,756,533 B2 | 6/2004 | Aoki | |
| 6,835,885 B1 | 12/2004 | Kondo et al. | |
| RE40,543 E | 10/2008 | Aoki et al. | |
| 7,518,054 B2 | 4/2009 | Mckinney et al. | |
| 7,541,534 B2 | 6/2009 | Schnepel et al. | |
| 7,741,554 B2 | 6/2010 | Sasaki et al. | |
| 7,855,334 B2 | 12/2010 | Yamashita et al. | |
| 7,872,188 B2 | 1/2011 | Willis | |
| 7,973,231 B2 | 7/2011 | Bowen | |
| 8,026,436 B2 | 9/2011 | Hufford | |
| 8,134,062 B2 | 3/2012 | Kim et al. | |
| 8,376,911 B2 | 2/2013 | Ogg et al. | |
| 8,493,822 B2 | 7/2013 | Lee et al. | |
| 8,704,069 B2 | 4/2014 | Naik et al. | |
| 9,079,059 B2 | 7/2015 | Cardoso et al. | |
| 9,098,614 B1 * | 8/2015 | Tuthill | G16H 20/30 |
| 9,230,528 B2 | 1/2016 | Kellett et al. | |
| 9,364,713 B2 | 6/2016 | Alsalem | |
| 2006/0107822 A1 * | 5/2006 | Bowen | G06F 3/015 |
| 2006/0111621 A1 | 5/2006 | Coppi et al. | |
| 2006/0169125 A1 | 8/2006 | Ashkenazi et al. | |
| 2006/0253210 A1 | 11/2006 | Rosenberg | |
| 2007/0060446 A1 | 3/2007 | Asukai et al. | |
| 2007/0074617 A1 | 4/2007 | Vergo | |
| 2007/0074618 A1 | 4/2007 | Vergo | |
| 2007/0074619 A1 | 4/2007 | Vergo | |
| 2007/0079691 A1 | 4/2007 | Turner | |
| 2007/0113726 A1 | 5/2007 | Oliver et al. | |
| 2007/0169614 A1 | 7/2007 | Sasaki et al. | |
| 2007/0221045 A1 | 9/2007 | Terauchi et al. | |
| 2008/0097633 A1 | 4/2008 | Jochelson et al. | |
| 2008/0103622 A1 | 5/2008 | Dvorak et al. | |
| 2008/0201639 A1 | 8/2008 | Shoman | |
| 2009/0044687 A1 | 2/2009 | Sorber | |
| 2010/0248199 A1 | 9/2010 | Abiri | |
| 2013/0228063 A1 | 9/2013 | Turner | |
| 2013/0312589 A1 | 11/2013 | MacPherson | |
| 2014/0000440 A1 | 1/2014 | Georges | |
| 2014/0018947 A1 | 1/2014 | Ales | |
| 2014/0135173 A1 | 5/2014 | Watterson | |
| 2014/0141396 A1 | 5/2014 | Spratt | |
| 2015/0081055 A1 | 3/2015 | Erkkila et al. | |
| 2016/0342199 A1 | 11/2016 | Smith et al. | |
| 2016/0346604 A1 * | 12/2016 | Lindstrom | A61B 5/1118 |

OTHER PUBLICATIONS

PCT/CA2017/051551 Search Strategy dated Mar. 28, 2018.
PCT/CA2017/051551 Written Opinion of the International Searching Authority dated Mar. 28, 2018.
U.S. Appl. No. 15/388,818 Office Action dated Apr. 11, 2017.

* cited by examiner

FIG. 7A. Workout Style -- HIGH -- Except for the Outro, the song is high burn. There are no volume effects.

FIG. 7B. Workout Style -- Aerobic -- The burn type and sound volume will cycle between 3 levels for the intro, verse, chorus, solo, and outro or coda sections of the song, with additional volume steps for the final verse and chorus.

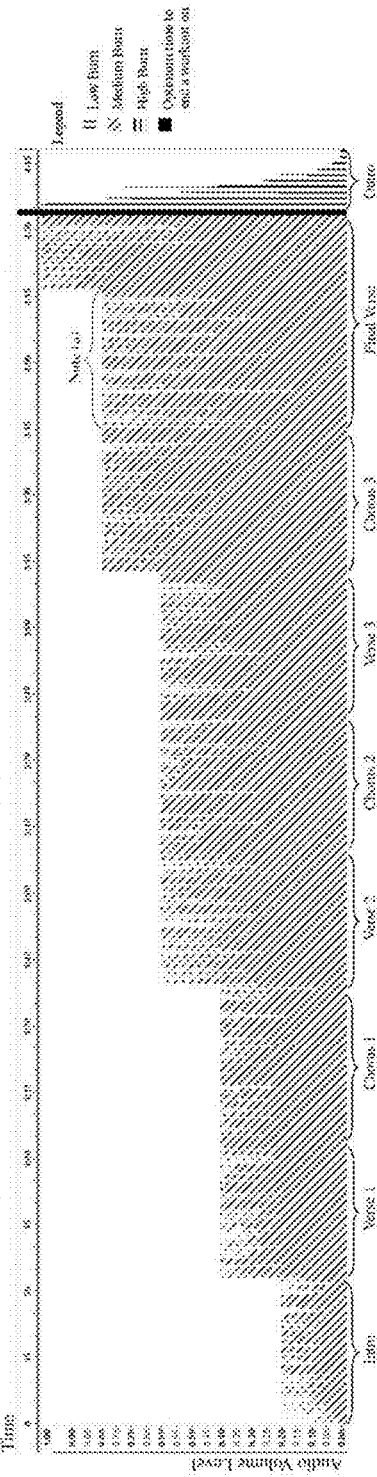

FIG. 8A Workout Style – Workout-Lv0 – Except for the Outro, this song's burn level is medium. The volume effect begins low, increasing in time with each verse and chorus, up to 100% at the end of the song.

*Figure 8A*

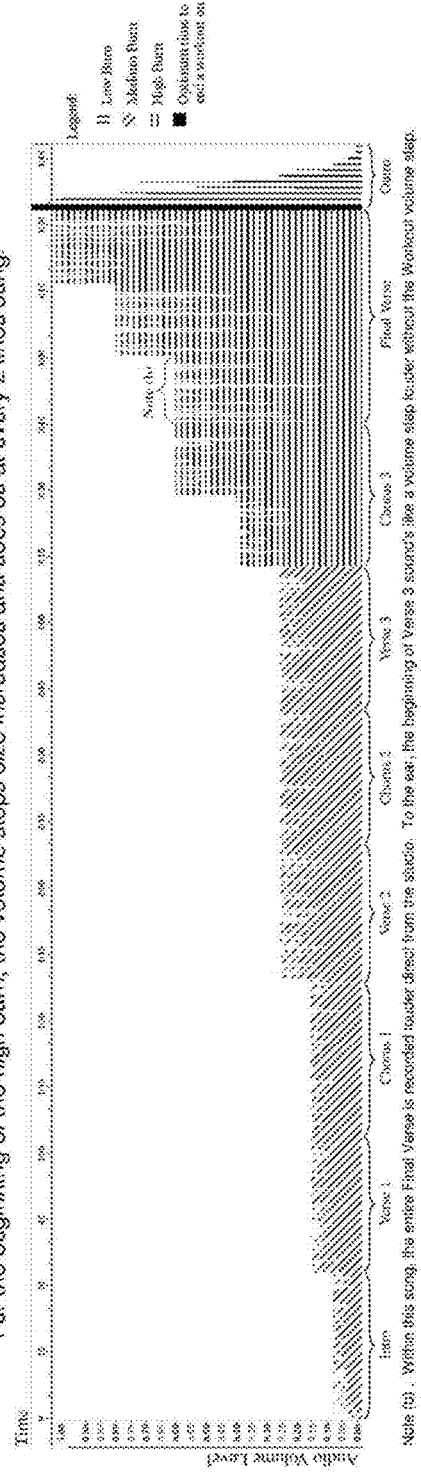

FIG. 8B Workout Style – Workout-Lv1 – The song begins with a burn level of medium. The last chorus and verse is at a high burn level. The volume effect starts very low, stepping up to only 25% just before the last verse and chorus. For the beginning of the high burn, the volume steps size increases and does so at every 2 lines sung.

*Figure 8B*

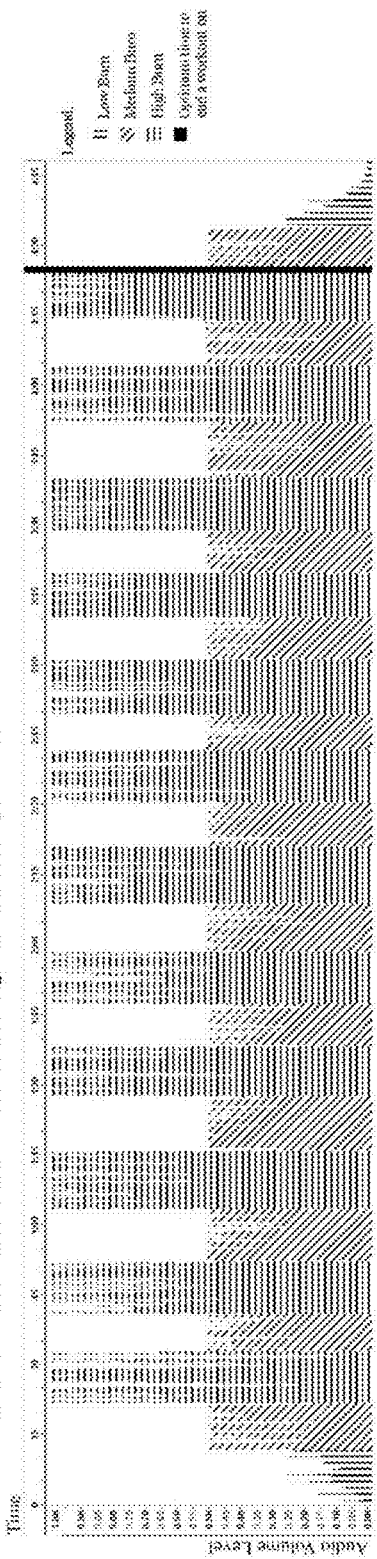

FIG. 9A Workout Style -- HIIT-10s -- The song begins and ends with a low burn. Waiting for vocals to begin or end, or for the right beat, there is an approximate 10 second high to 10 second low burn period pattern. The volume effect's level follows the high to low burn periods.

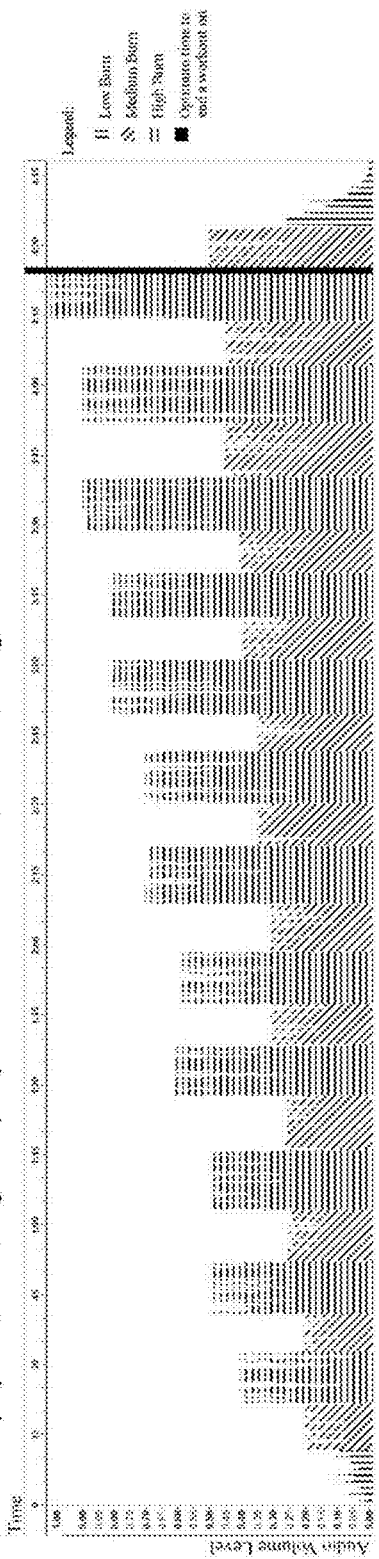

FIG. 9B Workout Style -- HIIT-10s+ -- Similar to FIG. 9A except the volume effects ease-in at the beginning of playback, increasing in steps up to 100% for the final burn at the song's finale.

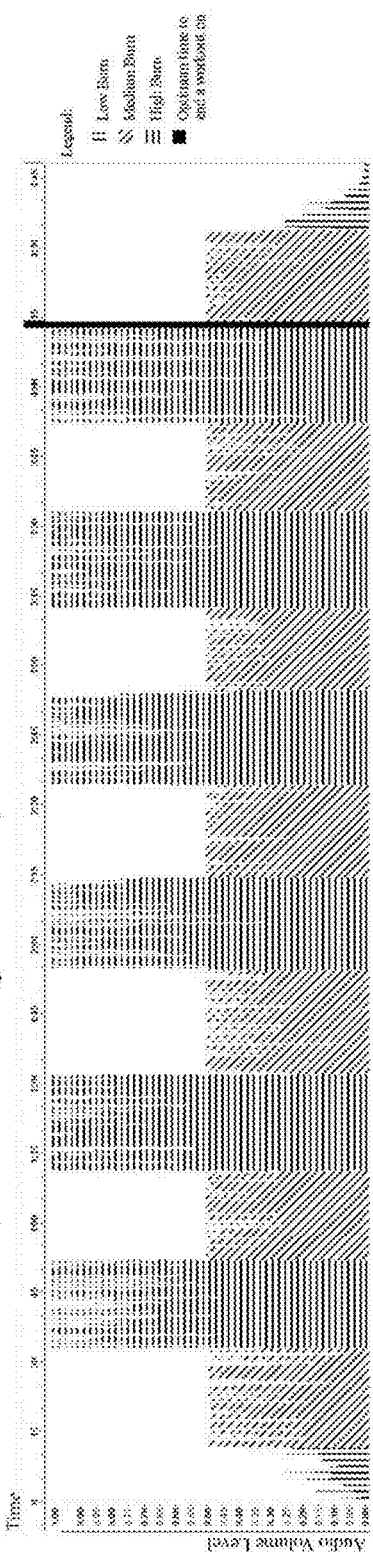

FIG. 10A Workout Style – HIIT-20s – The song begins and ends with a low burn. Waiting for vocals to begin or end, or for the right beat, there is an approximate 20 second high to 20 second low burn period pattern. The volume effect's level follows the high to low burn periods.

*Figure 10 A*

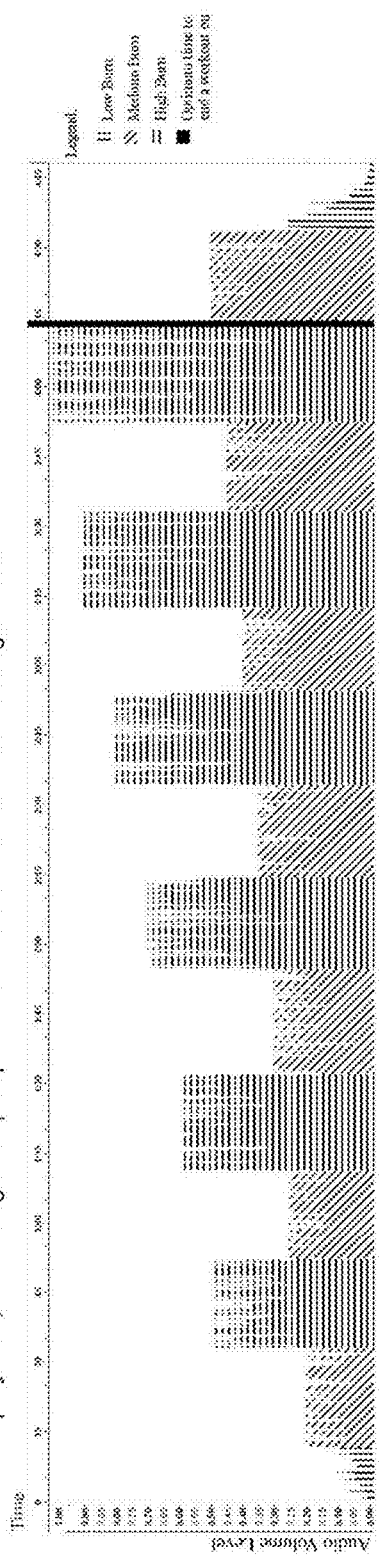

FIG. 10B Workout Style – HIIT-20s+ – Similar to FIG. 10A except the volume effects ease-in at the beginning of playback, increasing in steps up to 100% for the final burn at the song's finale.

*Figure 10 B*

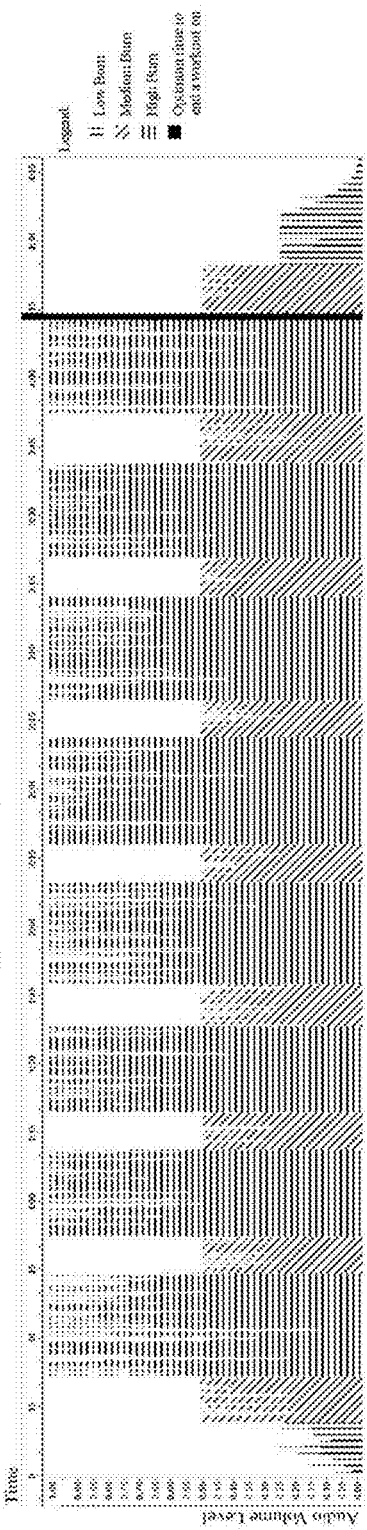

FIG. 11A Workout Style – HIIT-20/10s – The song begins and ends with a low burn. Waiting for vocals to begin or end, or for the right beat, there is an approximate 20 second high to 10 second low burn period pattern. The volume effect's level follows the high to low burn periods.

*Figure 11A*

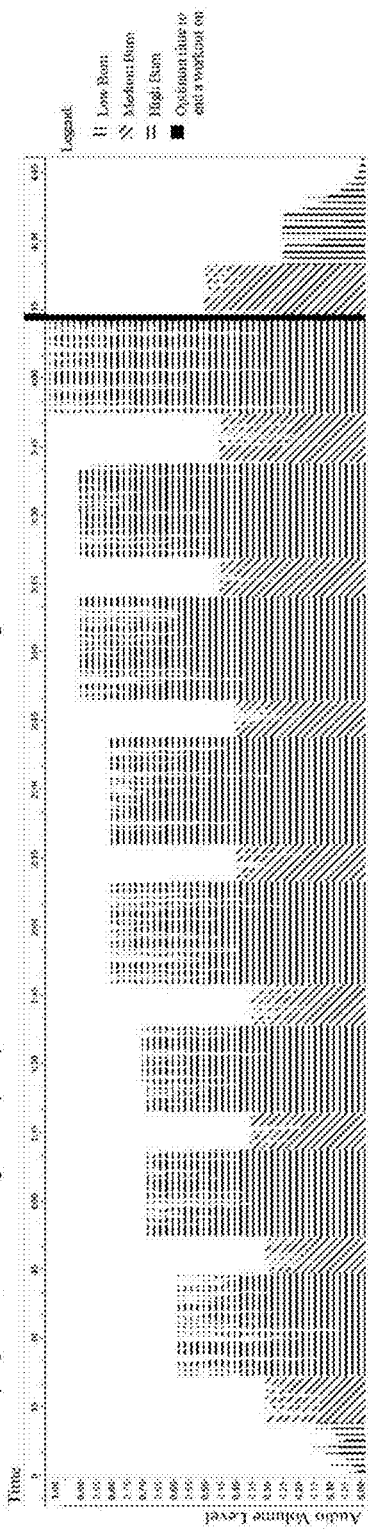

FIG. 11B Workout Style – HIIT-20/10s+ – Similar to FIG. 11A except the volume effects ease-in at the beginning of playback, increasing in steps up to 100% for the final burn at the song's finale.

*Figure 11B*

WORKOUT MUSIC PLAYBACK MACHINE

The present application is a continuation of International PCT Application No. PCT/CA2017/051551 filed on Dec. 20, 2017 designating the United States, which is a continuation in part of U.S. patent application Ser. No. 15/388,818 filed on Dec. 22, 2016, that is incorporated by reference herein.

TECHNICAL FIELD

The present patent application relates to the field of music players and/or music streaming systems.

BACKGROUND

Playing music while doing an exercise or workout routine, such as jogging, cycling, skating, weight training and orbital trainers is common and can be very motivational.

When selecting music for exercise in a music player known in the art, the beginning of many songs may have long, low volume, slower beat introduction portions or tempo which are not as suitable for exercising. The end portion of many songs also have slow fading out volume with a two second gap of silence. The change of tempo between songs may also be counterproductive to the progress of a workout routine. These disruptions between each new song in the playback creates an undesirable detrimental effect on the flow of the workout. Additionally, due to the differences in recording techniques, each song usually has a different level of audio volume, bass, and treble. While exercising, having first listened to a song playing clear sharp and loud, if the next song plays low volume and muffled, the beneficial effect of that song's playback is diminished.

Some music players allow the user to manually set the start and stop positions of a song's playback, but, have no means of distributing and sharing the start and stop position settings for public use in an exercise environment. These players do not have the ability to deal with sophisticated loop sequences, or, handle multiple sets of settings for each song creating multiple alternate length playback times. Most users do not have the time or set of skills to do this themselves for every song in their workout.

There is a need for a system to improve the enjoyment and beneficial effect of listening to music while exercising.

SUMMARY

Applicant has discovered that the ability of music to motivate a user doing fitness training is improved when the choice of music recording titles is made by the user (either a direct choice of titles, or indirectly by a choice of genre), and the music has a duration and musical intensity level that correspond to a workout regime that involves variable exercise activities or burn levels. For a given workout regime, it may be possible to play selected original musical recordings together in a way that matches the workout regime, however, the possible selection of original musical recordings that will have the desirable characteristics of length and intensity is far too limited (if available at all).

Applicant has discovered that the duration of a musical recording in a stream of workout music may be lengthened or shortened without altering the tempo, the beats per minute, of the musical recording. The musical recording may be shortened or lengthened by selecting from a predefined set of song sequences, where each of these song sequences are composed of segments of an original musical recording with arranged, repeated or deleted portions of the given musical recording for providing lengthened or shortened sequences of the musical recording in the stream of workout music. This provides a shorter or longer version of the musical recording that would be abbreviated or would involve repetition of song segments, however, the sound of the musical recording title remains the same. The importance of length adjustment is to allow a given song to match a segment or phase of a workout regime.

A first broad aspect is a workout music playback device for playing workout music during a workout from song recording data. The workout music playback device has a user input interface configured to receive input from a user, and permitting the definition of a workout style corresponding to a variation in exercise intensity over the course of a workout duration, and of a selection of song titles. The workout music playback device also has a media output manager configured to receive the user input, and to output to an instruction relay module an exercise burn rate pattern defining a variation over time of equalization parameters corresponding to an exercise intensity variation including periods of lower intensity exercise and periods of higher intensity exercise to be performed over the course of a workout duration. The workout music playback device has also an instruction relay module configured to receive the exercise burn rate pattern from the media output manager and generate audio output instructions in accordance with the exercise burn rate pattern. The workout music playback device also includes a media output generator configured to receive the audio output instructions and the song recording data, and output an audio signal of the workout music from the song recording data while adjusting the equalization parameters of the audio signal of the workout music as a function of the audio output instructions over the course of the workout duration.

In some embodiments, the media output manager is further configured to derive the exercise burn rate pattern according to the workout style from song edit data containing exercise burn rate pattern information specific to the workout style and to a song title of the selection of song titles, or a generic exercise burn rate pattern specific to the workout style, the generic exercise burn rate pattern being adjusted by the media output manager in accordance with song edit data, the song edit data containing song segmentation information for a song title of the selection of song titles, to produce the exercise burn rate pattern based on the song segmentation information.

In some embodiments, the workout music playback device may have memory configured to store the song recording data and the song edit data. The workout music playback device may have a wireless interface. The media output generator may also be further configured to receive wirelessly the song recording data via the wireless interface. The media output manager may also be configured to receive wirelessly the song edit data via the wireless interface. The user input interface may be further configured to define a workout style for each song title in the selection of song titles. The user input interface may be further configured to receive user input on the workout style and the selection of song titles. In some embodiments, the workout music playback device may further comprise an exercise machine interface configured to connect with an exercise machine, receive the audio signal, and transmit the audio signal to the exercise machine. The exercise machine interface may be further configured to receive information on the exercise burn rate pattern from the media output manager and transmit the information on the exercise burn rate pattern to the exercise machine, wherein the information on the exercise burn rate pattern is adapted to be processed by the exercise machine for adjusting certain difficulty parameters of the exercise machine in accordance with the exercise burn rate pattern. The exercise machine interface may be further configured to receive user input from the user and transmit the user input received from the exercise machine to the media output manager.

In some embodiments, the song edit data may be generated by the media output manager.

In some embodiments, the adjusting the equalization parameters may include adjusting an amplitude differently in different frequency ranges, or adjusting the amplitude the same for all audio frequencies.

A second broad aspect is a workout music playback device for playing workout music during a workout with given workout parameters, the workout music composed from song recording data of original musical recordings stored in memory. The workout music is generated in accordance with song edit data stored in the memory, the song edit data providing information on arranging song segments into at least one edited song recording of an original musical recording of the original musical recordings. The song duration of an edited song recording of the at least one edited song recording is different from an original song duration of the original musical recording. The workout music playback device has a media output manager configured to receive the workout parameters, retrieve the song edit data stored in the memory in accordance with the workout parameters, and prepare audio output information on arranging a sequence of song segments into an edited song recording in accordance with the workout parameters and/or the retrieved song edit data. The workout music playback device also has an instruction relay module configured to receive the audio output information, and transmit, during the workout, audio output instructions in accordance with the audio output information. The workout music playback device also has a media output generator configured to receive the audio output instructions from the instruction relay module, retrieve the song recording data of the original musical recording from the memory in accordance with the audio output instructions, and transmit a data stream of workout music corresponding to the workout parameters.

In some embodiments, the workout music playback device may have a user input interface configured to receive user input on the workout and a selection of workout music. The workout parameters may be generated as a function of said user input. The workout music playback device may also have an audio output interface configured to receive the data stream of workout music from the audio output generator, and play the workout music corresponding to the data stream of workout music.

In some embodiments, the media output manager is further configured to prepare audio output information including shortening information on shortening the song duration of the edited song recording in allowable shortening portions of the edited song recording to match a desired song duration of the edited song recording, the shortening information retrieved by the media output manager from the song edit data, and wherein the media output generator is further configured to apply the audio output instructions relating to the shortening information when producing the edited song recording.

The workout music playback device may also include an exercise machine interface configured to connect with an exercise machine, receive the data stream of workout music from the media output generator and transmit the data stream of workout music to the exercise machine. The exercise machine interface may be further configured to receive user input information from the exercise machine, and send the user input information from the exercise machine to the media output manager.

In some embodiments, the media output manager may be further configured to retrieve equalization parameters from the song edit data in accordance with the workout parameters.

In some embodiments, the instruction relay module may be further configured to integrate the equalization parameters retrieved from the media output manager into the audio output instructions. The media output generator may be further configured to adjust the equalization of song segments played in the data stream of workout music in accordance with the equalization parameters provided in the audio output instructions.

In some embodiments, the media output manager may be further configured to retrieve from the song edit data in the memory information on exercise burn rate patterns for different workout styles. The exercise machine interface may be further configured to receive from the media output manager information on the exercise burn rate patterns and transmit the information on the exercise burn rate patterns to the exercise machine. The information on the exercise burn rate patterns may be adapted to be processed by the exercise machine for adjusting certain difficulty parameters of the exercise machine in accordance with the exercise burn rate patterns.

In some embodiment, the workout music playback device may also have a screen display. The workout music playback device may also have a video source configured to store video files corresponding to video segments of virtual trainers. The media output manager may also be further configured to retrieve trainer information from the song edit data stored in the memory, wherein the trainer information may be processed for generating a sequence of video segments in association with the workout parameters and/or audio segments of virtual trainers stored in the memory. The screen display may be configured to receive the trainer information from the media output manager, retrieve from the video source the video segments of virtual trainers in accordance with the received trainer information, assemble the video segments of virtual trainers in accordance with the received trainer information and display the assembled video segments of virtual trainers. The media output generator may be further configured to receive the trainer information for retrieving the audio segments of virtual trainers from the memory, and transmit audio data corresponding to the audio segments of virtual trainers. The media output generator may be further configured to transmit the audio data corresponding to the audio segments of virtual trainers to the audio output interface.

In some embodiments, the media output generator may be configured to retrieve video data corresponding to said song recording data, wherein said original musical recording is the audio of a music video. The screen display may be configured to play a video from said video data corresponding to said song recording data when said screen display is not displaying a video of a virtual trainer.

In some embodiments, the media output generator is further configured to transmit playback time information regarding the time lapse since the start of the workout to the instruction relay module.

In some embodiments, the media output manager may prepare the audio output information to include information on shortening the song duration of the edited song recording in allowable shortening portions of the edited song recording to match a desired song duration of the edited song recording. The media output generator may also be configured to apply the audio output instructions relating to the shortening information when producing the edited song recording.

In some embodiments, the song recording data may be that of a music video, wherein the original musical recording is the audio of the music video.

In some embodiments, the workout music playback device may have a mixer for assembling edited different length song recordings for each song title with specific ranges and exercise burn rate patterns in accordance with the song edit data. The workout music playback device may also have an audio file database for storing the edited different length song recordings prepared by the mixer.

In some embodiments, the workout music playback device may include a GPS interface that is adapted to receive geolocation information from a global positioning system, and wherein the media output manager may be further configured to receive the geolocation information and adapt the exercise burn rate pattern further in accordance with the received geolocation information.

In some embodiments, the workout music playback device may include the global positioning system.

In some embodiments, the workout music playback device may include an accelerometer interface that is adapted to receive acceleration readings from an accelerometer, and wherein the media output manager may be further configured to receive the acceleration readings and adapt the exercise burn rate pattern in accordance with the received acceleration readings.

In some embodiments, the workout music playback device may include the accelerometer.

In some embodiments, the workout music playback device may include memory, wherein the song edit data may be stored in the memory and the media output manager obtains the song edit data by retrieving the song edit data from the memory.

In some embodiments, the media output manager may obtain the song edit data by generating the song edit data for the original musical recording.

In some embodiments, the workout music playback device may include memory storing the song recording data of original musical recordings, and wherein the media output generator may obtain the song recording data of the original musical recording by retrieving the song recording data of the original musical recording from the memory storing the song recording data.

In some embodiments, the workout music playback device may include a biometric reader interface that may be adapted to receive biometric readings from a biometric reading device, wherein the media output manager may be configured to receive the biometric readings and prepare the audio output information adapted to the received biometric readings.

In some embodiments, the video data may have information on generating a real-time video of the virtual trainer and/or scenery.

Another broad aspect is a method of generating workout music during a workout from song recording data. The method includes receiving input from a user corresponding to a workout style selection. The method includes outputting an exercise burn rate pattern according to the workout style defining a variation over time of equalization parameters corresponding to an exercise intensity variation including periods of lower intensity exercise and higher intensity exercise performed over the course of a workout duration. The method includes generating audio output instructions in accordance with the exercise burn rate pattern. The method includes outputting an audio signal of workout music from the song recording data while adjusting the equalization parameters of the audio signal as a function of the audio output instructions over the course of the workout duration.

In some embodiments, the input may be received at a user input interface of an exercise machine.

In some embodiments, the method may include receiving input from a user corresponding to a selection of song titles, and wherein the burn rate pattern may further define the variation over time of equalization parameters as a function of song edit data specific to a song title of the selection of song titles and the workout style.

In some embodiments, the song edit data may include information on arranging song segments of an original musical recording into at least one edited song recording of the original musical recording, and wherein the outputting an audio signal of workout music may include arranging song segments of the original musical recording into at least one edited song recording of the original musical recording as a function of the song edit data.

In some embodiments, the song edit data may include a timestamp corresponding to the original musical recording indicative of an optimal point to end a workout, and wherein the audio signal of workout music outputted for a workout portion may end at the timestamp corresponding to the original musical recording indicative of an optimal point to end a workout.

In some embodiments, the method may include playing the portion of the edited song recording following the timestamp corresponding to the original musical recording indicative of an optimal point to end a workout in a cooldown portion following the workout portion.

In some embodiments, the song edit data may correspond to a first version of the original musical recording and the song segments may correspond to a second version of the original musical recording, and the method may include correcting the audio signal generated from the song segments to account for differences between the first version and the second version.

In some embodiments, the method may include transmitting the audio signal to an exercise machine.

In some embodiments, the method may include transmitting the exercise burn rate pattern to an exercise machine for causing the exercise machine to adjust certain difficulty parameters of the exercise machine in accordance with the exercise burn rate pattern.

In some embodiments, the method may include receiving biometric information of the user while performing a workout, and where the adjusting of at least one of the equalization parameters and edited song recording length of the audio signal may be further adjusted as a function of the received biometric information.

In some embodiments, the input may be received at a user input interface of a biometric reading device.

In some embodiments, the biometric reading device may be an activity tracker.

Another broad aspect is a computer-executable storage medium. The storage medium includes song edit data comprising information for arranging song segments of an original musical recording into at least one edited song recording of the original musical recording, wherein a song duration of an edited song recording of the at least one edited song recording is different from a song duration of the original musical recording.

In some embodiments, the song edit data may include equalization parameters specific to a workout style and to an original musical recording for adjusting equalization of the song segments of an original musical recording arranged into at least one edited song recording of the original musical recording.

In some embodiments, the song edit data may include a timestamp associated with the original musical recording indicative of an optimal point to end a workout.

In some embodiments, the song edit data may include labels indicative of the song recording structure of the song segments of the original musical recording.

In some embodiments, the song edit data may be stored as metadata associated with song recording data of the original musical recording.

Another broad aspect is a computer-executable storage medium. The storage medium includes a media output manager comprising program code that, when executed by a processor, causes the processor to receive user input provided by a user at a user interface, the user input comprising a workout style, and to output to an instruction relay module an exercise burn rate pattern according to the workout style defining a variation over time of equalization parameters corresponding to an exercise intensity variation including periods of lower intensity exercise and periods of higher intensity exercise to be performed over the course of a workout duration. The storage medium includes the instruction relay module comprising program code that, when executed by a processor, causes the processor to receive the exercise burn rate pattern from the media output manager and generate audio output instructions in accordance with the exercise burn rate pattern. The storage medium includes a media output generator comprising program code that, when executed by a processor, causes the processor to receive the audio output instructions and the song recording data, and cause the outputting of an audio signal of the workout music from the song recording data while adjusting the equalization parameters of the audio signal of the workout music as a function of the audio output instructions over the course of the workout duration.

In some embodiments, the adjusting the equalization parameters may include adjusting an amplitude differently in different frequency ranges, or adjusting the amplitude the same for all audio frequencies.

Another broad aspect is a method of adapting a length of workout music played during a workout as a function of workout progress data indicative of the progress of a user when performing the workout. The method includes providing in memory workout progress information corresponding to workout progress data obtained during a first workout where an audio signal generated from song recordings is played during the first workout, wherein the workout progress information comprises information associating playback of the song recordings to the progress of the first workout as indicated by the workout progress data obtained during the first workout. The method includes obtaining workout progress data during a subsequent workout indicative of the user's progress when performing the subsequent workout. The method includes retrieving from the memory the workout progress information, and comparing the workout progress information with information relating to progress of the subsequent workout in accordance with the workout progress data obtained during the subsequent workout. The method includes adjusting a length of at least one of the song recordings when played during the subsequent workout as a function of the comparison.

In some embodiments, the adjusting may be performed by one of repeating and removing portions of the at least one of the song recordings.

In some embodiments, the workout progress data obtained during the first workout may be geolocation data generated by a global positioning system during the first workout, and wherein the workout progress data obtained during the subsequent workout may be geolocation data generated by a global positioning system during the subsequent workout.

In some embodiments, the workout progress information may relate to distance travelled by the user during the first workout.

In some embodiments, the workout progress information may relate to a path taken by the user during the first workout.

In some embodiments, the workout progress data obtained during the first workout may be workout data generated by a workout machine during the first workout, and wherein the workout progress data obtained during the subsequent workout may be workout data generated by a workout machine during the subsequent workout.

In some embodiments, the workout data generated by a workout machine during the first workout may relate to calories burnt by the user during the first workout, and wherein the workout data generated by a workout machine during the subsequent workout may relate to calories burnt by the user during the subsequent workout.

In some embodiments, the workout data generated by a workout machine during the first workout may relate to distance travelled by the user during the first workout, as measured by the workout machine, and wherein the workout data generated by a workout machine during the subsequent workout may relate to distance travelled by the user during the subsequent workout, as calculated by the workout machine.

In some embodiments, the workout progress data obtained during the first workout may be workout data generated by an accelerometer during the first workout, and wherein the workout progress data obtained during the subsequent workout may be workout data generated by an accelerometer during the subsequent workout.

In some embodiments, equalization parameters of at least one of the song recordings played during the subsequent workout may be adjusted in accordance with the comparison.

In some embodiments, the equalization parameters may be further adjusted as function of biometric readings of the user generated by a biometric reader.

Another broad aspect is a workout music playback device for playing workout music during a workout from song recording data corresponding to song recordings. The device includes a user input interface configured to receive input from a user to set workout parameters and workout music parameters, the workout music parameters including song titles selected by a user, wherein the song titles correspond to song recording data of song recordings playable as the workout music, and a volume parameter adjustable by the user for adjusting the volume of at least one of the song recordings. The device includes computer-readable memory. The device includes a media output manager configured to receive the user input; store in the memory workout configuration data relating to the workout parameters and the workout music parameters, including the volume parameter; upon receiving input from the user relating to selecting a workout configuration that is stored in the memory, retrieve from the memory the workout configuration data corresponding to the workout configuration selection, including the volume parameter; and generate audio output information corresponding to the workout configuration data retrieved from the user. The device includes an instruction relay module configured to receive the audio output information from the media output manager and generate audio output instructions in accordance with the audio output information. The device includes a media output generator configured to receive the audio output instructions and the song recording data, and output an audio signal of the workout music from the song recording data in accordance with the audio output instructions. The volume of the at least one of the song recordings is adjusted by the media output generator in accordance with the volume parameter adjusted by the user.

In some embodiments, the workout music parameters may include, for each of the song recordings, a volume parameter for adjusting the volume of the corresponding song recording.

In some embodiments, the workout parameters may include a workout style for each song title selected by the user or the entire workout.

In some embodiments, the workout style may define a variation of burn rate as a function of time.

Another broad aspect is a method of playing workout music during a workout from song recording data. The method includes receiving user input for a first workout relating to the parameters of a workout and parameters of workout music to be played during the workout, wherein the user provides as the parameters of workout music a selection of song titles corresponding to song recording data of song recordings playable as the workout music, and a volume parameter for adjusting the volume of at least one of the song recordings. The method includes storing the parameters of a workout and the parameters of workout music in memory as workout configuration data. The method includes retrieving from the memory for a second workout the workout configuration data, including the volume parameter for adjusting the volume of at least one of the song recordings. The method includes playing workout music from the song recording data during the second workout in accordance with the retrieved workout configuration data, wherein the volume of the at least one song recording is adjusted as a function of the volume parameter provided by the user with respect to the first workout.

In some embodiments, the user may provide as the parameters of workout music for each of the song recordings a volume parameter for adjusting the volume of the corresponding song recording.

In some embodiments, the received user input for a first workout relating to the parameters of a workout may include a workout style for each song title selected by the user or the entire workout.

In some embodiments, the workout style may define a variation of burn rate over time.

Another broad aspect is a workout music playback device for playing workout music during a workout from song recording data corresponding to song recordings. The device includes a workout progress data interface configured to receive workout progress data obtained during a workout. The device includes computer-readable memory. The device includes a media output manager configured to receive workout progress data from the workout progress data interface; store in the memory workout progress information of an initial workout in accordance with workout progress data received for the initial workout; retrieve from the memory the workout progress information; compare the workout progress information of the initial workout with information relating to progress of a subsequent workout in accordance with workout progress data received during the subsequent workout; and generating audio output information for generating workout music from song recording data of song recordings, wherein the audio output information is generated in accordance with the comparison. The device includes an instruction relay module configured to receive the audio output information and generate audio output instructions in accordance with the audio output information. The device includes a media output generator configured to receive the audio output instructions and the song recording data, and output during the subsequent workout an audio signal of the workout music from the song recording data in accordance with the audio output instructions, wherein the length of at least one of the song recordings of the workout music is adjusted in accordance with the comparison.

In some embodiments, the media output generator may be configured to adjust the length by one of repeating and removing portions of the at least one of the song recordings.

In some embodiments, the workout progress data interface may be a GPS interface, and the workout progress data may be geolocation data.

In some embodiments, the workout progress information may relate to distance travelled.

In some embodiments, the workout progress information may relate to a route taken by a user during the initial workout.

In some embodiments, the workout progress data interface may be an accelerometer interface, and the workout progress data may be acceleration data.

In some embodiments, the workout progress data interface may be a workout machine interface, and the workout progress data may be data relating to calories burnt during a workout, distance travelled during a workout and/or progress of a workout routine.

DETAILED DESCRIPTION OF DRAWINGS

The invention will be better understood by way of the following detailed description of embodiments of the invention by reference to the appended drawings:

FIG. 8A is a visual representation of a sound wave of an exemplary edited song recording with a specific exercise burn rate pattern.

FIG. 8B is a visual representation of a sound wave of an exemplary edited song recording with a specific exercise burn rate pattern.

FIG. 9A is a visual representation of a sound wave of an exemplary edited song recording with a specific exercise burn rate pattern.

FIG. 9B is a visual representation of a sound wave of an exemplary edited song recording with a specific exercise burn rate pattern.

FIG. 10A is a visual representation of a sound wave of an exemplary edited song recording with a specific exercise burn rate pattern.

FIG. 10B is a visual representation of a sound wave of an exemplary edited song recording with a specific exercise burn rate pattern.

FIG. 11A is a visual representation of a sound wave of an exemplary edited song recording with a specific exercise burn rate pattern.

FIG. 11B is a visual representation of a sound wave of an exemplary edited song recording with a specific exercise burn rate pattern.

DETAILED DESCRIPTION

Overview

Figure 1:
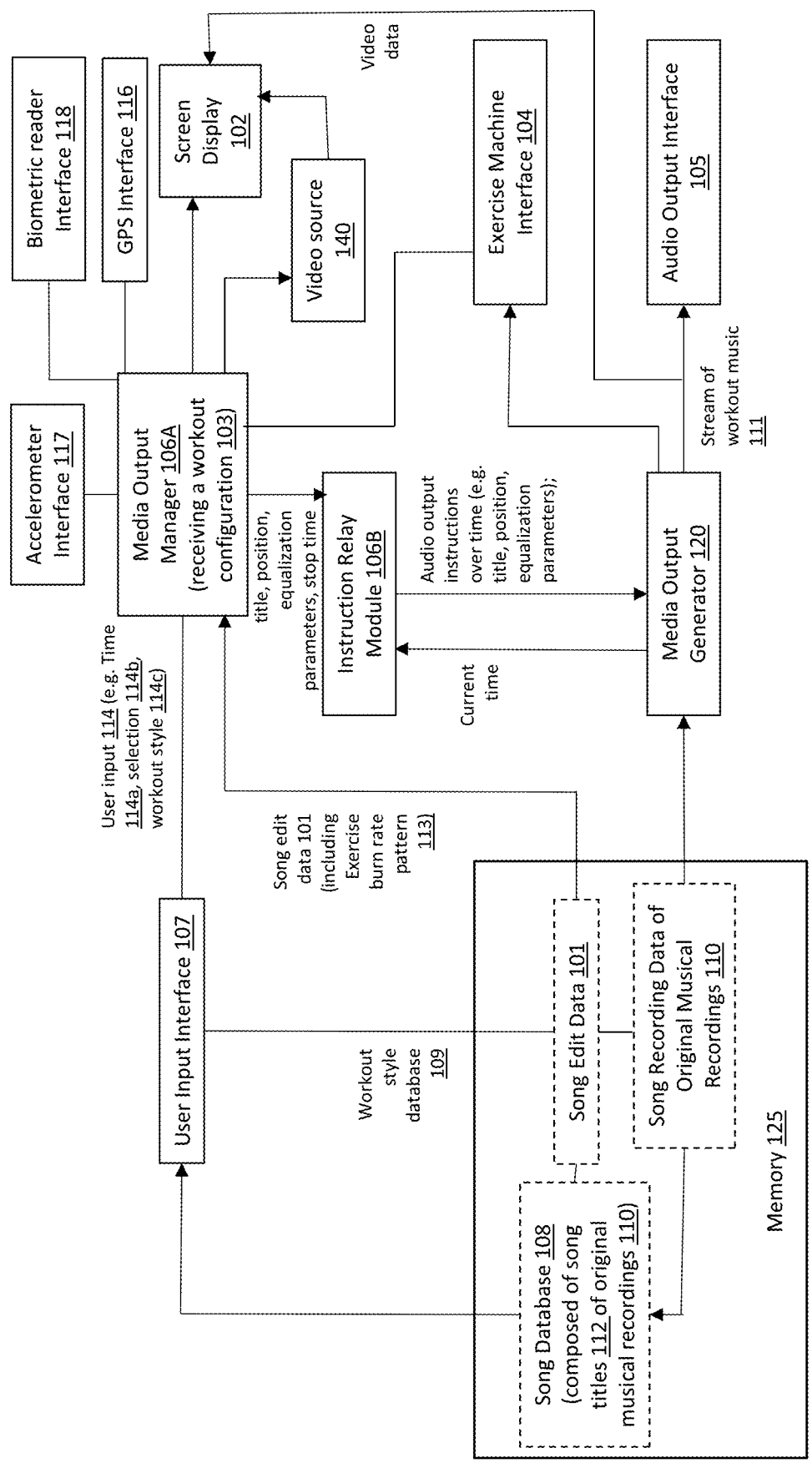
FIG. 1 is a modular diagram of an exemplary workout music playback device.

A workout lasts typically between 10 and 60 minutes, although different durations are possible. It is desirable that the music played during a workout is appreciated by the user and motivates the user to pursue the workout to its completion. Music can be very motivational, and as described above with reference to the prior art, music that is motivational for the person doing the workout (i.e. the user), can end or change tempo at times that are counter-productive for the given workout. Accordingly, in the embodiments described below, songs chosen to be played during the workout are edited to be of a length that is different from the original length of the songs so that the combined playtime of the edited songs matches or comes close to the desired workout time.

A workout typically involves a variation in intensity of the physical activity, and this is called herein burn and non-burn portions. "Burn" refers to an exertion period that cannot normally be maintained very long and a burn period should end before the user is exhausted from the exertion period. "Non-burn", "Low Burn" or "Recovery" periods or portions are periods of exercise and effort, however, these effort levels may be maintained for a much longer period of time. At the end of a workout, a "cool down" period can also be provided, just as a "warm up" period can be provided at the beginning of a workout. For a jogging workout, the cool down and warm up periods can involve walking, for example. The sequence of variations in intensity is called the "exercise burn rate pattern".

In some embodiments, the user selects a workout style and song titles corresponding to songs that should be played in accordance with the workout style. The workout duration is the sum of the playtimes of each song chosen for the workout. A choice is made regarding the length of each original musical recording of the songs to be played. The chosen original musical recordings are edited in length so that the total length of play of all songs corresponds exactly or closely to the user selected duration of the workout.

The burn rate can change over the course of the workout in a variety of workout styles. As an example of a workout style, the songs can be chosen to be burn songs or non-burn songs, and the equalization of the music is changed from song to song to reflect the burn rate. In other workout styles described below, equalization is changed within songs in accordance with the changes in the burn rate. While the workout style might suggest a change in burn rate at a specific point in time, the change in equalization of the music corresponding to the change in burn rate can be done at an appropriate time in the music. For example, this can be the change from refrain to verse (or vice versa). This can result in a lengthening or shortening of a particular burn rate portion of the workout music. If waiting for a refrain/verse transition would cause too significant a change in the length of the burn rate portion, the transition can be done between any suitable lyric line or change in the music itself (for example before a change in instrument being played, etc.).

In the embodiments described below, the song editing and/or the burn rate transition points can be predetermined for each predetermined duration of the edited song recording. Because the desired variations in duration and exercise burn rate patterns are many, the predetermined variations in song edit data can require a great number of specific sequences of song edit data that represent what song segments to play and in what order, with the associated equalization variations during the play of the edited version of the original musical recording.

Although, the presently preferred embodiments involve defining the specific sequence and equalization change data for each edited song duration and exercise burn rate pattern type, alternatively, all of the potential transition points for duration editing and exercise burn rate pattern variation can be defined for an original musical recording, along with the nature or type of each defined segment, where this information may be included in the song edit data. In this way, the computer can determine how to play in a determined order various segments of an original musical recording to provide an edited version of the original musical recording having at least approximately the desired duration along with suitable equalization variations corresponding to the desired exercise burn rate pattern. This approach employs, for instance, the song edit data, to provide dynamically generated potential transition points and song segment type data for the original musical recording corresponding to a song title.

In Table 1 below, there are 12 duration groups of song edit data for an original musical recording that has an original duration of 4 minutes and 48 seconds. The 12 durations span from 3:01.4 to 8:42.7. As can be seen, for each duration group of the original musical recording, the song edit data specifies the fade in range and the fade out range. These are intro and outro portions of the edited song recordings that can be trimmed at playback time to better fit the song length to the desired play time for the edited song recording within the workout. The song edit data specifies which portions of the original musical recording should be played and in what sequence. In Table 1, no time gap exists between the longest playtime of one duration group and the shortest playtime of the next duration group, as there is overlap. It will be understood that a small time gap between duration groups may be permitted.

TABLE 1 exemplary arrangements of song segments (i.e. Sequences) of an original musical recording.

| SequenceNumber | Arrangement of song segments | Fade in and fade out ranges |
|---|---|---|
| 1 | Play 0:00.0 to 1:03.5, 2:26.3 to 4:44.0. | Fade in range 0:00.0 to 0:27.0. Fade out range 3:12.2 to 3:21.2. Full playtime 3:21.2, shortest playtime 2:45.2. |
| 2 | Play 0:00.0 to 1:03.5, 2:10.1 to 4:44.0. | Fade in range 0:00.0 to 0:27.0. Fade out range 3:28.4 to 3:37.4. Full playtime 3:37.4, shortest playtime = 3:01.4. |
| 3 | Play 0:00.0 to 1:19.7, 2:10.1 to 4:44.0. | Fade in range 0:00.0 to 0:27.0. Fade out range 3:44.1 to 3:53.1. Full playtime 3:53.1, shortest playtime 3:17.1. |
| 4 | Play 0:00.0 to 0:04.4, 0:00.4 to 0:04.4, 0:00.4 to 0:04.4, 0:04.4 to 0:11.3, 0:07.2 to 0:08.5, 0:04.4 to 0:11.3, 0:11.3 to 1:19.7, 2:10.1 to 4:44.0. | Fade in range 0:00.0 to 0:27.0. Fade out range 4:04.3 to 4:13.3. Full playtime 4:13.3, shortest playtime 3:37.3. |
| 5 | Play 0:00.0 to 4:44.0. | Fade in range 0:00.0 to 0:27.0. Fade out range 4:35.0 to 4:44.0. Full playtime 4:44.0, shortest playtime 4:08.0. |
| 6 | Play 0:00.0 to 1:19.7, 1:03.5 to 4:44.0. | Fade in range 0:00.0 to 0:27.0. Fade out range 4:51.2 to 5:00.2. Full playtime 5:00.2, shortest playtime 4:24.2. |
| 7 | Play 0:00.0 to 0:04.4, 0:00.4 to 1:19.7, 1:03.5 to 2:26.3, 2:10.1 to 4:44.0. | Fade in range 0:00.0 to 0:27.0. Fade out range 5:10.9 to 5:19.9. Full playtime 5:19.9, shortest playtime 4:43.9. |
| 8 | Play 0:00.0 to 1:38.8, 0:32.2 to 4:44.0. | Fade in range 0:00.0 to 0:27.0. Fade out range 5:42.0 to 5:51.0. Full playtime 5:51.0, shortest playtime 5:15.0. |

TABLE 1-continued exemplary arrangements of song segments (i.e. Sequences) of an original musical recording.

| SequenceNumber | Arrangement of song segments | Fade in and fade out ranges |
|---|---|---|
| 9 | Play 0:00.0 to 0:04.4, 0:00.4 to 0:04.4, 0:00.4 to 0:04.4, 0:04.4 to 0:11.3, 0:07.2 to 0:08.5, 0:04.4 to 0:11.3, 0:07.2 to 0:08.5, 0:04.4 to 0:11.3, 0:11.3 to 1:38.8, 0:32.2 to 4:44.0. | Fade in range 0:00.0 to 0:27.0. Fade out range 6:16.4 to 6:15.4. Full playtime 6:15.4, shortest playtime 5:39.4. |
| 10 | Play 0:00.0 to 0:04.4, 0:00.4 to 0:04.4, 0:00.4 to 0:04.4, 0:04.4 to 0:11.3, 0:07.2 to 0:08.5, 0:04.4 to 0:11.3, 0:07.2 to 0:08.5, 0:04.4 to 0:11.3, 0:11.3 to 2:10.1, 1:03.5 to 1:19.7, 0:32.2 to 4:44.0. | Fade in range 0:00.0 to 0:50.0. Fade out range 6:53.9 to 7:02.9. Full playtime 7:02.9, shortest playtime 6:03.9. |
| 11 | Play 0:00.0 to 0:04.4, 0:00.4 to 0:04.4, 0:00.4 to 0:04.4, 0:04.4 to 0:11.3, 0:07.2 to 0:08.5, 0:04.4 to 0:11.3, 0:07.2 to 0:08.5, 0:04.4 to 0:11.3, 0:11.3 to 2:10.1, 1:03.5 to 1:38.9, 0:32.2 to 1:19.7, 1:03.5 to 2:26.3, 2:10.1 to 4:44.0. | Fade in range 0:00.0 to 1:00.0. Fade out range 7:45.1 to 7:54.1. Full playtime 7:54.1, shortest playtime 6:45.1. |
| 12 | Play 0:00.0 to 0:04.4, 0:00.4 to 0:04.4, 0:00.4 to 0:04.4, 0:04.4 to 0:11.3, 0:07.2 to 0:08.5, 0:04.4 to 0:11.3, 0:07.2 to 0:08.5, 0:04.4 to 0:11.3, 0:11.3 to 1:19.7, 1:03.5 to 2:26.3, 1:03.5 to 1:38.9, 0:32.2 to 1:19.7, 1:03.5 to 2:26.3, 2:10.1 to 3:32.5, 3:16.3 to 4:44.0. | Fade in range 0:00.0 to 1:00.0. Fade out range 8:33.7 to 8:42.7. Full playtime 8:42.7, shortest playtime 7:33.7. |

For example, Sequence #3 involves playing only two segments, namely from 0:00.0 to 1:19.7 and 2:10.1 to 4:44.0. The edited song duration is now 3:53.1, shortened from the original 4:48.0. The fade in range for the edited song recording is specified as 0:00.0 to 0:27.0, and the fade out range from 3:44.1 to 3:53.1. This means that the play of the edited song recording (Sequence #3) can be delayed as late as 0:27 into the edited song recording, and can be ended as early as 3:44.1 into the edited song duration.

As shown in table 2, Sequence #5 also includes a set of equalization parameters for a number of workout styles. In the aerobic workout style, time ranges within the edited song recording are identified as belonging to one of four different classes. It will be appreciated that fewer or more classes can be used. The classes identified are (1) low burn, (2) medium burn, (3) high burn and (4) optimum time to end the workout, the latter being a marker that separates the final high burn and the outro or coda section that is classed as a low burn. The high burn class can also be split into high burn and final burn, the latter having a volume that is the greatest. These classes represent equalization presets that cause the edited song recording to have a variable volume, and possibly a variable treble, mid or bass level, for the interval of the edit song recording. The intervals shown in the table may correspond to chorus and verse portions of the edited song recording.

Sequence #5 also includes a set of equalization parameters for High Intensity Interval Training (HIIT) workout style with 10 second intervals. In this style, the equalization is varied between medium and high burn in approximately 10 second intervals over the edited song recording. The same classes are identified as for the aerobic workout style, and of course, the classes could be greater or fewer in number. The transitions between the roughly 10 second intervals are chosen to coincide with suitable points in the music, such as lyrical phrase end/beginnings, changes in music rhythm or instrumentation, etc.

In some embodiments, the user selects a workout duration, a workout style and a selection of songs. The computer then uses song edit data, as for example the data in Table 1, to select the arrangements of song segments (i.e. the Sequences) that allow the selection of edited song recordings to fit within the workout duration. The workout style is then used to select the sets of equalization parameters for each of the edited song recordings, as well as appropriate exercise burn rate patterns. In examples where there does not exist any song edit data for a selected original musical recording, the workout music playback device may be configured to self-generate a song edit data table for use with respect to the original musical recording. For example, the workout music playback device may be configured to analyze, using, for instance, a digital signal processor karaoke algorithm as is known in the art which removes the vocals from the existing original musical recording, creating an instrumental track for analysis. Similarly, a digital signal process algorithm may also be configured, as is known in the art, to make a vocal-only track for analysis by taking the original musical recording and subtracting out, for instance, the instrumental track that was created. In some embodiments, the workout music playback device (e.g. its media output manager, such as media output manager 106A) may analyze the instrumental track in order to determine repetitions in patterns of the sound structure (e.g. a rhythmic pattern). In some examples, the workout music playback device may analyze the bass to assess patterns. The repetition in rhythmic pattern may provide information on portions of the song recording that repeat, where portions of the instrumental track corresponding to each verse may have similar or identical rhythmic patterns, and portions of the instrumental track corresponding to each chorus may also share similar or identical rhythmic patterns. The analysis provides for at least two groups of song recording portions (e.g. one that could correspond to the chorus, and one that could correspond to the verses), where timestamps may be generated indicative of transitions between portions of the instrumental track. In some examples, the portions of the instrumental track that are not similar or identical to any other portion of the instrumental track (and starting at the beginning of the instrumental track or ending at the ending of the instrumental track) may correspond to the intro and outro portions of the original musical recording.

A further analysis may then be conducted with respect to the sound structure (e.g. rhythmic pattern) of the vocal-only track. The times attributed to the different portions of the instrumental track may then be used to analyze the vocal-only track, providing additional information on the structure of the original musical recording. Portions of the vocal-only track corresponding to the portions of the instrumental track that have been identified based on rhythmic patterns are comparatively analyzed. When the portions of the vocal-only track (corresponding to instrumental portions) have similar or identical sound structure, this may correspond to the chorus portions of the original musical recording. Portions of the vocal-only track (corresponding to the instrumental portions) that do not have a similar or identical sound structure may correspond to the verse portions of the original musical recording. As a result, an analysis of an instrumental track and a vocal-only track corresponding to the original musical recording may provide information (e.g. timestamps marking transitions between portions of the song; labels indicative of the nature of the portions, such as verse, chorus, intro, outro, etc.) on the song recording structure of the original musical recording.

In some embodiments, this song recording information can be used to generate a song edit data table with the timestamps identifying the transition times between different portions of the song recording corresponding to the song recording structure (e.g. verse to chorus), and labels used to identify the nature of the portion of the song recording. As a function of the song edit data table, the workout music playback device may add or remove groups and/or portions of, e.g., verses and chorus to generate edited song recordings with different playback times of the original musical recording. The workout music playback device may also process the information relative to the song edit data table to adjust the equalization parameters of an edited song recording as a function of the nature of the workout. In some examples, the song edit data may be stored as metadata in association with song recording data of the original musical recording.

In some embodiments, the song edit data generated by the workout music playback device may be further analyzed manually in order to ensure that the timestamps accurately reflect the transition points as a function of the sound structure of the original musical recording.

In some embodiments, the song edit data may not be generated by the workout music playback device, but may be generated, for instance, remotely by a remote computer or server.

It will be understood that these are but examples of generating song edit data for an original musical recording using the workout music playback device (or a computer for automatically generating the song edit data). Other techniques of generating the song edit data may be performed in accordance with the present teachings. The song edit data may also be generated manually by analyzing the song recording structure of the original musical recording (providing timestamps corresponding, e.g., to transition points between different portions of the original musical recording, and/or labels of the different portions of the original musical recording).

Table 2 is an example of information contained in exemplary song edit data relating to the equalization parameters over time position for possible workout styles that may be selected by the user. Each possible arrangement of song segments (such as sequences 1 to 12) of Table 1 may have corresponding equalization parameters song edit data for each possible workout style that may be selected by a user. The equalization parameters song edit data of Table 2A to 2L relate to Sequence 5 of the sequences described in Table 1, and Table 2M relates to a possible set of equalization parameters for an AEROBIC workout style of Sequence 3 (just like Sequence 5, there may be equalization parameters for each possible workout style and burn time for Sequence 3, and every other Sequence for a given original musical recording). The song edit data described in Tables 2A to 2M may also contain trainer sequence information for generating a trainer during a workout (indicating for example, the beginning of an edited song recording, the change in burn rate as a function of time, the ending of an edited song recording) as further described herein:

TABLE 2A exemplary equalization parameters stored in song edit data for an exemplary workout style (LOW) as defined in Table 3 for an exemplary edited song recording (Sequence 5 of Table 1).
Sequence #5 - Workout Style = LOW

| Time position | Burn rate | Vol db | Bass db | Mid db | Treb db | Trainer Sequence |
|---|---|---|---|---|---|---|
| 00:00.00 | Low | 0 | 0 | 0 | 0 | Begin Low |
| 04:44.00 | Low | 0 | 0 | 0 | 0 | End |
| Optimum time to end workout = 4:33.0 | | | | | | |

TABLE 2B exemplary equalization parameters stored in song edit data for an exemplary workout style (MEDIUM) as defined in Table 3 for an exemplary edited song recording (Sequence 5 of Table 1).
Sequence #5 - Workout Style = MEDIUM

| Time position | Burn rate | Vol db | Bass db | Mid db | Treb db | Trainer Sequence |
|---|---|---|---|---|---|---|
| 00:00.00 | Medium | 0 | 0 | 0 | 0 | Begin Medium |
| 04:44.00 | Medium | 0 | 0 | 0 | 0 | End |
| Optimum time to end workout = 4:33.0 | | | | | | |

TABLE 2C exemplary equalization parameters stored in song edit data for an exemplary workout style (HIGH) as defined in Table 3 for an exemplary edited song recording (Sequence 5 of Table 1).
Sequence #5 - Workout Style = High

| Time position | Burn rate | Vol db | Bass db | Mid db | Treb db | Trainer Sequence |
|---|---|---|---|---|---|---|
| 00:00.00 | High | 0 | 0 | 0 | 0 | Begin High |
| 04:44.00 | High | 0 | 0 | 0 | 0 | End |
| Optimum time to end workout = 4:33.0 | | | | | | |

TABLE 2D exemplary equalization parameters stored in song edit data for an exemplary workout style (AEROBIC) as defined in Table 3 for an exemplary edited song recording (Sequence 5 of Table 1).
Sequence #5 - Workout Style = Aerobic

| Time position | Burn rate | Vol db | Bass db | Mid db | Treb db | Trainer Sequence |
|---|---|---|---|---|---|---|
| 00:00.00 | Low | −10 | 1 | −2 | 1 | Begin Low |
| 00:33.00 | Medium | −10 | 1 | −2 | 1 | Low to Medium |
| 00:33.10 | Medium | −6 | 0 | −1 | 0 | |
| 01:03.40 | High | −6 | 0 | −1 | 0 | Medium to High |

TABLE 2D-continued exemplary equalization parameters stored in song edit data for an exemplary workout style (AEROBIC) as defined in Table 3 for an exemplary edited song recording (Sequence 5 of Table 1).
Sequence #5 - Workout Style = Aerobic

| Time position | Burn rate | Vol db | Bass db | Mid db | Treb db | Trainer Sequence |
|---|---|---|---|---|---|---|
| 01:03.50 | High | −3 | 0 | 0 | 0 | |
| 01:38.70 | Medium | −3 | 0 | 0 | 0 | High to Medium |
| 01:38.80 | Medium | −6 | 0 | −1 | 0 | |
| 02:10.10 | High | −6 | 0 | −1 | 0 | Medium to High |
| 02:10.20 | High | −3 | 0 | 0 | 0 | |
| 02:41.50 | Medium | −3 | 0 | 0 | 0 | High to Medium |
| 02:41.90 | Medium | −6 | 0 | −1 | 0 | |
| 03:12.60 | High | −6 | 0 | −1 | 0 | Medium to High |
| 03:12.70 | High | −3 | 0 | 0 | 0 | |
| 04:00.50 | High | −3 | 0 | 0 | 0 | High to Final High |
| 04:00.60 | High | 0 | 0 | 0 | 0 | |
| 04:33.00 | Low | 0 | 0 | 0 | 0 | Final High to Low |
| 04:44.00 | Low | 0 | 0 | 0 | 0 | End |
| Optimum time to end workout = 4:33.00 | | | | | | |

TABLE 2E exemplary equalization parameters stored in song edit data for an exemplary workout style (INTERVAL-LV0) as defined in Table 3 for an exemplary edited song recording (Sequence 5 of Table 1).
Sequence #5 - Workout Style = Interval-Lv0

| Time position | Burn rate | Vol db | Bass db | Mid db | Treb db | Trainer Sequence |
|---|---|---|---|---|---|---|
| 00:00.00 | Medium | −14 | 2 | −3 | 2 | Begin Medium |
| 00:33.00 | Medium | −14 | 2 | −3 | 2 | |
| 00:33.10 | Medium | −8 | 1 | −2 | 1 | |
| 01:39.55 | Medium | −8 | 1 | −2 | 1 | |
| 01:39.60 | Medium | −4 | 0 | −1 | 0 | |
| 03:12.76 | Medium | −4 | 0 | −1 | 0 | |
| 03:12.78 | Medium | −2 | 0 | 0 | 0 | |
| 03:28.90 | Medium | −2 | 0 | 0 | 0 | |
| 04:16.70 | Medium | −2 | 0 | 0 | 0 | Medium to Final Medium |
| 04:16.71 | Medium | 0 | 0 | 0 | 0 | |
| 04:33.00 | Low | 0 | 0 | 0 | 0 | Final Medium to Low |
| 04:44.00 | Low | 0 | 0 | 0 | 0 | End |
| Optimum time to end workout = 4:33.00 | | | | | | |

TABLE 2F exemplary equalization parameters stored in song edit data for an exemplary workout style (INTERVAL LV-1) as defined in Table 3 for an exemplary edited song recording (Sequence 5 of Table 1).
Sequence #5 - Workout Style = Interval-Lv1

| Time position | Burn rate | Vol db | Bass db | Mid db | Treb db | Trainer Sequence |
|---|---|---|---|---|---|---|
| 00:00.00 | Medium | −22 | 3 | −4 | 3 | Begin Medium |
| 00:33.00 | Medium | −22 | 3 | −4 | 3 | |
| 00:33.10 | Medium | −16 | 2 | −3 | 2 | |
| 01:39.55 | Medium | −16 | 2 | −3 | 2 | |
| 01:39.60 | Medium | −12 | 2 | −2 | 2 | |
| 03:12.76 | High | −12 | 2 | −2 | 2 | Medium to High |
| 03:12.78 | High | −8 | 1 | −2 | 1 | |
| 03:28.90 | High | −8 | 1 | −2 | 1 | |

TABLE 2F-continued exemplary equalization parameters stored in song edit data for an exemplary workout style (INTERVAL LV-1) as defined in Table 3 for an exemplary edited song recording (Sequence 5 of Table 1).
Sequence #5 - Workout Style = Interval-Lv1

| Time position | Burn rate | Vol db | Bass db | Mid db | Treb db | Trainer Sequence |
|---|---|---|---|---|---|---|
| 03:28.93 | High | −4 | 0 | −1 | 0 | |
| 04:00.49 | High | −4 | 0 | −1 | 0 | High to Final High |
| 04:00.50 | High | −2 | 0 | 0 | 0 | |
| 04:16.70 | High | −2 | 0 | 0 | 0 | |
| 04:16.71 | High | 0 | 0 | 0 | 0 | |
| 04:33.00 | Low | 0 | 0 | 0 | 0 | Final High to Low |
| 04:44.00 | Low | 0 | 0 | 0 | 0 | End |

Optimum time to end workout = 4:33.00

TABLE 2G exemplary equalization parameters stored in song edit data for an exemplary workout style (HIIT-10 S) as defined in Table 3 for an exemplary edited song recording (Sequence 5 of Table 1).
Sequence #5 - Workout Style = HIIT-10 s

| Time position | Burn rate | Vol db | Bass db | Mid db | Treb db | Trainer Sequence |
|---|---|---|---|---|---|---|
| 00:00.00 | Low | −12 | 2 | −2 | 2 | Begin Low |
| 00:11.80 | Medium | −12 | 2 | −2 | 2 | Low to Medium |
| 00:11.90 | Medium | −6 | 0 | −1 | 0 | |
| 00:21.80 | High | −6 | 0 | −1 | 0 | Medium to High |
| 00:21.90 | High | 0 | 0 | 0 | 0 | |
| 00:33.00 | Medium | 0 | 0 | 0 | 0 | High to Medium |
| 00:33.10 | Medium | −6 | 0 | −1 | 0 | |
| 00:41.00 | High | −6 | 0 | −1 | 0 | Medium to High |
| 00:41.10 | High | 0 | 0 | 0 | 0 | |
| 00:52.30 | Medium | 0 | 0 | 0 | 0 | High to Medium |
| 00:52.40 | Medium | −6 | 0 | −1 | 0 | |
| 01:03.40 | High | −6 | 0 | −1 | 0 | Medium to High |
| 01:03.50 | High | 0 | 0 | 0 | 0 | |
| 01:16.00 | Medium | 0 | 0 | 0 | 0 | High to Medium |
| 01:16.10 | Medium | −6 | 0 | −1 | 0 | |
| 01:27.50 | High | −6 | 0 | −1 | 0 | Medium to High |
| 01:27.60 | High | 0 | 0 | 0 | 0 | |
| 01:38.60 | Medium | 0 | 0 | 0 | 0 | High to Medium |
| 01:38.70 | Medium | −6 | 0 | −1 | 0 | |
| 01:47.40 | High | −6 | 0 | −1 | 0 | Medium to High |
| 01:47.50 | High | 0 | 0 | 0 | 0 | |
| 01:58.60 | Medium | 0 | 0 | 0 | 0 | High to Medium |
| 01:58.70 | Medium | −6 | 0 | −1 | 0 | |
| 02:08.90 | High | −6 | 0 | −1 | 0 | Medium to High |
| 02:09.00 | High | 0 | 0 | 0 | 0 | |
| 02:21.10 | Medium | 0 | 0 | 0 | 0 | High to Medium |
| 02:21.20 | Medium | −6 | 0 | −1 | 0 | |
| 02:30.40 | High | −6 | 0 | −1 | 0 | Medium to High |
| 02:30.50 | High | 0 | 0 | 0 | 0 | |
| 02:41.70 | Medium | 0 | 0 | 0 | 0 | High to Medium |
| 02:41.90 | Medium | −6 | 0 | −1 | 0 | |
| 02:49.50 | High | −6 | 0 | −1 | 0 | Medium to High |
| 02:49.60 | High | 0 | 0 | 0 | 0 | |
| 03:01.30 | Medium | 0 | 0 | 0 | 0 | High to Medium |
| 03:01.40 | Medium | −6 | 0 | −1 | 0 | |
| 03:10.30 | High | −6 | 0 | −1 | 0 | Medium to High |
| 03:10.40 | High | 0 | 0 | 0 | 0 | |
| 03:19.80 | Medium | 0 | 0 | 0 | 0 | High to Medium |
| 03:19.90 | Medium | −6 | 0 | −1 | 0 | |
| 03:28.90 | High | −6 | 0 | −1 | 0 | Medium to High |
| 03:29.00 | High | 0 | 0 | 0 | 0 | |
| 03:40.30 | Medium | 0 | 0 | 0 | 0 | High to Medium |
| 03:40.40 | Medium | −6 | 0 | −1 | 0 | |
| 03:52.20 | High | −6 | 0 | −1 | 0 | Medium to High |
| 03:52.30 | High | 0 | 0 | 0 | 0 | |

TABLE 2G-continued exemplary equalization parameters stored in song edit data for an exemplary workout style (HIIT-10 S) as defined in Table 3 for an exemplary edited song recording (Sequence 5 of Table 1).
Sequence #5 - Workout Style = HIIT-10 s

| Time position | Burn rate | Vol db | Bass db | Mid db | Treb db | Trainer Sequence |
|---|---|---|---|---|---|---|
| 04:04.30 | Medium | 0 | 0 | 0 | 0 | High to Medium |
| 04:04.40 | Medium | −6 | 0 | −1 | 0 | |
| 04:13.70 | High | −6 | 0 | −1 | 0 | Medium to Final High |
| 04:13.80 | High | 0 | 0 | 0 | 0 | |
| 04:24.70 | Medium | 0 | 0 | 0 | 0 | Final High to Medium |
| 04:24.80 | Medium | −6 | 0 | −1 | 0 | |
| 04:34.30 | Low | −6 | 0 | −1 | 0 | Medium to Low |
| 04:34.40 | Low | −12 | 2 | −2 | 2 | |
| 04:44.00 | Low | −12 | 2 | −2 | 2 | End |

Optimum time to end workout = 4:24.70

TABLE 2H exemplary equalization parameters stored in song edit data for an exemplary workout style (HIIT-10 S+) as defined in Table 3 for an exemplary edited song recording (Sequence 5 of Table 1).
Sequence #5 - Workout Style = HIIT-10 s+

| Time position | Burn rate | Vol db | Bass db | Mid db | Treb db | Trainer Sequence |
|---|---|---|---|---|---|---|
| 00:00.00 | Low | −20 | 3 | −4 | 3 | Begin Low |
| 00:11.80 | Medium | −20 | 3 | −4 | 3 | Low to Medium |
| 00:11.90 | Medium | −14 | 2 | −3 | 2 | |
| 00:21.80 | High | −14 | 2 | −3 | 2 | Medium to High |
| 00:21.90 | High | −8 | 1 | −2 | 1 | |
| 00:33.00 | Medium | −8 | 1 | −2 | 1 | High to Medium |
| 00:33.10 | Medium | −14 | 2 | −3 | 2 | |
| 00:41.00 | High | −14 | 2 | −3 | 2 | Medium to High |
| 00:41.10 | High | −6 | 0 | −1 | 0 | |
| 00:52.30 | Medium | −6 | 0 | −1 | 0 | High to Medium |
| 00:52.40 | Medium | −12 | 2 | −2 | 2 | |
| 01:03.40 | High | −12 | 2 | −2 | 2 | Medium to High |
| 01:03.50 | High | −6 | 0 | −1 | 0 | |
| 01:16.00 | Medium | −6 | 0 | −1 | 0 | High to Medium |
| 01:16.10 | Medium | −12 | 2 | −2 | 2 | |
| 01:27.50 | High | −12 | 2 | −2 | 2 | Medium to High |
| 01:27.60 | High | −4 | 0 | −1 | 0 | |
| 01:38.60 | Medium | −4 | 0 | −1 | 0 | High to Medium |
| 01:38.70 | Medium | −10 | 1 | −2 | 1 | |
| 01:47.40 | High | −10 | 1 | −2 | 1 | Medium to High |
| 01:47.50 | High | −4 | 0 | −1 | 0 | |
| 01:58.60 | Medium | −4 | 0 | −1 | 0 | High to Medium |
| 01:58.70 | Medium | −10 | 1 | −2 | 1 | |
| 02:08.90 | High | −10 | 1 | −2 | 1 | Medium to High |
| 02:09.00 | High | −3 | 0 | 0 | 0 | |
| 02:21.10 | Medium | −3 | 0 | 0 | 0 | High to Medium |
| 02:21.20 | Medium | −9 | 1 | −2 | 1 | |
| 02:30.40 | High | −9 | 1 | −2 | 1 | Medium to High |
| 02:30.50 | High | −3 | 0 | 0 | 0 | |
| 02:41.70 | Medium | −3 | 0 | 0 | 0 | High to Medium |
| 02:41.90 | Medium | −9 | 1 | −2 | 1 | |
| 02:49.50 | High | −9 | 1 | −2 | 1 | Medium to High |
| 02:49.60 | High | −2 | 0 | 0 | 0 | |
| 03:01.30 | Medium | −2 | 0 | 0 | 0 | High to Medium |
| 03:01.40 | Medium | −8 | 1 | −2 | 1 | |
| 03:10.30 | High | −8 | 1 | −2 | 1 | Medium to High |
| 03:10.40 | High | −2 | 0 | 0 | 0 | |
| 03:19.80 | Medium | −2 | 0 | 0 | 0 | High to Medium |
| 03:19.90 | Medium | −8 | 1 | −2 | 1 | |
| 03:28.90 | High | −8 | 1 | −2 | 1 | Medium to High |
| 03:29.00 | High | −1 | 0 | 0 | 0 | |
| 03:40.30 | Medium | −1 | 0 | 0 | 0 | High to Medium |
| 03:40.40 | Medium | −7 | 1 | −2 | 1 | |

TABLE 2H-continued exemplary equalization parameters stored in song edit data for an exemplary workout style (HIIT-10 S+) as defined in Table 3 for an exemplary edited song recording (Sequence 5 of Table 1).
Sequence #5 - Workout Style = HIIT-10 s+

| Time position | Burn rate | Vol db | Bass db | Mid db | Treb db | Trainer Sequence |
|---|---|---|---|---|---|---|
| 03:52.20 | High | −7 | 1 | −2 | 1 | Medium to High |
| 03:52.30 | High | −1 | 0 | 0 | 0 | |
| 04:04.30 | Medium | −1 | 0 | 0 | 0 | High to Medium |
| 04:04.40 | Medium | −7 | 1 | −2 | 1 | |
| 04:13.70 | High | −7 | 1 | −2 | 1 | Medium to Final High |
| 04:13.80 | High | 0 | 0 | 0 | 0 | |
| 04:24.70 | Medium | 0 | 0 | 0 | 0 | Final High to Medium |
| 04:24.80 | Medium | −6 | 0 | −1 | 0 | |
| 04:34.30 | Low | −6 | 0 | −1 | 0 | Medium to Low |
| 04:34.40 | Low | −12 | 2 | −2 | 2 | |
| 04:44.00 | Low | −12 | 2 | −2 | 2 | End |

Optimum time to end workout = 4:24.70

TABLE 2I exemplary equalization parameters stored in song edit data for an exemplary workout style (HIIT-20 S) as defined in Table 3 for an exemplary edited song recording (Sequence 5 of Table 1).
Sequence #5 - Workout Style = HIIT-20 s

| Time position | Burn rate | Vol db | Bass db | Mid db | Treb db | Trainer Sequence |
|---|---|---|---|---|---|---|
| 00:00.00 | Low | −12 | 2 | −2 | 2 | Begin Low |
| 00:11.80 | Medium | −12 | 2 | −2 | 2 | Low to Medium |
| 00:11.90 | Medium | −6 | 0 | −1 | 0 | |
| 00:33.00 | High | −6 | 0 | −1 | 0 | Medium to High |
| 00:33.10 | High | 0 | 0 | 0 | 0 | |
| 00:52.30 | Medium | 0 | 0 | 0 | 0 | High to Medium |
| 00:52.40 | Medium | −6 | 0 | −1 | 0 | |
| 01:11.40 | High | −6 | 0 | −1 | 0 | Medium to High |
| 01:11.50 | High | 0 | 0 | 0 | 0 | |
| 01:32.10 | Medium | 0 | 0 | 0 | 0 | High to Medium |
| 01:32.20 | Medium | −6 | 0 | −1 | 0 | |
| 01:54.50 | High | −6 | 0 | −1 | 0 | Medium to High |
| 01:54.60 | High | 0 | 0 | 0 | 0 | |
| 02:14.40 | Medium | 0 | 0 | 0 | 0 | High to Medium |
| 02:14.50 | Medium | −6 | 0 | −1 | 0 | |
| 02:34.40 | High | −6 | 0 | −1 | 0 | Medium to High |
| 02:34.50 | High | 0 | 0 | 0 | 0 | |
| 02:54.50 | Medium | 0 | 0 | 0 | 0 | High to Medium |
| 02:54.60 | Medium | −6 | 0 | −1 | 0 | |
| 03:12.60 | High | −6 | 0 | −1 | 0 | Medium to High |
| 03:12.70 | High | 0 | 0 | 0 | 0 | |
| 03:33.10 | Medium | 0 | 0 | 0 | 0 | High to Medium |
| 03:33.20 | Medium | −6 | 0 | −1 | 0 | |
| 03:52.20 | High | −6 | 0 | −1 | 0 | Medium to Final High |
| 03:52.30 | High | 0 | 0 | 0 | 0 | |
| 04:13.70 | Medium | 0 | 0 | 0 | 0 | Final High to Medium |
| 04:13.80 | Medium | −6 | 0 | −1 | 0 | |
| 04:34.30 | Low | −6 | 0 | −1 | 0 | Medium to Low |
| 04:34.40 | Low | −12 | 2 | −2 | 2 | |
| 04:44.00 | Low | −12 | 2 | −2 | 2 | End |

Optimum time to end workout = 4:13.70

TABLE 2J exemplary equalization parameters stored in song edit data for an exemplary workout style (HIIT-20 S+) as defined in Table 3 for an exemplary edited song recording (Sequence 5 of Table 1).
Sequence #5 - Workout Style = HIIT-20 s+

| Time position | Burn rate | Vol db | Bass db | Mid db | Treb db | Trainer Sequence |
|---|---|---|---|---|---|---|
| 00:00.00 | Low | −20 | 3 | −4 | 3 | Begin Low |
| 00:11.80 | Medium | −20 | 3 | −4 | 3 | Low to Medium |
| 00:11.90 | Medium | −14 | 2 | −3 | 2 | |
| 00:33.00 | High | −14 | 2 | −3 | 2 | Medium to High |
| 00:33.10 | High | −6 | 0 | −1 | 0 | |
| 00:52.30 | Medium | −6 | 0 | −1 | 0 | High to Medium |
| 00:52.40 | Medium | −14 | 2 | −3 | 2 | |
| 01:11.40 | High | −14 | 2 | −3 | 2 | Medium to High |
| 01:11.50 | High | −4 | 0 | −1 | 0 | |
| 01:32.10 | Medium | −4 | 0 | −1 | 0 | High to Medium |
| 01:32.20 | Medium | −10 | 1 | −2 | 1 | |
| 01:54.50 | High | −10 | 1 | −2 | 1 | Medium to High |
| 01:54.60 | High | −3 | 0 | 0 | 0 | |
| 02:14.40 | Medium | −3 | 0 | 0 | 0 | High to Medium |
| 02:14.50 | Medium | −9 | 1 | −2 | 1 | |
| 02:34.40 | High | −9 | 1 | −2 | 1 | Medium to High |
| 02:34.50 | High | −2 | 0 | 0 | 0 | |
| 02:54.50 | Medium | −2 | 0 | 0 | 0 | High to Medium |
| 02:54.60 | Medium | −8 | 1 | −2 | 1 | |
| 03:12.60 | High | −8 | 1 | −2 | 1 | Medium to High |
| 03:12.70 | High | −1 | 0 | 0 | 0 | |
| 03:33.10 | Medium | −1 | 0 | 0 | 0 | High to Medium |
| 03:33.20 | Medium | −7 | 1 | −2 | 1 | |
| 03:52.20 | High | −7 | 1 | −2 | 1 | Medium to Final High |
| 03:52.30 | High | 0 | 0 | 0 | 0 | |
| 04:13.70 | Medium | 0 | 0 | 0 | 0 | Final High to Medium |
| 04:13.80 | Medium | −6 | 0 | −1 | 0 | |
| 04:34.30 | Low | −6 | 0 | −1 | 0 | Medium to Low |
| 04:34.40 | Low | −12 | 2 | −2 | 2 | |
| 04:44.00 | Low | −12 | 2 | −2 | 2 | End |

Optimum time to end workout = 4:13.70

TABLE 2K exemplary equalization parameters stored in song edit data for an exemplary workout style (HIIT 20S/10 S) as defined in Table 3 for an exemplary edited song recording (Sequence 5 of Table 1).
Sequence #5 - Workout Style = HIIT-20/10 s

| Time position | Burn rate | Vol db | Bass db | Mid db | Treb db | Trainer Sequence |
|---|---|---|---|---|---|---|
| 00:00.00 | Low | −12 | 2 | −2 | 2 | Begin Low |
| 00:11.80 | Medium | −12 | 2 | −2 | 2 | Low to Medium |
| 00:11.90 | Medium | −6 | 0 | −1 | 0 | |
| 00:21.80 | High | −6 | 0 | −1 | 0 | Medium to High |
| 00:21.90 | High | 0 | 0 | 0 | 0 | |
| 00:44.10 | Medium | 0 | 0 | 0 | 0 | High to Medium |
| 00:44.20 | Medium | −6 | 0 | −1 | 0 | |
| 00:52.30 | High | −6 | 0 | −1 | 0 | Medium to High |
| 00:52.40 | High | 0 | 0 | 0 | 0 | |
| 01:11.40 | Medium | 0 | 0 | 0 | 0 | High to Medium |
| 01:11.50 | Medium | −6 | 0 | −1 | 0 | |
| 01:19.50 | High | −6 | 0 | −1 | 0 | Medium to High |
| 01:19.60 | High | 0 | 0 | 0 | 0 | |
| 01:38.60 | Medium | 0 | 0 | 0 | 0 | High to Medium |
| 01:38.70 | Medium | −6 | 0 | −1 | 0 | |
| 01:47.40 | High | −6 | 0 | −1 | 0 | Medium to High |
| 01:47.50 | High | 0 | 0 | 0 | 0 | |
| 02:09.90 | Medium | 0 | 0 | 0 | 0 | High to Medium |
| 02:10.00 | Medium | −6 | 0 | −1 | 0 | |
| 02:18.10 | High | −6 | 0 | −1 | 0 | Medium to High |
| 02:18.20 | High | 0 | 0 | 0 | 0 | |
| 02:41.70 | Medium | 0 | 0 | 0 | 0 | High to Medium |

TABLE 2K-continued exemplary equalization parameters stored in song edit data for an exemplary workout style (HIIT 20S/10 S) as defined in Table 3 for an exemplary edited song recording (Sequence 5 of Table 1).
Sequence #5 - Workout Style = HIIT-20/10 s

| Time position | Burn rate | Vol db | Bass db | Mid db | Treb db | Trainer Sequence |
|---|---|---|---|---|---|---|
| 02:41.90 | Medium | −6 | 0 | −1 | 0 | |
| 02:49.50 | High | −6 | 0 | −1 | 0 | Medium to High |
| 02:49.60 | High | 0 | 0 | 0 | 0 | |
| 03:12.60 | Medium | 0 | 0 | 0 | 0 | High to Medium |
| 03:12.70 | Medium | −6 | 0 | −1 | 0 | |
| 03:20.80 | High | −6 | 0 | −1 | 0 | Medium to High |
| 03:20.90 | High | 0 | 0 | 0 | 0 | |
| 03:41.30 | Medium | 0 | 0 | 0 | 0 | High to Medium |
| 03:41.40 | Medium | −6 | 0 | −1 | 0 | |
| 03:52.20 | High | −6 | 0 | −1 | 0 | Medium to Final High |
| 03:52.30 | High | 0 | 0 | 0 | 0 | |
| 04:13.70 | Medium | 0 | 0 | 0 | 0 | Final High to Medium |
| 04:13.80 | Medium | −6 | 0 | −1 | 0 | |
| 04:24.70 | Low | −6 | 0 | −1 | 0 | Medium to Low |
| 04:24.80 | Low | −12 | 2 | −2 | 2 | |
| 04:44.00 | Low | −12 | 2 | −2 | 2 | End |
| Optimum time to end workout = 4:13.70 | | | | | | |

TABLE 2L exemplary equalization parameters stored in song edit data for an exemplary workout style (HIIT 20S/10 S+) as defined in Table 3 for an exemplary edited song recording (Sequence 5 of Table 1).
Sequence #5 - Workout Style = HIIT-20/10 s+

| Time position | Burn rate | Vol db | Bass db | Mid db | Treb db | Trainer Sequence |
|---|---|---|---|---|---|---|
| 00:00.00 | Low | −16 | 2 | −3 | 2 | Begin Low |
| 00:11.80 | Medium | −16 | 2 | −3 | 2 | Low to Medium |
| 00:11.90 | Medium | −10 | 1 | −2 | 1 | |
| 00:21.80 | High | −10 | 1 | −2 | 1 | Medium to High |
| 00:21.90 | High | −4 | 0 | −1 | 0 | |
| 00:44.10 | Medium | −4 | 0 | −1 | 0 | High to Medium |
| 00:44.20 | Medium | −10 | 1 | −2 | 1 | |
| 00:52.30 | High | −10 | 1 | −2 | 1 | Medium to High |
| 00:52.40 | High | −3 | 0 | 0 | 0 | |
| 01:11.40 | Medium | −3 | 0 | 0 | 0 | High to Medium |
| 01:11.50 | Medium | −9 | 1 | −2 | 1 | |
| 01:19.50 | High | −9 | 1 | −2 | 1 | Medium to High |
| 01:19.60 | High | −3 | 0 | 0 | 0 | |
| 01:38.60 | Medium | −3 | 0 | 0 | 0 | High to Medium |
| 01:38.70 | Medium | −9 | 1 | −2 | 1 | |
| 01:47.40 | High | −9 | 1 | −2 | 1 | Medium to High |
| 01:47.50 | High | −2 | 0 | 0 | 0 | |
| 02:09.90 | Medium | −2 | 0 | 0 | 0 | High to Medium |
| 02:10.00 | Medium | −8 | 1 | −2 | 1 | |
| 02:18.10 | High | −8 | 1 | −2 | 1 | Medium to High |
| 02:18.20 | High | −2 | 0 | 0 | 0 | |
| 02:41.70 | Medium | −2 | 0 | 0 | 0 | High to Medium |
| 02:41.90 | Medium | −8 | 1 | −2 | 1 | |
| 02:49.50 | High | −8 | 1 | −2 | 1 | Medium to High |
| 02:49.60 | High | −1 | 0 | 0 | 0 | |
| 03:12.60 | Medium | −1 | 0 | 0 | 0 | High to Medium |
| 03:12.70 | Medium | −7 | 1 | −2 | 1 | |
| 03:20.80 | High | −7 | 1 | −2 | 1 | Medium to High |
| 03:20.90 | High | −1 | 0 | 0 | 0 | |
| 03:41.30 | Medium | −1 | 0 | 0 | 0 | High to Medium |
| 03:41.40 | Medium | −7 | 1 | −2 | 1 | |
| 03:52.20 | High | −7 | 1 | −2 | 1 | Medium to Final High |
| 03:52.30 | High | 0 | 0 | 0 | 0 | |
| 04:13.70 | Medium | 0 | 0 | 0 | 0 | Final High to Medium |
| 04:13.80 | Medium | −6 | 0 | −1 | 0 | |
| 04:24.70 | Low | −6 | 0 | −1 | 0 | Medium to Low |
| 04:24.80 | Low | −12 | 2 | −2 | 2 | |
| 04:44.00 | Low | −12 | 2 | −2 | 2 | End |
| Optimum time to end workout = 4:13.70 | | | | | | |

TABLE 2M exemplary equalization parameters stored in song edit data for an exemplary workout style (AEROBIC) as defined in Table 3 for an exemplary edited song recording (Sequence 3 of Table 1).
Sequence #3 - Workout Style = Aerobic

| Time position | Burn rate | Vol db | Bass db | Mid db | Treb db | Trainer Sequence |
|---|---|---|---|---|---|---|
| 00:00.00 | Low | −10 | 1 | −2 | 1 | Begin Low |
| 00:33.00 | Medium | −10 | 1 | −2 | 1 | Low to Medium |
| 00:33.10 | Medium | −6 | 0 | −1 | 0 | |
| 01:03.40 | High | −6 | 0 | −1 | 0 | Medium to High |
| 01:03.50 | High | −3 | 0 | 0 | 0 | |
| 01:51.00 | Medium | −3 | 0 | 0 | 0 | High to Medium |
| 01:51.40 | Medium | −6 | 0 | −1 | 0 | |
| 02:22.20 | High | −6 | 0 | −1 | 0 | Medium to High |
| 02:22.30 | High | −3 | 0 | 0 | 0 | |
| 03:10.00 | High | −3 | 0 | 0 | 0 | High to Final High |
| 03:10.10 | High | 0 | 0 | 0 | 0 | |
| 03:43.00 | Low | 0 | 0 | 0 | 0 | Final High to Low |
| 03:54.00 | Low | 0 | 0 | 0 | 0 | End |
| Optimum time to end workout = 3:43.00 | | | | | | |

The result of the selected song edit data, including the equalization parameters and exercise burn rate pattern for each song title, may be, for example, a compiled list of song play instructions for an audio player that defines Title, Burn Rate, Start Time, Volume, Bass, Mid, Treble, End Time for each song segment played throughout the workout. When an audio player responds to the series of instructions in the compiled list, the workout music is generated fluidly without any disturbance in the audio as the player transitions from one instruction to the next within an edited song recording. Specifying Burn Rate in the compiled instructions is optional, but can be useful for display purposes or relaying the data to the exercise equipment, rather than just for the audio player itself. The equalization data is given in the example as Volume, Bass, Mid and Treble. In other examples, it can be any one or more of these. Trainer sequence information provides instructions on playing the trainer video or trainer audio with respect to the song segments arranged into edited song recording played during the workout. The registered locations of the beginning, verses, chorus and ending of an original musical recording may also be used to generate burn rate patterns following the musical structure and construct the equalization parameters for each workout style. For example, in the case of the rapid HIIT workouts, analysis of the vocal-only track fitting within the bass drum beat of the instrumental track may determine the optimum time to raise and lower the burn rate and equalization parameters. In some examples, interpreted knowledge of the song recording structure of an original musical recording, e.g. locations of the verses, choruses, intro and outro, gained from the computer-based analysis of the original musical recording as described herein (e.g. using the vocal-only track and the instrumental track), may be used as location timing points for creating alternative equalization parameters, burn rates and burn rate patterns for other workout styles like Aerobic and Interval-Lv0 and Interval-Lv1.

Definitions

A workout is defined herein as any form of physical activity performed for a designated period for physical fitness. A workout is, for example, but is not limited to, spinning on a stationary bicycle, jogging, walking, power walking, Zumba, palates, cross-country skiing, hiking, body building.

Workout music is a sequence of vocal and/or instrumental sounds combined over time and for playing during a workout. Workout music is also a combination of song sequences or song recordings arranged following the sequence of song titles selected by the user as user input.

An original musical recording is an electrical or mechanical inscription of sound waves corresponding to a harmonious sequence of musical notes. An original musical recording may be composed of both lyrics and instrumental sounds, or it may be acapella vocal work without instrumental music, or entirely instrumental. Original musical recordings may be of different genres, such as for instance, pop songs, disco songs, dance tracks, house tracks, electronic tracks, drum and bass tracks, jungle tracks, swing songs, dub mixes, song edits and remixes. The original musical recording is the original audio file that serves as the source of song recording data for creating the arrangement of song segments for each song title as described herein.

Each original musical recording may be composed of song recording data which may be a digital audio file with a designated audio file format and may be compressed or uncompressed with a specific codec, as is known in the art. Examples of audio coding formats may be, for example, WAV, AIFF, FLAC, Monkey's Audio, WavPack, Opus, MP3, Musepack, WMA, AAC, .M4A, .M4B, .M4P. The song recording data contains bits of information translating into the original musical recording when structured or interpreted, where the song recording data may be stored in memory (e.g. the workout music playback device's memory). Song recording data also includes song identification data on the original musical recording (e.g. the artist of the original musical recording, the title of the original musical recording, the length of the original musical recording, the album or EP or extended play name) as song recording metadata. The song recording metadata may also include data on the nature of the original musical recording, such as the range and fluctuation of volume of the original musical recording as a function of frequency and time, and corresponding volume correction parameters and equalizer parameters. The song recording metadata may also provide information on the length of the original musical recording, the title of the original musical recording and the name of the artist associated with the original musical recording. It will be appreciated that the song recording metadata may provide other information on the original musical recording without departing from the present teachings.

The original musical recording may be the audio portion of a video file. For instance, the original musical recording may be the song played on or with a music video. The video file may consist of a container format (e.g. describing how the data in the video file coexist) containing video data in a video coding format (e.g. VP8, VP9, VP6, H.264, H.265) and audio data in an audio coding format (e.g. AC3, AAC, Vorbis, Opus, MP3, Nellymoser, FLAC etc.). Both the audio data and the video data may be compressed. The song recording data may be the video file with both the audio data and the video data. The workout music playback device may contain a codec for decoding the compressed audio data and video data contained in the video file. The workout music playback device may play segments of both the audio file and the corresponding portion of the video file as a function of the song edit data for that original musical recording. For instance, when the trainer for a song title is set of 'Off' or the trainer is an audio-only based trainer and the original musical recording is or is tied to a music video, the video of the music video may be displayed in a screen display instead of the video trainer.

Each original musical recording has a specific designation, such as a name of the original musical recording, the name of the artist of the original musical recording, an album or EP name (this original designation stored, for instance, in the song recording metadata for each original musical recording). The artist is the creator of the original musical recording, such as the name of the singer, the group, the band or the disc-jockey. In the embodiments where the original musical recording may be a video file, the container format of the video file may contain the song recording metadata.

The song title corresponds to at least portions of the specific designation of each original musical recording, where the song title of the original musical recording may be composed of the name of the original musical recording and/or the name of the artist of the original musical recording. The song title may also include the album or EP name. Song title information on an original musical recording may be stored in the song recording metadata of the original musical recording. The song title information stored in the song recording metadata may be accessed to identify the song recording data of the original musical recording.

Each original musical recording has a predetermined play duration. The predetermined play duration, with a start time and a finish time, is the length of the original musical recording when played from start to finish.

Each original musical recording can be considered to be composed of song segments. A song segment is a portion of the original musical recording that can be defined by a specific time duration of the original musical recording.

There may be song edit data associated with each original musical recording. The song edit data may be a data file separate from the song recording data, providing information on arranging song segments of an original musical recording into different length song arrangements or edited song recordings of the original musical recording. The arrangement information may include the time intervals of the song segments to be arranged and the order of the song segments to be arranged for generating edited song recordings of the original musical recording. Each edited song recording of an original musical recording may be of the same beats per minute (i.e. the same tempo) as the original musical recording. The song edit data may also provide information on equalization parameters for each song segment in the arrangement of song segments. The equalization parameters can be the same for consecutive song segments. The equalization parameters defined in the song edit data may be provided as function of an exercise burn rate pattern, as explained herein, and/or a song recording structure. The song recording structure relates to the musical composition of the song recording, such as the start and finish of a verse in the song recording, the end of a melody, the beginning of a refrain, a change in the bass.

Figure 13:
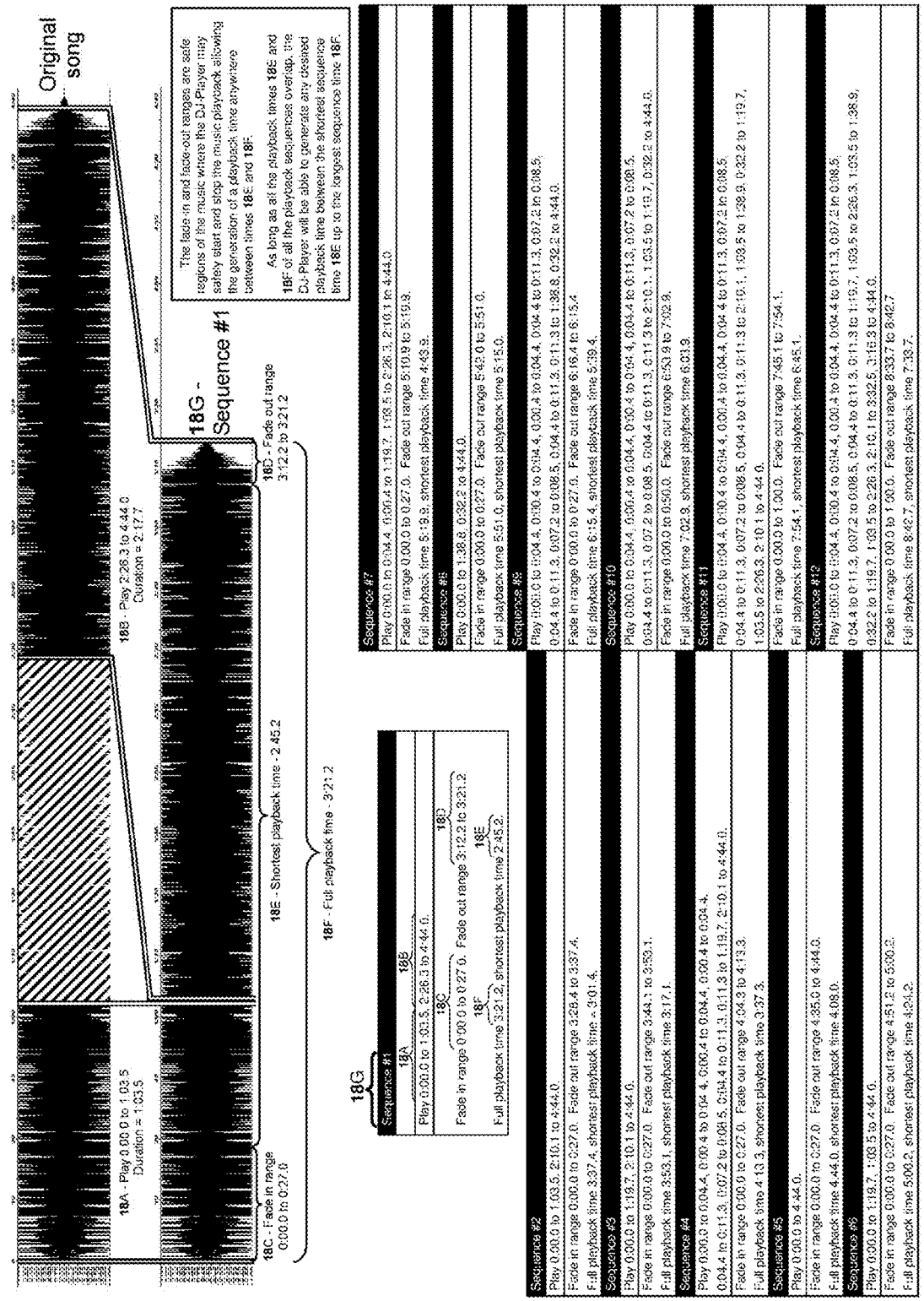
FIG. 13 is a visual representation of a sound wave of an exemplary edited song recording, with an exemplary intro and outro region and a table providing a set of exemplary arrangement of song segments of an original musical recording for producing different edited song recordings.

An edited song recording is defined as a song recording constituted from a specific arrangement of song segments of an original musical recording with specific equalization parameters, where the information on the arrangement of song segments and the equalization parameters are stored in the song edit data of its original musical recording. The edited song recording may be for playing in a stream of workout music. In some examples, the equalization parameters of the edited song recording may be dependent upon an exercise burn rate pattern. There may be multiple edited song recordings for a given original musical recording, each with a different length from the other, where each edited song recording may be composed of a different arrangement of song segments. As an example, the song edit data may contain information on arranging song segments from an original musical recording for producing different edited song recordings for a given original musical recording, where each of the edited song recordings of the original musical recording is of a different duration from the other edit song recordings of the original musical recording. The difference in duration between each of the edited song recordings of an original musical recording may be achieved by arranging the song segments differently for an original musical recording, where there is either repetition or removal of certain song segments of the original musical recording, this information on assembly stored in the song edit data. In some cases, it may be desirable to repeat or remove segments that correspond to what is a lyric verse or refrain of an original musical recording. For instance, FIG. 13 illustrates a visual representation of exemplary song edit data for arranging and outputting a plurality of different edited song recordings from an original musical recording. In the example of FIG. 13, there are twelve different length song recordings that (i.e. Sequences) may be composed from the song segments of the exemplary original musical recording. Each of the possible edited song recording of the original musical recording is of a different duration and is composed of a different arrangement of song segments of the original musical recording when compared to the other possible edited song recordings of the original musical recording.

Each different edited song recording may have a defined intro and outro portion. The intro of the edited song recording is a passage that opens the edited song recording, before the verse, the chorus or the refrain (in the case of song having verses and a refrain). The outro of the edited song recording is the conclusive portion of the edited song recording, where there may be repetition of thematic material from the edited song recording. Information regarding the portion of the edited song recording corresponding to the intro and outro portion may be found in the song edit data for generating each of the arrangement of song segments for each edited song recording, as the length and timing of the intro and outro portions may vary between each of the possible edited song recording (e.g. time markers corresponding to specific times when playing respectively each of the edited song recordings, where each time marker may identify, for instance, the ending of the intro portion of the specific edited song recording, the beginning of the outro portion of the specific edited song recording).

The song edit data may also provide cross-fade points for each of the possible edited song recordings that may be generated by the workout music playback device. In some other embodiments, the fade in time may be of 0.25 seconds, where the fade out time may be between 0 seconds to 3 seconds. The person skilled in the art will understand that the fade in and fade out time may vary without departing from the teachings of the present invention.

The song edit data may also contain information for each of the edited song recordings on an optimal point in the edited song recording to end a workout. The optimal point to end a workout may be associated to a time marker stored in the song edit data, each of the arrangement of song segments generating an edited song recording, the time marker positioned in some instances before the ending of the edited song recording that may be aligned with the end of the main workout portion. The portion of the edited song recording following the time marker indicating the optimal point to end the workout may be played in the cooldown portion of the workout. In some examples, the equalization parameters of the portion of the edited song recording played in the cooldown portion may be adjusted, such as by lowering the volume of certain frequency ranges. The length of the edited song recordings selected for the cooldown portion of the workout may also be adjusted as a result of adding, to the cooldown portion, the portion of the edited song recording after the optimal point to end the workout, or the time of the portion of the edited song recording played in the cooldown portion may be added to the cooldown time and the total time of the workout. In alternative embodiments, the optimal point to end a workout may mark a time where the play time of the edited song recording may be stopped early before if the edited song recording is the last song to be played for a given workout. In these examples, the optimal point to end the workout may mark a point in an edited song recording corresponding to a climatic portion of the edited song recording, so that the workout ends at the climax point in the playing of the edited song recording. In an alternative embodiment, the time marker corresponding to the optimal point to end the workout may be automatically generated by the workout music playback device by analyzing the song recording data and the song edit data. The workout music playback device may analyze the volume of different frequency ranges of the original musical recording, and the song edit data for each of possible arrangements of song segments of the original musical recording, add a time marker corresponding to a given time interval following the point in the arrangement of song segments where the volume at each of the different frequency ranges reaches a peak, followed by a drop in volume of given frequency ranges occurring after a fixed lapse of time in the play duration of the edited song recording.

The song edit data may also contain information relating to possible workout style selections for a given song title and original musical recording. The workout style information may vary for each of the edited song recordings, and there may be workout style information respective to each possible arrangement of song segments for a given original musical recording, so for each possible edited song recording, saved as part of the song edit data for the original musical recording. The song edit data on the workout styles may yield different exercise burn rate patterns for each of the workout styles, where there may be a different exercise burn rate pattern for each workout style, and for each of the possible edited song recordings. In some examples, the exercise burn rate pattern may also be generated from a generic exercise burn rate pattern for each workout style, where the generic exercise burn rate pattern is further tailored or adjusted as a function of song segmentation information contained in the song edit data. This tailoring may allow the exercise burn rate pattern, including the inflection and deflection of the associated equalization parameters, to follow the musical structure or composition of the edited song recordings or original song recordings, so that the equalization parameters do not change, for instance, in mid verse or mid stanza. The song edit data may contain information on the time markers corresponding to changes in the equalization parameters of the possible arrangement of song segments, as well as the equalization parameters between two time markers or for the different song segments of the arrangement of song segments. The different portions of the song edit data corresponding to the different workout styles may also contain song edit metadata, such as an identifier for extracting information relating to the workout style, such as the name of the workout style.

The song edit data may also contain information on assembling a given virtual trainer for the workout, such as by providing time markers corresponding to a change in the workout as a function of the exercise burn rate pattern. Each time marker may also be associated with additional information on the nature of the change in the workout, such as if the workout is transitioning from one burn rate to another, if a new workout style or burn time is to begin, or if an edited song recording corresponding to a given workout style or burn time, is finished. The virtual trainer information provides information on which video segment to retrieve for a given virtual trainer from a video source (where there are video segments corresponding to different changes in the workout), the time during which the video segment is played and the nature of the change in the workout. This information may lead to the assembly of a virtual trainer tailored to specific exercise burn rate patterns, and to the workout parameters.

The song edit data may also contain additional song edit metadata on the portions of the song edit data with instructions on each of the different arrangements of song segments. For instance, the song edit metadata may identify the location in song edit data with instructions on assembling an edited song recording of a specific length from the original musical recording. For example, the song edit metadata may contain an identifier for each possible arrangement of song segments for generating each of the edited song recordings, or provide a series of play duration numerals, where each play duration numeral is associated to one of the arrangement of song segments for an original musical recording. In this example, when the workout music playback device seeks to add an arrangement of song segments of a given original musical recording closest to a specific length, the workout music playback device may access the song edit metadata corresponding to the original musical recording and identify the song edit data for producing the arrangement of song segments of the desired play duration. The song edit metadata may then indicate the location of the song edit data corresponding to the song segment arrangement information for creating the edited song recording with the specific play duration.

In alternative embodiments, a database of audio files with each of the possible edited song recordings of an original musical recording may be provided, where a workout music playback device may select from the audio files for each of the edited song recordings depending on the user input and the workout configuration. The digital audio files for the edited song recordings has a designated audio file format and may be compressed or uncompressed with a specific codec. Examples of audio coding formats may be, for example, WAV, AIFF, FLAC, Monkey's Audio, WavPack, Opus, MP3, Musepack, WMA, AAC, M4A, M4B, M4P. The digital audio file of each of the edited song recordings contains bits of information which may be translated into each of edited song recordings when structured or interpreted, where the audio files may be stored in memory (e.g. the workout music playback device's memory or an external memory drive, accessible wirelessly or through a wired connection by the workout music playback device).

Master song edit metadata may also be provided for each portion of the song edit data corresponding to an original musical recording. The master song edit metadata may provide information with respect to the song edit data corresponding to an original musical recording. Such information may include equalization parameters for all of the possible edited song recordings of the original musical recording, the equalization parameters including volume parameters for a given range of frequencies of the original musical recording. The master song edit metadata may also include, for example, information on the tempo of the edited song recordings of the original musical recording and an identifier for the song edit data of an original musical recording (e.g. name of the artist, name of the album or EP, the song title information of the original musical recording).

Each original musical recording may have a different average treble level or bass level. Treble corresponds to the tones of the original musical recording at a higher frequency range where bass correspond to the tones of the original musical recording at a lower frequency range. Therefore, equalization between the original musical recordings involves adjusting the balance between the different frequency ranges within an electronic signal of the song segment, such as adjusting the frequency range of the bass of the original musical recording and the treble of the original musical recording by using linear filters. Equalization involves adjusting the amplitude of audio signals at different frequencies. Equalization may be used to adjust (i.e. increase or decrease) the prominence of different frequency ranges within an original musical recording, such as by adjusting the bass or the vocal component within the original musical recording.

Equalization parameters are settings regulating the balance and volume for different audio frequency ranges of song segments in an arrangement of song segments of an original musical recording. The equalization parameters of an edited song recording may vary as a function of the time in the edited song recording. The equalization parameters may include at least one time marker, where each time marker indicates a change in the equalization of the arrangement of song segments. The equalization parameters may be the global volume (for all of the audio frequencies) of each song segment of the arrangement of song segments yielding a given edited song recording. The equalization parameters may be adjusted in a stream of workout music by the workout music playback machine in accordance with the exercise burn rate pattern. For instance, when the burn rate is low, then the bass parameter of the original musical recording may be reduced. However, as the burn rate increases to medium or high, in accordance with exercise burn rate pattern, so may certain equalization parameters increase as a function of the burn rate. For instance, at a medium burn rate, the bass level of the equalization parameters, corresponding to, for example, that of the percussions, may also increase, therefore increasing the volume of the percussions in the song while maintain the treble, associated to, for example, the vocals, at the same level. In another example, at a higher burn rate, the treble level of the equalization parameters, corresponding to, for example, the vocals, may also increase, therefore increasing the volume of the vocals while maintaining the bass level associated to, for example, the percussions. In some other examples, both the treble and the bass level may be increased by adjusting the equalization parameters. Equalization parameter information may be specific to each song segment in a given arrangement of song segments. In other embodiments, the equalization parameters may be independent from the exercise burn rate pattern, where a change in the burn rate as a function of time may not entail a corresponding change in the equalization parameters of the arrangement of song segments at the same time markers indicating a change of burn rate. In some examples, the equalization parameters may provide that the volume of the arrangement of song segments increases steadily and gradually throughout the play duration of the arrangement of song segments, where the volume at the end of the arrangement of song segments is greater than the volume at the beginning of the arrangement of song segments.

A stream of workout music may be defined as a continuous stream of edited song recordings with a defined sequence (the sequence corresponding to a selection generated by user or auto-generated by, for example, the workout music playback device). The stream of workout music may correspond to a selection of song titles made by the user. A stream of workout music is also a stream of digital audio data associated with a designated length of workout music. The stream of workout music may be determined based on the parameters of the workout as part of the user input entered by the user into the user input interface.

A sequence is defined as a specific order of edited song recordings for a specific workout upon, for instance, a selection of song titles made by a user, where each song title corresponds to an original musical recording. In some examples, a sequence may be composed of a single edited song recording corresponding to a single song title. In other embodiments, a sequence may be composed of multiple edited song recordings each corresponding to a given song title. An edited song recording or different edited song recordings corresponding to a single song title may appear more than once in a sequence.

In some embodiments, the sequence may be composed of at least one sub-sequence of song titles. Each of the sub-sequences may be associated with a given core portion of the workout. The core portion of the workout is based on the phase of the workout and may be divided into the warm up, the main workout and the cooldown. Other exemplary workouts may have another core portion, such as a stretching core portion, or a second main workout portion following a rest period that comes after the first main workout core portion.

In an exemplary embodiment of a workout where there are three core portions as described herein, there may be three sub-sequences of song titles, where each of the three sub-sequences of song titles is associated with a given core portion of the workout. A first warm up sub-sequence corresponds to a sub-sequence of song titles for playing during a warm up in a workout. The warm up portion of the workout is a preparation for physical exertion by exercising gently beforehand. A second main workout sub-sequence is a sub-sequence of song titles for playing during the main portion of the workout, the principal exercise or training portion with usually the greatest energy output. A third cooldown sub-sequence is a sub-sequence of song titles for playing during a cooldown portion of the workout. The cooldown is the portion of the workout routine for allowing physiological activity to gradually return to normal after a more strenuous portion of a workout routine by engaging in less strenuous exercise. In some embodiments, the sequence may be composed of an additional sub-sequence of song titles for a stretching period following the workout.

The song database is composed of a list of song titles, each of these song titles associated with an original musical recording that has corresponding song edit data. These song titles may be stored in the memory on the workout music playback device. The original musical recordings (as well, in some examples, as the song edit data) may also be stored and accessible via cloud storage (i.e. data storage where digital data is stored in logical pools). In an alternative embodiment, the song titles may also correspond to original musical recordings accessible via streaming, wherein for instance a music application software stored in the memory of the workout music playback device provides the user with a library of song titles, where each of the song titles corresponds to an original musical recording that may be streamed. The user may import the library of song titles, or portions thereof, or the library of song titles may be accessible via an interface on the workout music playback device, where the song titles may be selected by the user for producing a stream of workout music by providing a selection of song titles. In this example, the workout music playback device preferably has a wireless interface for establishing a wireless connection (e.g. WiFi connection) for streaming or downloading the original musical recordings via the music application software. In other embodiments, the user may switch, when selecting the user's song titles, between those of original musical recordings stored on the user's computing device, and those that are streamed wirelessly. For instance, the user may provide a selection of song titles A, B, C and D, where the original musical recordings of song titles A and C are retrieved from the user's smartphone's memory, and original musical recordings of song titles B and D can be streamed wirelessly from, for instance, a remote server.

The user may be allowed, prompted or invited to specify a selection of song titles or other information for generating a workout configuration, thereby providing user input. By specifying a selection of song titles, the user is choosing a list of song titles associated with original musical recordings the user desires to listen to during a workout. In some embodiments, the specification of a selection of song titles also includes a designated order. In other embodiments, the order of song titles is not specified by the user. The user may specify a selection of song titles by scrolling through a list of song titles displayed on a display of the workout playback device and selecting the desired song titles. It will be appreciated that the specification of the selection of song titles may be performed by other means. Furthermore, in alternative embodiments, the user may also choose to input a random selection option available in the workout music playback device, where the workout playback device runs a set of instructions to automatically specify a selection of song titles. The workout music playback device may also provide the automatically generated list of song titles to the user for the user's approval, where the list of song titles may appear, for example, on the screen display of the workout playback device. The user may then choose to accept or dismiss the automatically generated selection of song titles. If the user dismisses the automatically generated selection of song titles, the user may then choose to request that the workout playback device generate a new automatically generated selection of song titles or the user may provide the user's own input to specify a selection of song titles. The user input may also specify a musical genre to be played during the workout. The musical genre input may, for instance, lead to sorting of the song titles listed in, for example, a scroll menu of song titles of the song database, leaving only the song titles sharing the designated musical genre available for further selection by the user.

The user input may also include the length of the workout as a measure of time.

The user may also select a workout style from, for instance, a workout style database. The user may select a workout style for a given song title. In an alternative embodiment, the user may select a workout style for an entire workout. A workout style relates to the nature of the training pattern and the fluctuations in intensity during the course of a specific period in the workout, such as a time interval in the workout. For example, workout styles may be used in interval training, where each interval marks at least one different period with a given burn rate. An example of a workout style is high intensity interval training, where the user may switch between periods of high intensity and medium intensity exercise over time. Another example of a workout style is a gradient interval training, where the burn rate gradually increases during the course of the time interval. Yet another example of workout style is an aerobic interval, where there is a fluctuation between low intensity, medium intensity and high intensity exercise during the course of a time interval. A skilled person will readily recognize that a workout style may be any pattern in the fluctuation of the burn rate over time in the workout. The workout style may be selected for a designated length of time during the workout. The user may associate a specific exercise workout style with each song title in the sequence of song titles. For instance, Table3A provides a list of exemplary selection of workout styles that a user may select for different workout portions, each workout portion corresponding to a song title:

TABLE 3A exemplary workout styles that may be selected by a user when input the parameters for a given workout.

| Workout Styles | Description |
| --- | --- |
| Low-Burn | The entire edited song recording is set to a low burn rate. There are no audio volume effects associated with this workout style, the music will play at 1 volume level. This level is also generally used for warm-up/cool-down stages. See FIG. 6A. |
| Medium-Burn | Except for the outro, the edited song recording is set to a medium burn rate. There are no audio volume effects associated with this workout style, the music will play at 1 volume level. See FIG. 6B. |
| High-Burn | Except for the outro, the edited song recording is set to a high burn rate. There are no audio volume effects associated with this workout style, the music will play at 1 volume level. See FIG. 7A. |
| Aerobic | The interval burn rate and sound volume will cycle between the 3 levels for the intro, verse, chorus, solo, and outro sections of the edited song recording, with additional volume steps for the final verse and chorus. See FIG. 7B. |
| HIIT-10 s and HIIT-10 s+ | The edited song recording begins and ends with a low burn rate. Waiting for vocals to begin or end, or for the right beat, there is an approximate 10 second high to 10 second low burn rate period pattern. The volume effect's level follows the high to low burn rates. For 'HIIT-10 s+', the volume effects ease-in at the beginning of playback, increasing in steps up to 100% for the final burn at the edited song recording's finale. See FIG. 9A and 9B. |
| HIIT-20 s and HIIT-20 s+ | The edited song recording begins and ends with a low burn rate. Waiting for vocals to begin or end, or for the right beat, there is an approximate 20 second high |

TABLE 3A-continued exemplary workout styles that may be selected by a user when input the parameters for a given workout.

| Workout Styles | Description |
| --- | --- |
| | to 20 second low burn rate period pattern. The volume effect's level follows the high to low burn rates. For 'HIIT-20 s+', the volume effects ease-in at the beginning of playback, increasing in steps up to 100% for the final burn at the edited song recording's finale. See FIG. 10A and 10B. |
| HIIT-20/10 s and HIIT-20/10 s+ | The edited song recording begins and ends with a low burn rate. Waiting for vocals to begin or end, or for the right beat, there is an approximate 20 second high to 10 second low burn rate period pattern. The volume effect's level follows the high to low burn rates. For 'HIIT-20/10 s+', the volume effects ease-in at the beginning of playback, increasing in steps up to 100% for the final burn at the edited song recording's finale. See FIG. 11A and 11B. |
| Interval Lv0 | Except for the outro, this edited song recording's burn rate is medium. The volume (equalization parameters) begins low, increasing in time with each verse and chorus, up to 100% at the end of the edited song recording. See FIG. 8A. |
| Interval Lv1 | The edited song recording begins with a medium burn rate. The last chorus and verse is at a high burn rate. The volume effect starts very low, stepping up to only 25% just before the last verse and chorus. For the beginning of the high burn rate portion, the volume steps size increases and does so at every 2 lines sung. See FIG. 8B. |

The burn rate is the level of exercise intensity for a given period. The burn rate may be tied, for instance, to calorie consumption of the user as a result of the exercise performed. For example, a low burn rate may be tied to a low calorie consumption rate or a low level of exertion, a medium burn rate associated to a medium calorie consumption rate or a medium level of exertion, and a high burn rate associated with a high calorie consumption rate or a high level of exertion. Therefore, the low burn rate is associated with low level of exercise intensity, such as that of a warm up portion, cool down portion, or recovery or relaxation period of a workout. The medium burn rate is tied to a higher level of exercise intensity than the low burn rate, and may be associated with the core workout portion. The high burn rate is tied to a higher level of exercise intensity than the medium burn rate, may be associated with the core portion of the workout. It will be appreciated that there may be other burn rates without departing from the present teachings.

Each edited song recording in the workout may be associated to an exercise burn rate pattern. Each workout style may be associated with an exercise burn rate pattern. An exercise burn rate pattern is an overall pattern of the change in the burn rates at different time markers for a given edited song recording and a given workout style. For example, the exercise burn rate pattern may fluctuate as a function of at least three burn rates over a course of the portion of the workout with a specific workout style, and there may be an exercise burn rate pattern providing a specific sequence of intervals of different burn rates during intervals of designated lengths. Each possible workout style for each given arrangement of song segments may have its own distinct exercise burn rate patterns.

The exercise burn rate pattern may therefore depend on the workout style. As an example, if the workout style is a high intensity interval training interspersed every 10 seconds, the exercise burn rate pattern may correspond to 10 seconds of high intensity exercise followed by 10 seconds of medium intensity exercise, this sequence repeated during the course of the workout associated with the high intensity interval training workout style. As a song title may be associated with a given workout style as explained herein, so will each song title be associated with a given exercise burn rate pattern. Once a workout style, and also its corresponding exercise burn rate pattern, is associated with each song title in the sequence of song titles, the assembled set of exercise burn rate patterns for the sequence of song titles yields a global exercise burn rate pattern for the workout.

In some embodiments, the equalization parameters may vary as a function of the exercise burn rate pattern, where, for example, an increase in the burn rate may also increase the volume of certain frequency ranges of the equalization parameters. Similarly, a decrease in the burn rate may also decrease the volume of certain frequency ranges of the equalization parameters. In other embodiments, the equalization parameters may be independent from the exercise burn rate pattern, where a change in the exercise burn rate pattern may not entail a change in the equalization parameters. For instance, the equalization parameters may vary gradually during a high burn rate interval, where the volume increases gradually throughout the high burn rate interval. In some embodiments, a gradual decrease or increase in volume may be in 2, 4, 6, 8 or larger decibel steps for providing a non-smooth stepping ramp up or down in volume which can help cue and motivate the user instead of a subliminal smooth transition which goes unnoticed while exercising.

In some examples, the information on the exercise burn rate pattern may also include instructions that may be received and performed by certain exercise machines, these instructions permitting, for instance, for adjusting the exercise difficulty parameters of the exercise machine. For example, the instructions may pertain to increase or decrease the resistance of a stationary bike, the speed and/or inclination of a treadmill or the resistance of a stationary rowing machine. Instructions to increase or decrease the exercise difficulty parameters of the exercise machine may be transmitted from the workout music playback device as a function of the exercise burn rate pattern, where an increase in the burn rate at a specific time marker in the exercise burn rate pattern may prompt the workout music playback device to transmit instructions to increase the exercise difficulty parameters of the exercise machine, such as those described above tied to the intensity of the user's workout. Similarly, a decrease in the burn rate at a specific time marker in the exercise burn rate pattern may prompt the workout music playback device to transmit instructions to decrease the exercise difficulty parameters of the exercise machine, such as those described above tied to the intensity of the user's workout.

Once the user input is provided, the media output manager receives a workout configuration based upon the user input. The workout configuration is a set of parameters that may be stored in memory and are then processed, such as by using a processor of the media output manager, by the workout playback device to generate a given stream of workout music.

Workout Music Playback Device 100:

Reference will now be made to the drawings.

FIG. 1 is a modular representation of an exemplary workout music playback device 100. The music playback device 100 has a memory 125. The memory 125 stores a song database 108 composed of song titles 112 where each of the song titles 112 is associated with an original musical recording 110 and song edit data 101. The memory 125 also stores the song recording data, and song recording metadata of the original musical recordings 110 for each song title 112 in the song database 108. In some embodiments, the song recording data and song recording metadata may be stored on memory separate from the song edit data 101 and the song database 108.

The memory 125 also stores song edit data 101 corresponding to each of the original musical recordings 110. A workout style database 109 may be generated from the song edit data 101, where the song edit data 101 may contain information relating to each of the possible workout styles that may be selected by a user. In another example, the memory 125 may store a separate list of workout styles and/or burn times, not generated from the song edit data 101 but containing the same workout styles and burn times as in the song edit data 101, where the separate list of workout styles and/or burn times may be accessed by the user in the form of a workout style database 109. The memory 125 may be, for instance, that of the workout music playback device 100, an external memory drive, or a form of cloud storage. The memory 125 of the music playback device 100 may be any form of computer hardware for storing information in a computer. Memory 125 may be, for example, random-access memory or a hard drive.

The workout music playback device 100 also has a media output manager 106A, an instruction relay module 106B, a screen display 102 an audio output interface 105, a media output generator 120, optionally an exercise machine interface 104 and, optionally, a video source 140.

The media output manager 106A receives user input 114 from the user input interface 107 in the form of data (received by the media output manager 106A as a given workout configuration 103). While processing the user input 114, the media output manager 106A retrieves from memory 125 the song edit data 101 corresponding to the user input 114 and transmits information on the arrangements of song segments to be assembled to the instruction relay module 106B which instructs the media output generator 120 to create the stream of workout music 111. The information on the arrangement of song segments transmitted by the media output manager 106A may include the song title 112 of the original musical recording 110 that is to be played, the song segment of the original musical recording 110 that is to be played at a given time marked by its starting time in the original musical recording 110, the corresponding equalization parameters to be applied to the song segment, and the stop time (the period marking the end of a song segment).

More specifically, when the user begins the workout, as the media output manager 106A receives the workout configuration 103 from namely the user input interface 107, the media output manager 106A processes the workout configuration 103 and retrieves from memory the song edit data 101 corresponding to the song titles 112 selected by the user as part of the workout configuration 103. The media output manager 106A determines the play duration of each song title 112 in the stream of workout music 111 as described herein. After calculating the play duration for each song title 112, the media output manager 106A retrieves the song edit data 101 corresponding to that play duration for the given song title 112. The retrieval of song edit data 101 may be achieved by the media output manager 106A accessing first the master song edit metadata corresponding to the desired song title 112, such as by comparing the identifier stored in the master song edit metadata with the song title 112 stored in the workout configuration 103 (e.g. such as by parsing the characters of the song title 112 and comparing the song title 112 with the identifier information of the master song edit metadata). The media output manager 106A then may access the song edit metadata to identify the correct portion of song edit data providing instructions for yielding an arrangement of song segments for a given song title 112 closest to the sought after play duration for the song title 112 (by analyzing the time duration metadata existing for each possible arrangement of song segments).

The media output manager 106A may also access from the song edit data 101 the corresponding workout style information corresponding to the workout style 114c selected by the user for a given song title 112. This retrieval may be achieved by accessing the song edit metadata with the identifiers and memory locations for each of the workout styles for a specific arrangement of song segments of an original musical recording 110. Retrieval of the workout style information may include retrieval of an exercise burn rate pattern 113 for a given arrangement of song segments, providing information, for example, on the change in the burn rate for the duration of the arrangement of song segments as a function of time. The workout style information may also include equalization parameters for each song segment in the arrangement of song segments as well as time markers indicating a change in the equalization for the segments of the arrangement of song segments. In some examples, the exercise burn rate pattern 113 may set the burn rate for specific song segments and the volume equalization may also vary for the same song segments. In other examples, the change in burn rate may occur at different time markers of song segments than those indicating a change in the equalization parameters.

The information regarding the exercise burn rate pattern 113 may be processed and converted into a visual representation of the exercise burn rate pattern 113 displayed on, for instance, a screen display 102 as explained herein. Furthermore, the media output manager 106A may also provide instructions for generating an image on a screen display 102, the image corresponding to a workout user interface 500 or a user input interface 107.

The media output manager 106A sends the information retrieved from the song edit data 101 (e.g. song title 112, the corresponding song segment of the original musical recording 110 to be played, e.g. the start and stop time for the given song segment) to the instruction relay module 106B. The information transmitted by the media output manager 106A may be sent punctually and continuously throughout the course of a playing workout and as a function of the current time data provided by the media output generator 120 to the instruction relay module 106B.

The instruction relay module 106B is a module for receiving the information provided by the media output manager 106A (e.g. the song title 112 of the song recording data that is to be accessed for retrieving song recording data, the song segment of the original musical recording 110 to be played, with the start and stop time markers for that song segment, the equalization parameters for that song segment, and in some cases the time marker corresponding to the optimal time to end a workout) and transmits the information in the form of audio output instructions to the media output generator 120. The instruction relay module 106B may also receive from the media output generator 120 the current time (e.g. timing data) in the streaming of the workout music 111 and may transmit the current time information to the media output manager 106A. The current time may provide information on when audio output instructions regarding the next song segment is needed to be transmitted for generating a fluid stream of workout music 111 without delay between the song segments. As the media output generator 120 generates the stream of workout music 111, the instruction relay module 106B will continue to transmit the audio output instructions, provided by the media output manager 106A, such as the next song segment to be added to the stream of workout music 111 (and its equalization parameters), to the media output generator 120 as a function of time (e.g. triggered by the current time information received by the media output manager 106A from the instruction relay module 106B, sent from the media output generator 120, prompting for the transmission of the next audio output instructions). In some examples, the current time data received by the media output manager 106A allows for the audio output instructions to be transmitted for processing while the stream of workout music 111 is playing, without delay between the song segments.

The media output generator 120 functions as a music streamer. The media output generator 120 receives audio output instructions from the instruction relay module 106B, processes the audio output instructions, and retrieves from memory the song recording data, by for instance accessing the song recording metadata, for each of original musical recordings 110 corresponding to the song titles 112 identified in the audio output instructions, this information generated from the media output manager 106A. For instance, the audio output instructions may provide the media output generator 120 information on which original musical recording 110 to be played using an identifier, the song segment of the original musical recording 110 to be played with a first time stamp indicating at which point the original musical recording 110 should start playing as well as a time during which the original musical recording 110 is to play, stopping once the time has lapsed (e.g. stop time). The media output generator 120 may then retrieve the song recording data corresponding to the song segment of the original musical recording 110 to be played. The media output generator 120 may have specific codecs for compressing/decompressing the song recording data. The media output generator 120 may also have a digital signal processor (DSP) for processing data, such as the song recording data to be played in the stream of workout music 111, in real-time.

The audio output instructions may also include information on the equalization parameters for a given song segment of the original musical recording 110, providing the player with instructions regarding the volume parameters to be set for the song segment for different frequency ranges. The media output generator 120 receives a stream of audio output instructions from the instruction relay module 106B, where the media output generator 120 fluidly retrieves the song segments from the original musical recordings 110 in accordance with the instructions and plays the song segments, the arrangement of song segments yielding a continuous stream of workout music 111 with tailored equalization parameters corresponding to an exercise burn rate pattern 113.

The stream of workout music 111 may then be sent in, for example, digital format by the media output generator 120 to the audio output interface 105 of the workout music playback device 100. The audio output interface 105 of the workout music playback device 100 may be a speaker integrated into the music playback device 100. The audio output interface 105 of the workout music playback device 100 may also be an audio port for plugging in an audio jack of, for example, headphones or an external speaker (or a wireless interface wireless connected to a pair of digital headphones). The digital signal may then be converted to an analog signal. In an alternative embodiment, the audio output interface 105 may be external to the workout music playback device 100. For instance, the audio output interface 105 may be a set of external speakers, such as those of a television, a radio system, a computer, an exercise machine, or standalone speakers. The audio file data associated with the stream of workout music 111 may be sent wirelessly via, for instance, a WiFi connection, from the wireless interface of the workout music playback device 100 to the wireless interface of the external audio output interface. The digital audio file data, received may then be converted by the external audio output interface to an analog signal.

Figure 16:
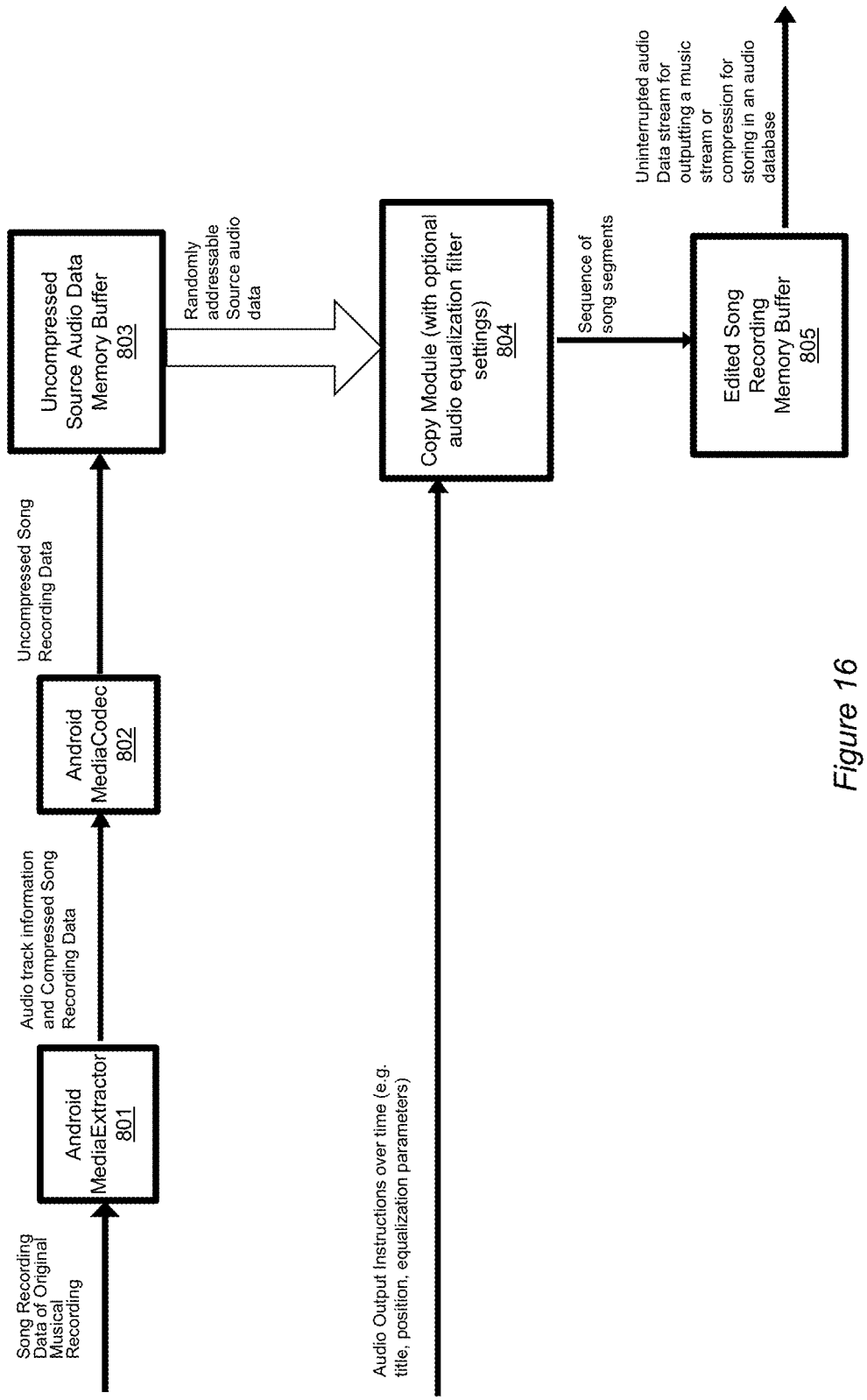
FIG. 16 is a block diagram of an exemplary media output generator of an exemplary workout music playback device.

Reference is now made to FIG. 16, showing a block diagram of an exemplary media output generator 120 configured for an Android-based computing device, such as an Android phone or Android tablet. The media output generator 120 retrieves from memory, such as memory 125, the song recording data of an original musical recording 110 as a function of the audio output instructions, the audio output instructions providing instructions that are read and processed by the media output generator 120 on which song recording data to retrieve. The retrieval from memory may be done using the AndroidMediaExtractor 801 function, native to the Android OS, used, for example, to facilitate extraction of media data from a data source. The retrieved song recording data may be in a compressed format and may contain additional metadata relating to the song recording data, such as audio track information. The compressed song recording data is then decompressed using, for instance, AndroidMediaCodec 802, a function native to the Android OS for encoding and decoding, used to access media codecs. Additional media codecs may be added to the AndroidMediaCodec 802. AndroidMediaCodec 802 decompresses the compressed song recording data with a designated codec as a function of the compression format of the song recording data. The uncompressed song recording data may then be stored in an uncompressed source audio data memory buffer 803, such as a non-volatile memory (e.g. random access memory). As a function of the audio output instructions, song segments corresponding to designated play durations of the original musical recording are copied from the uncompressed song recording data stored in the uncompressed source audio data memory buffer 803 by a copy module 804. Equalization parameters may also be applied by the copy module 804 (e.g having optional audio equalization filter settings) as a function of the audio output instructions. In some embodiments, the equalization parameters may be applied using a linear filter. In some embodiments, a multiplier or modulator may be used to increase or decrease certain equalization parameters, such as the volume. In some embodiments, a discrete cosine transform to isolate frequency components that are subject to equalization may be used. In other embodiments, high and low pass filters may be used to attenuate certain frequency ranges that are allowed to pass by the filters.

The copied song segment is then stored in the edited song recording memory buffer 805. The edited song recording memory buffer 805 may be non-volatile memory (e.g. random access memory). A second copied song segment may then be added in the edited song recording memory buffer 805 after the first copied song segment. A third copied song segment may then be added after the second copied song segment, and so forth. The result is a path in memory for storing an assembled sequence of media data of song segments for producing an edited song recording as a function of the audio output instructions. The media data of the edited song recording may then be extracted from the edited song recording memory buffer 805 and outputted as a stream of media data for playing workout music, or alternatively, extracted from the edited song recording memory buffer 805 and compressed using a specific codec for storing the audio file corresponding to the edited song recording in an audio file database, such as the audio file database 141 illustrated in FIG. 2. The person of ordinary skill in the art will readily recognize that the media output generator 120 of, for instance, FIG. 16 may be adapted to other computer systems than that of an Android computing device without departing from the present teachings.

The workout music playback device 100 may optionally have an exercise machine interface 104 for establishing a connection with an exercise machine. The connection between the exercise machine and the exercise machine interface 104 may be a wired connection or a wireless connection (e.g. WiFi, Bluetooth). The exercise machine interface 104 may be connected to the media output generator 120, for receiving, for instance a stream of audio data which may be transmitted to, for example, at least one exercise machine. The exercise machine interface 104 may also be connected to the media output manager 106A, where the exercise machine interface 104 may, for instance, transmit input provided from a user using an exercise machine to the media output manager 106A, relaying the input data from the exercise machine to the media output manager 106A. The media output manager 106A may also transmit instructions to the exercise machine interface 104 such as input provided by the user using the user input interface 107 to manage certain features of the exercise machine. The exercise machine interface 104 may then transmit these instructions as data to the exercise machine, the exercise machine executing the instructions upon their receipt and processing. In some examples, the workout music playback device 100 may also allow the user to control remotely certain aspects of the workout machine, such as its difficulty adjustments. For instance, the user may adjust the incline or the speed of a treadmill, or the resistance of a stationary bike. In other examples, the user input may be to adjust the volume of the music being produced by the exercise machine, where the volume controls of the stream of workout music are provided on a console of the exercise machine.

The exercise machine interface 104 may have both a receiver and a transmitter. The transmitter of the exercise machine interface 104 may transmit to an exercise machine, for instance, input provided by the user via the workout music playback device 100. The transmitter of the exercise machine interface 104 may also transmit the audio data stream corresponding to a stream of workout music 111 generated by the media output generator 120. The receiver of the exercise machine interface 104 may receive input from a user using the exercise machine, such a volume control of the music, where this input may be sent as data to the media output manager 106A. The media output manager 106A may tailor the information on the arrangement of song segments sent to the instruction output relay 106B as a function of the user input received via the exercise machine interface 104. For example, if the user provides input via an exercise machine to increase the overall volume, the media output manager 106A may adjust the equalization parameter information sent to the instruction relay module 106B to increase the volume of the generated stream of workout music 111.

In some embodiments, the workout music playback device 100 may also have a biometric reader interface 118 for connection with at least one biometric reading device via a wireless connection, such as a Bluetooth connection. In some examples, the connection may be wired. The biometric reading device may read biometrics of a user such as body temperature, heart rate, blood pressure and sweat of a user during a workout, and this information may be sent wirelessly to the workout music playback device 100 or to an external server as information related to the workout that can be later on viewed by the user in correlation with the user's workout selection, such as with respect to the exercise burn rate pattern 113, the song selection 114*b*, etc. Examples of biometric reading devices may be, but not limited to, smart watches, heart rate monitors, fitness trackers, biometric smart clothing, GPS receivers and accelerometers, etc. In some examples, the biometric reader may be part of the workout music playback device 100, where the interface 118 provides for communication between the biometric reader of the workout music playback device 100 and the other components, as the case may be, of the workout music playback device 100.

Data received by the workout music playback device via its biometric reader interface 118 from the biometric readers may perform the same or similar functions as the accelerometer as described herein.

In some examples, the workout music playback device 100 may have an accelerometer interface 117 for connecting to an accelerometer and for receiving data generated by the accelerometer. The connection between the accelerometer (or an interface of the accelerometer) and the accelerometer interface 117 may be wired or wireless. Such data may include acceleration information. In some examples, the accelerometer may be part of the workout music playback device 100.

In some examples, the readings from the accelerometer may be used in conjunction with a biometric reader to further refine the adjustment of equalization parameters, audio or visual cues performed by the virtual trainer, etc., during the course of a workout.

In some examples, the workout music playback device 100 may have a GPS interface 116 for connecting to a GPS, and receiving geolocation and/or time data generated by the GPS. The connection between the GPS (or an interface of the GPS) and the GPS interface 116 may be wired or wireless. In some examples, the GPS may be part of the workout music playback device 100.

In some examples, the workout music playback device 100 may be adapted to tailor the length of song recordings associated to the song titles selected for a given workout as a function of geolocation data generated by the GPS. The media output manager 106A may be adapted to receive from the GPS, via the GPS interface 116, geolocation data during the course of a workout. The geolocation data allows the mapping of a route taken by a user when the workout involves a physical displacement (e.g. when jogging; bicycling; kayaking; rollerblading; etc.) The mapping information may be stored in memory along with the workout configuration 103 after, for instance, that the workout has been first carried out. When there is a transition between song recordings during the course of a workout, the media output manager 106A may identify the geolocation data generated when the transition took place. The global geolocation data, for storing in memory, corresponding to the route taken during the workout, may be adapted for that specific location to indicate that there is a song transition at that given location. Metadata of the geolocation data may be stored in memory with information relating to the song recording that started to play when the geolocation data was generated. This song recording transition information may be stored in memory for each song recording transition.

When a user selects the features of the same workout, and the media output manager 106A retrieves the workout configuration 103 for that workout from memory, the workout music playback device 100 may also retrieve the geolocation data and the song transition metadata (associated with the geolocation data) for that given workout, corresponding to when that workout was originally performed.

When the user performs the workout and takes the same route as in the previous workout, the workout music playback device 100 may receive the geolocation data from the GPS for the current workout, and as function of time elapsed of the workout, compare the current geolocation data with the geolocation data of the initial workout. The workout music playback device 100 may, as a function of the comparison information between the geolocation data, adapt the equalization parameters and/or length of the edited song recording such that the song recordings are adapted to transition at the moment when the user reaches the location (in accordance with the geolocation data) corresponding to that same song recording transition when the user first performed the workout. In some examples, when the geolocation data provides an indication that the user is falling behind in the user's route when the same workout time has elapsed, equalization parameters may be adjusted by the workout music playback device 100 (e.g. by way of the media output manage 106A generating and/or adapting the audio output information sent to the instruction relay module 106B; the instruction relay module 106B in turn adapting the audio output instructions as a function thereof) such as to provide additional motivation to the user (e.g. an increase in the volume; an increase in the base, etc.)

In some examples, the workout music playback device 100 may instead process the geolocation data to store the distance travelled by the user. In these examples, the media output manager 106A may receive the geolocation data, process the data to calculate the distance travelled by the user during the course of the workout and between transitions of song titles, and may store in memory the distance travelled associated with the transition between song titles when the workout is first performed. During a subsequent workout with the same workout configuration 103, the media output manager 106A may, when generating the audio output information, may similarly provide information to have the length of the edited song recording adjusted and/or set, based on the previous data indicative of song transition and distance travelled when the song transition took place, to adapt the edited song recording length such that the workout music playback device 100 transitions between edited song recordings when the user has travelled a similar or the same distance as in the initial workout. For instance, if the first transition between song titles occurred when the user had run one kilometer during the initial workout, and during the subsequent workout, it appears that, based on the initial song length of the first edited song recording, based on the user's speed and progress, the song transition will likely take place only after the user has run 800 metres, the media output manager 106A may generate audio output information, received and process by the instruction relay module 106B to adapt the audio output instructions such that the media output generator extends the length of the first edited song recording such that the first transition takes places, at least approximatively, when the user has travelled 1000 metres.

In some examples, when the user is performing an exercise indoors, the media output manager 106A may similarly adjust the song length of the edited song length as a function of data received via the exercise machine interface 104 (e.g. when the user is using an exercise machine). Similarly, the song length may be adjusted as a function of readings received when using the exercise machine between two workout sessions (as a function of, e.g., distance travelled on a treadmill or on a stationary bike, calories consumed, the progress of a set workout session on an exercise machine). Exercise machine data from a first workout, that may be stored in memory by the media output manager 106A with workout configuration 103 of the first workout, may be compared to exercise machine data from a second workout that is in progress. The exercise machine data for the prior workout stored in memory with the workout configuration 103 is also indicative of the workout progress when transitions between song titles took place. For instance, the memory may have stored the number of calories burnt when the first transition between song titles took place. The media output manager 106A compares the stored value of calories consumed during that first transition to the number of calories consumed for the current workout and the progress of the workout music being played. If the user has burnt less calories during the present workout than in the first and the transition between the first and second song title is approaching, the media output manager 106A may generate audio output information that, when processed and resulting in the generation of audio output instructions by the instruction relay module 106B, results in the outputting of a longer edited song recording by the media output generator 120 to account for the user's workout progress, as indicated by the workout machine data.

Therefore, it will be understood that the song recordings may be adjusted during the course of the subsequent workout as a function of a comparison between workout progress information corresponding to workout progress data of a first workout (e.g. where the workout progress information may be distance travelled, distance travelled at the point of a song recording transition derived from the geolocation data received; number of movements completed, number of movements completed at the point of a song recording transition, as a function of the acceleration data) with information relating to progress of the second workout obtained from the workout progress data of the subsequent workout. By workout progress data, it is meant data obtained during the course of a workout and generated by, e.g., a GPS, accelerometer, biometric reader, workout machine, etc.

It is also understood that the GPS interface 116, accelerometer interface 117, workout machine interface 104 and/or biometric reader interface 118 may act as a workout progress data interface (where, by "workout progress data interface" it is meant an interface used to receive workout progress data).

In some examples where the workout music playback device 100 provides a virtual trainer as described herein, the virtual trainer may provide audio or visual cues that are meant to motivate the user or share with the user information regarding the user's performance during the workout in accordance with geolocation data (and/or acceleration data and/or biometric readings).

The data received from the accelerometer may be indicative of the rate of movement (and in some cases, the nature of the movement) performed by a user during a workout. For instance, the workout music playback device 100, in some examples its media output manager 106A, may process the accelerometer data to determine the frequency of movements carried by the user, where such movements may be the footstep rate, height of stride and jumps, rapid body motion and fist speed of air boxing, etc. For instance, when the user is performing jumping jacks, a positive acceleration reading along one axis, and a negative acceleration reading along the same axis may provide information on the frequency of movement. This frequency of movement information may be stored in memory as data or metadata corresponding to a given workout. When the user performs a same or similar workout, the frequency of movement information may be retrieved from memory, and compared with the frequency of movement data of the present workout. In some embodiments, if the frequency of movement information of the present workout indicates that the user is performing movements with lesser frequency, then, e.g., equalization parameters of the workout may be adjusted (e.g. increase in volume, increase in volume at a given frequency, etc.). This change in equalization parameters may be performed to motivate the user.

In some examples, the user input interface 107 and/or the workout user interface 500 may form at least part of the console of the exercise machine. The user input may then be transmitted from the console of the exercise machine to the exercise machine interface 104, in turn processed by the media output manager 106A.

When the workout music playback device 100 has its own GPS module, the GPS module may be for locating the workout music playback device 100 and tracking the workout music playback device's 100 distance travelled. The workout music playback device 100 may also have an accelerometer for measuring changes in speed of the user when the user is carrying the workout music playback device 100, such as during a jog or a bicycle ride. In some embodiments, the workout music playback device 100 may have an inbuilt bio-monitor capability, where the workout music playback device 100 is configured to monitor certain biometric functions of the user, such as the user's heart rate, temperature, breathing, number of footsteps taken, etc.

The workout music playback device 100 may be a mobile phone or smartphone, a tablet device or a computer with a computer application for generating and playing a stream of workout music 111 in accordance with the present teachings. The workout music playback device 100 may also be integrated into an exercise machine, such as a treadmill or stationary bike. The workout playback device 100 may be a mobile phone or smartphone, a tablet device or a computer accessing a website configured for generating and playing a stream of workout music 111 in accordance with the present teachings, where, for instance, the song database 108 may be generated as a function of a library of song titles 112 corresponding to original musical recordings 110, with corresponding song edit data 101, available for streaming over the internet via the website configured for generating and playing a stream of workout music 111.

The user input interface 107 may be, in the case of an intelligent phone or handheld device such as a tablet, a tactile screen display. The user input interface 107 may also be any device, such as a button, for providing input information to the workout music playback device 100. In some embodiments, the user input interface 107 may be, or may include, a mouse, a keyboard or an audio input device such as a microphone (where, in the case of an audio input device, the input information may be voice commands that can be translated to actions such as orally providing a selection of musical recordings, designated by their song titles).

The screen display 102 may be a touchscreen on a handheld device (e.g. a smartphone or tablet), where the handheld device may act as the workout music playback device 100. The screen display 102 may also be a screen on desktop computer, a screen on an exercise machine, or a television screen, where the screen display 102 may be connected wirelessly or via a wired connection to the workout music playback device 100 in examples where the desktop computer, exercise machine or television set is part of the same unit as the workout music playback device 100.

In some embodiments, the screen display 102 and the user input interface 107 may be the same component of the workout music playback device 100, such as when the user input interface 107 and the screen display 102 are a touchscreen. In the case of a touchscreen, the user provides user input 114 through a series of gestures on the screen display 102, acting, in this example, as the user input interface 107 as the user is inputting the user's gestures onto the screen display 102, and the touchscreen is in turn visually displaying the graphic user interface to the user.

The workout music playback device 100 may have a processor (e.g. a CPU) for performing such functions as carrying out instructions of a computer application for generating a stream of workout music 111 or, for example, the functions of the media output manager 106A, retrieving song recording data corresponding to an original musical recording 110.

The workout music playback device 100 may also have a wireless connection for connecting to a wireless network (e.g. a WiFi or Bluetooth connection). The workout music playback device 100 may also have a female socket for receiving an audio connector, such as a headphone jack. The workout music playback device 100 may also re-stream the final audio to a wireless interface of digital headphones, transmitting the digital audio stream to the speakers of the digital headphones. The workout music playback device 100 may also have a GPU (graphics processing unit) for creating images, for example, in a frame buffer for generating and refreshing an image viewed on a display, such as on the screen display 102.

The screen display 102 may have a graphics processing unit (GPU) for decoding compressed video data received, for instance, from the video source 140, for playing a stream of video data of a virtual trainer. The screen display 102 may also have an operating system for processing and carrying out video playing tasks and generating an interface for inputting workout information and an interface displayed during a workout. In some examples, the screen display 102 may be that of an exercise machine, where the exercise machine receives, for instance, video data, and in some cases video output instructions, from the workout music playback machine 100 to play a video, such as the video of a virtual trainer.

The workout music playback device 100 may also have a video source 140. The video source 140 may have memory for storing video files (e.g. video segment files for given video trainer options that may be selected by the user using user input interface 107). The memory for storing video files may be memory 125, or another memory storage module, such as one external to the workout music playback device 100 (e.g. exercise memory storage device, cloud storage, etc.) The video source 140 may also receive instructions to retrieve certain video files from memory and stream the video files as video data (in, e.g. a digital compressed or uncompressed format) to a screen display 102. In some embodiments, the video source 140 may be external to the workout music playback device 100, and may be, for instance, hardware of a workout machine or an external server, receiving, for instance, wirelessly (e.g. WiFi, or a bandwidth limited wireless connection), or via a wired connection, the video output instructions from the media output manager 106A.

When a user desires to create a stream of workout music 111 for a workout, the user may first initiate the computer application responsible for producing the stream of workout music 111. The workout music playback device 100 may provide the user with a user input interface 107. The user input interface 107 is an interface allowing the user to provide input regarding the characteristics of the workout and the stream of workout music from a series of options provided by the user input interface 107. The user input interface 107 may be a graphic user interface.

The user input interface 107 may request that the user enter certain input information in order to configure the workout configurations 103 of the workout. Exemplary user input interfaces 107A and 107B may be found at FIGS. 3A and 3B. When using the exemplary user input interface 107A, the user inputs workout styles 114c for each song title 112 (selected, for instance, from a workout style database 109), and an exercise burn rate pattern 113 may be retrieved from the song edit data 101 corresponding to the selected workout style 114c. The exercise burn rate pattern 113 may be different for each possible arrangement of song segments for a given selected song title 112 and the workout style 114c selected for that song title 112.

Figure 3A:
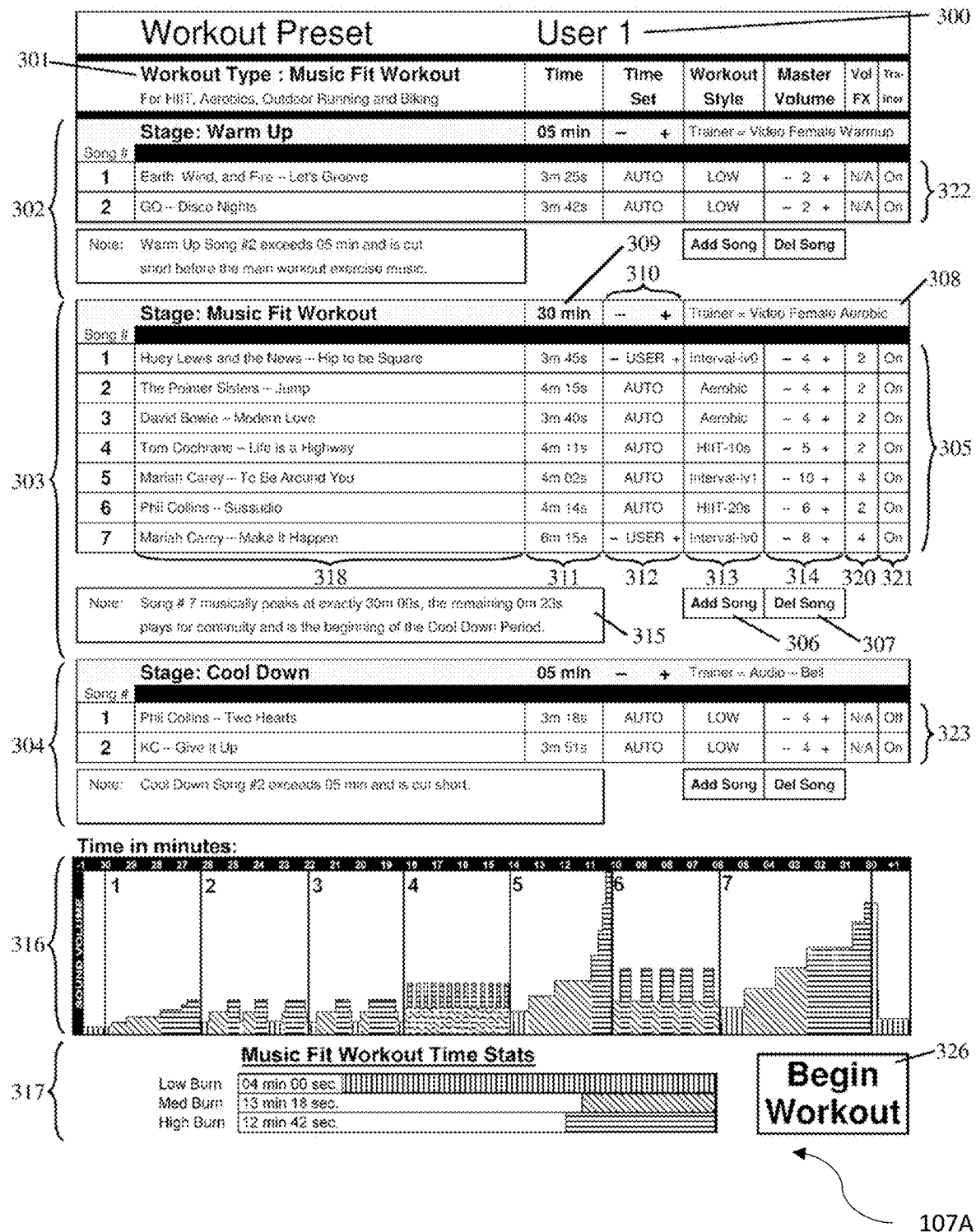
FIG. 3A is a graphical representation of an exemplary user input interface of an exemplary workout music playback device.
Figure 3B:
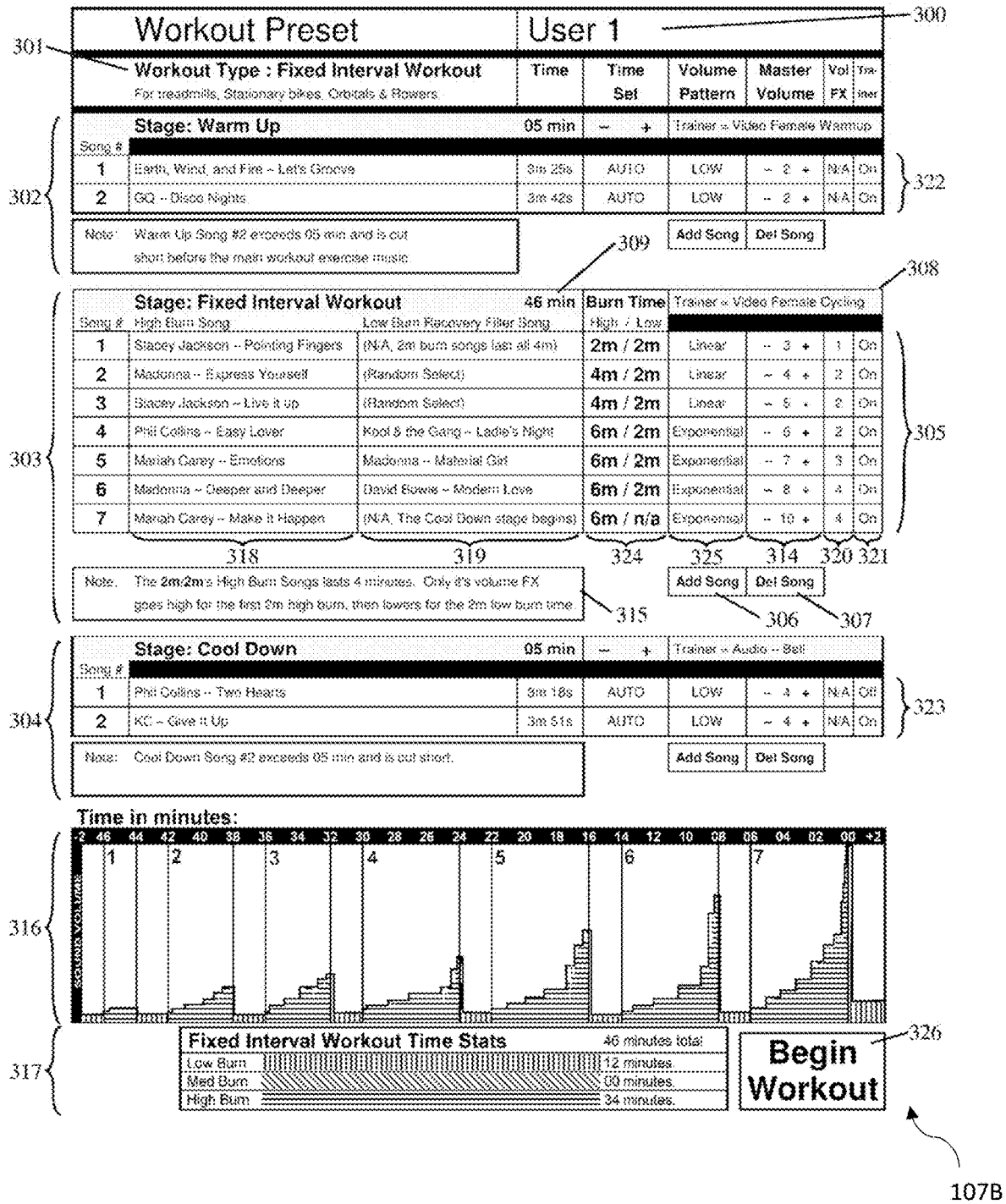
FIG. 3B is a graphical representation of another exemplary user input interface of an exemplary workout music playback device.

When using the workout music playback device 100, the user may switch between different user input interfaces 107, as a specific user workout interface 107 may be configured for receiving a given input from the user (e.g. such as changing between the exemplary user input interface 107A and the exemplary user input interface 107B). As shown in FIGS. 3A and 3B, the user input interface 107A and the user input interface 107B may be a graphical user interface visible on an electronic visual display (e.g. screen display 102), such as a touchscreen, where, for instance, the user input interface 107 reacts to simple or multi-touch gestures by touching the screen with a special stylus and/or using one or more fingers.

Inputting in the User Input Interface:

In one example, the user may input the time of the workout into the input user interface 107A and select different song titles 112 from the song database 108.

A user input interface 107A may request that a user enter a total time 114a for the workout such as by selecting a time using a workout time button 310 (with, for instance, buttons to increase or decrease the total time, or a keyboard interface, such as a touch keyboard appearing on the screen display 102 to enter a time). The total selected workout time 114a of the workout may be shown in a time display 309. The user may then begin selecting song titles 112 to fill in the workout time 114a from the song database 108. For instance, the user may choose to add a slot row 305 to correspond to a song title 112 for a workout by selecting an add song button 306 available in the user input interface 107a. The user may then set the song title 112 corresponding to the slot row 305 by using song selection button 318 searching through the song database 108 for the desired song title 112, such as, by using a scroll feature (i.e. allowing the user to scroll up or down through an alphabetical list of songs by completing, for instance, a swipe motion on the touch screen) or by typing in the name of the song title 112 or the name of the artist. For example, the workout music playback device 100 may then run instructions to parse the string of characters entered by the user and compare this string of characters with the names of the song titles 112 provided in the song database 108. If the entered string of characters matches that of a song title 112 in the song database 108, then the song title 112 corresponding to the original musical recording 110 may be added to a slot row 305, forming part of the selection 114b of song titles 112. Once a song title 112 is selected and added to the workout, the song title 112 may be displayed in a song title slot row 305 along with other features associated with that portion of the workout tied to the song title 112. The user may also decide to delete a slot row 305 corresponding to a song title 112 by selecting, for instance, a delete song button 307. The delete song button 307, once selected, may delete the last added slot row 305. Alternatively, the user may select a given slot row 305, and then the user may select the delete song button 307, removing the selected slot row 305.

In another embodiment, the user may instead scroll a menu listing the song titles 112 in the song database 108 and, when the user selects a song title 112, a slot row 305 including the song title 112 is added. The workout music display device 100 may provide a mechanism for adjusting the time associated to each selected song title 112 to be played in the stream of workout music 111.

The user may select the number of slot rows for each core portion of the workout. For instance, the user may add slot rows 322 (and song titles 112) for the warm up portion (e.g. shown as portion 302 on the user input interface 107A) of the workout. The user may add slot rows 305 (and song titles 112) for the core portion (e.g. shown as portion 303 on the user input interface 107A) of the workout. The user may add slot rows 323 (and song titles 112) for the cool down portion (e.g. shown as portion 304 on the user input interface 107A) of the workout.

The user may also select, such as by using workout style buttons 313, the workout style 114c associated with each song title 112 in the selection 114b of song titles 112. The workout styles may be selected from a workout style database 109 appearing, for instance, as a drop down menu when the user selects the workout style button 313 for a given slot row. In this example, the workout music playback device 100 may provide the user with an auto-generated list of workout styles 114c, this list appearing each time a user selects a workout style button 313 for a given slot row 305. The user may select the workout style 114c for the given slot row 305, and the screen display 102 may display to the user the selected choice of workout style 114c for the given slot row 305. Table 3A provides a list of exemplary workout styles 114c for an exemplary user input interface 107A. The person skilled in the art will readily recognize that workout styles 114c other than those provided in Table 3A may be used without departing from the present teachings.

In an alternative embodiment, the workout time may be generated as a function of the number and length of the song titles 112 selected by the user, not requiring the user to input a total workout time. In this example, the workout time will correspond to the total time required to play each of the selected different length song recordings of each of the original musical recordings 110 corresponding to the selected song titles 112 and their respective desired lengths, where the desired length for each song title 112 may be adjusted by using song title time button 312 as explained herein.

In some embodiments, the user may either lengthen or shorten the play duration of an original musical recording 110 corresponding to a given song title 112 by selecting (e.g. by a tactile input, a button press or a mouse click) a song title time button 312 found on the user input interface 107a to this effect.

The volume associated to each song title 112 may also be adjusted by the user by selecting to increase or decrease the volume, the increase and decrease options available on the volume adjustment button 314. The user input interface 107A may also allow the user to manually adjust the volume of the entire selection 114b of song titles 112 by selecting a global sound button.

Figure 4:
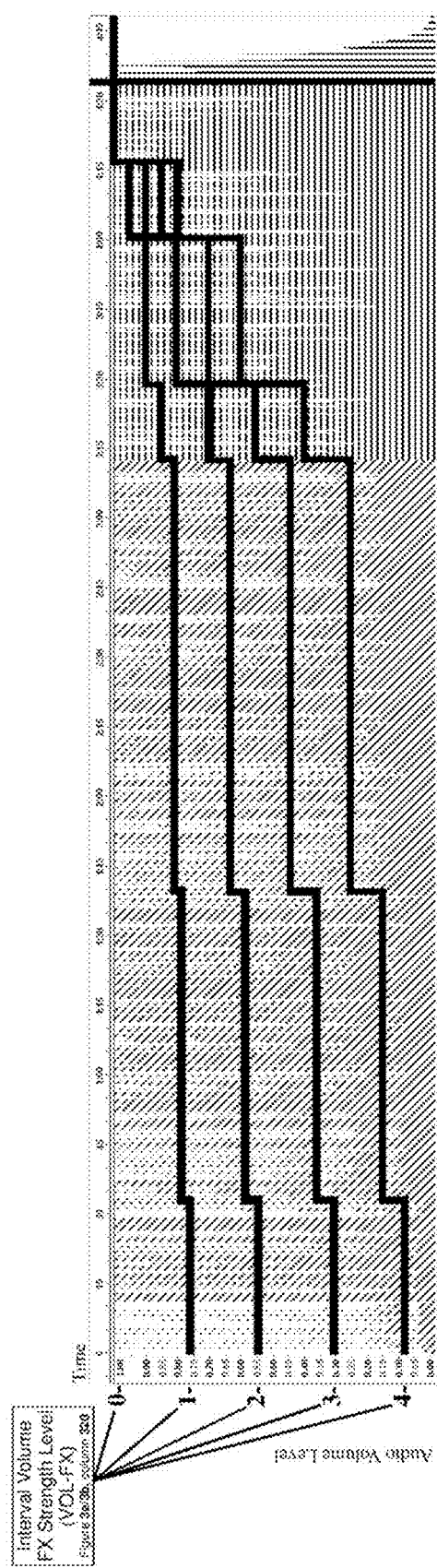
FIG. 4 is a visual representation of a sound wave of an exemplary song sequence with different volume effect levels in accordance with an exemplary volume effect option that may be selected using an exemplary user input interface of an exemplary workout music playback device.

The user input interface 107A may also provide a volume effect option by selecting volume effect buttons 320 for each song title 112 in the selection 114b of song titles 112. The volume effect option for each song title alters the volume associated to the given arrangement of song segments of an original musical recording 110 by, for instance, altering the volume of the edited song recording as a function of the exercise burn rate pattern 113 for that song title 112 or its equalization parameters for a given workout style. For example, FIG. 4 shows an exemplary graphical depiction of audio volume for an edited song recording corresponding to a given song title 112 and the effect of the volume effect option upon the volume of the edited song recording. In the example of FIG. 4, the user may select in the user input interface 107 from five volume effect levels, 0, 1, 2, 3 and 4. Each volume effect option accordingly alters the equalization parameters of the edited song recording as a function of the exercise burn rate pattern 113 associated to a given selected workout style 114c and/or the base equalization parameters for the edited song recording, as depicted by the staircases illustrating the audio volume level for each volume effect option for the edited song recording shown in FIG. 4. As illustrated in FIG. 4, the volume effect option may not uniformly decrease or increase the volume of the edited song recording, but may alter the degree at which the equalization parameters affect the volume of an edited song recording. For example, the volume effect option allows a user to switch off the volume regulation performed by the equalization parameters, or alter the volume regulation performed by the equalization parameters. For instance, referring to volume effect option 4, the audio volume level, starting at a lower volume for the first portion of the song recording depicted in FIG. 4, increases gradually as the edited song recording plays. The amplitude corresponding to the increase in volume varies as a function of the volume effect level selected by the user. For instance, selecting volume effect option 3 lessens the difference amplitude for each volume increment as a function of the equalization parameters for that given workout style.

In some examples, the equalization parameters may lower the decibel level or volume of the edited song recording for a given portion of the edited song recording. The volume effect option 320 may allow the user to set modulate the lowering of the volume performed by the equalization parameters. For instance, as shown in FIG. 4, the volume effect levels may correspond to:

Volume effect level 4=100%. The music volume is changed by 100% of the set decibel values as a function of the equalization parameters.

Volume effect level 3=75%. The music volume is changed by 75% of the set decibel values as a function of the equalization parameters.

Volume effect level 2=50%. The music volume is changed by 50% of the set decibel values as a function of the equalization parameters.

Volume effect level 1=25%. The music volume is changed by 25% of the set decibel values as a function of the equalization parameters.

Volume effect level 0=0%. The music volume is changed by 0% of the set decibel values as a function of the equalization parameters. This means that the edited song recording will play at full volume and the equalization parameters do not affect the volume of the played edited song recording.

The user input interface 107A may also provide a feature for allowing the user to add a notification signaling the completion of a portion of the workout with a designated exercise burn rate pattern 113, these portions associated with a designated song title 112, workout style 114c and corresponding slot row 305. In some embodiments, the notification may also signal the end of an interval with a given burn rate as provided in the exercise burn rate pattern.

In alternative embodiments, the user input interface 107A may also provide a trainer option 308. The trainer is a video and/or audio that may be played, for instance, on a screen display 102 and/or the audio output interface 105 of the workout music playback device 100 or the audio and/or video player of an exercise machine received from, for example, the exercise machine interface 104. The video and/or audio may be a video and/or audio for providing the user with additional motivation during the workout. For instance, the trainer may be a video of an exercise class with a coach, or may be the video of a coach alone providing commentary to the user in accordance with the progress of the workout. In some examples, the trainer may be that of moving scenery, similar to when a person is moving when completing a workout outside (e.g. a moving scenery akin to a jogger running in the woods; a cyclist in a group of cyclists during a race). The trainer may also provide a means of notifying the user that the user is undergoing a change in the workout, where such changes may be in workout styles, burn times, burn rates or when the user has completed or is starting a new core portion of the workout. The notification may be an audio notification added to the video or audio track, announcing the change in the workout, such as by announcing "crank it up" for an increase in burn rate, "relax" for a decrease in burn rate, or "good job, time to cooldown" for when the core portion of the workout has come to term. The notification may also be a visual queue in a video, such as a message in a text box added to the video indicating to "push harder" when there is an increase in burn rate, "slow down" when the burn rate decreases or "cooldown" when the core portion of the workout is over. The visual queue may also be the trainer in the video indicating verbally to the user that there is a change in the workout, such as by the trainer saying "push harder" when there is an increase in burn rate, "slow down" when the burn rate decreases or "cooldown" when the core portion of the workout is over.

The trainer option 308 may allow the user to select from multiple available trainers, by, for instance, scrolling down a menu with a list of the possible trainers. There may be a different trainer for different possible types of exercise activities that may be performed during the workout, such as jogging, biking, rowing, boxing, etc. There may also be male trainer or female trainer options, where the trainer displayed in the video, or the voice of the trainer played in the audio, may be that of a man or that of a woman depending on the user's selection. In some embodiments, the user may also be able to select a specific celebrity athlete as a trainer from the available options.

The trainer may be strictly audio (e.g. where there is no background video but only notifications announcing a change in the workout), both audio and video, including, for example, the video stream and the audio notifications, or strictly video (e.g. a video with notifications included as text in, added to, or displayed on top of the video). Table 4 is an exemplary set of trainers that a user may select from for a given workout, including an option to turn off the trainer. For instance, when the trainer for a song title is set to 'Off' or the trainer is strictly an audio-based trainer (i.e. no video), and the original musical recording 110 is or is tied to a music video, the video of the music video may be displayed on the screen display 102. The person skilled in the art will understand that the trainer options of Table 4 are examples and other trainer options are possible without departing from the present teachings.

TABLE 4 exemplary trainers that may be selected
by the user using the trainer option 308.
Trainer audio and video sequences OFF
Silent - Visual Text
Silent - CG AnimatedCycling
Silent - CG Animated Running
Audio - Bell
Audio - Male AuralCountdown
Audio - FemaleAuralCountdown
Video - FemaleAerobic
Video - FemaleCycling
Video - Female Running
Video - Male Cycling
Video - Male Running
Video - Male Boxing
Video - Male Rowing
Video - Brian H. G. Cycling The exemplary videos for each of the possible video-based trainers may be video files stored in the video source 140. The video source 140 may be stored in memory, such as memory 125 or another memory storage module (e.g. external memory storage, cloud storage, etc.). The video file may have a wrapper format, video data with a specific video format, and/or audio data with a specific audio format. The video data and/or audio data may be compressed. The audio-based trainers may be audio files stored in the memory 125 and may be compressed or decompressed. In some examples, there may be video segments for each possible video trainer option stored in the video source 140. The video segments may correspond to each possible change in the workout, such as the beginning of the workout, a change in burn rate, the end of the core portion of the workout, the beginning of the cooldown portion, etc. For example, there may be a video segment for the "video-female running" trainer when the workout transitions from low burn rate to medium burn rate. Therefore, the video segments for a given trainer selection may be arranged into a stream of video segments tailored for a given workout as a function of the workout parameters, providing motivational queues for the user during the workout.

This information indicating the change in workout may be stored in the song edit data 101 as shown in Tables 2A to 2M for possible arrangements of song segments. The change in video segments may correspond to the change in exercise burn rate pattern for a given edited song recording. The length of the video segments may be adjusted as a function of the length of the portion of the workout following a given change in workout, until the next change in the workout. The length of the video segment may be adjusted by looping certain designated segments of the video segments or cutting certain designated portions of the video segments (e.g. the video segments metadata may provide allowable positions in the video segment that may be adjusted, or alternatively, portions of the video segments that may not be adjusted).

As shown in Table 2A to 2M, the song edit data 101 may provide trainer sequence information for each possible arrangement of song segments of a given original musical recording, and more specifically for each of the workout styles and/or burn times for each of the possible arrangements of segments. Trainer sequence information may generate time markers in the edited song recording created from an arrangement of song segments indicating changes in the exercise burn rate pattern as well as information on the nature of that change (e.g. a change from low to medium burn rate; from medium to high burn rate; from high to low burn rate). Trainer sequence information may be retrieved from memory 125 by the media output manager 106A as part of the song edit data 101 for a given edited song recording and workout style (or burn time). The media output manager 106A, via the instruction relay module 106B, may transmit trainer output instructions, along with the audio output instructions, to the media output generator 120 to retrieve from memory 125 an audio file when the trainer selection is an audio-based trainer, or when the trainer selection involves superimposing audio notifications. The trainer output instructions, generated from the song edit data 101, as a function of the current time feedback information sent by the media output generator 120 back to the instruction relay module 106B regarding the time lapse of the workout and the play of the edited song recording, may then provide timely instructions for inserting into the video file and/or audio file, for example, specific sound files acting as a notification of a change in the workout, indicating the change in the workout.

Figure 14:
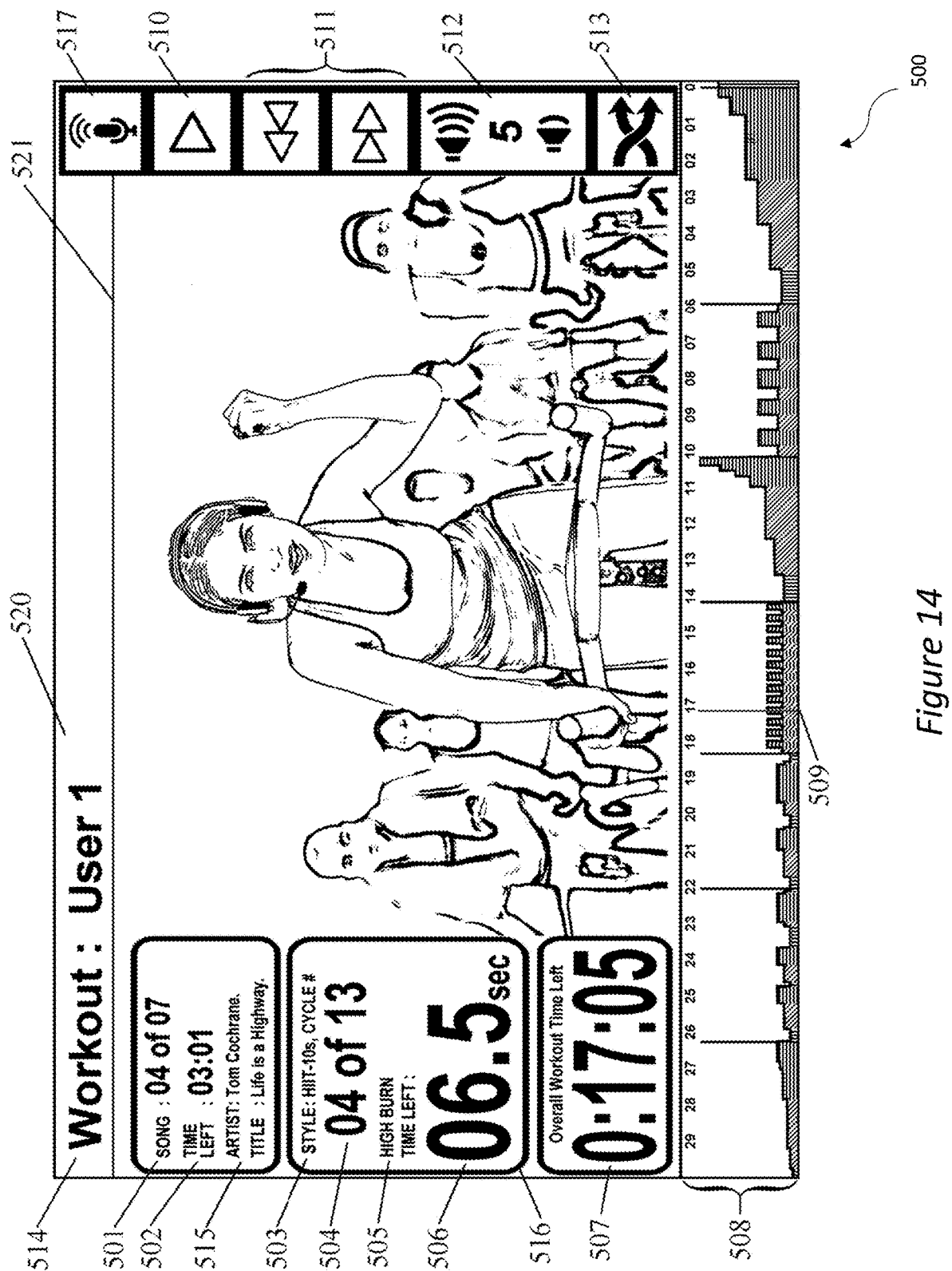
FIG. 14 is a graphical representation of an exemplary workout user interface of a workout playback music device during a workout.

When the trainer selected by the user is a video trainer, the media output manager 106A may retrieve from the song edit data 101 the trainer sequence information, and send instructions to the video source 140 to play a given video segment corresponding to the trainer sequence information, such as the video segment corresponding to a specific change in the workout (e.g. play the medium to high burn rate transition video segment for a certain time). The video segment data may then be transmitted as a stream by the video source 140 to the screen display 102. The screen display 102 may receive the stream of video segment data, decompress the video segment data if the video file is encoded, and play the video corresponding to the video segment data in a designated window, as in the trainer window 521 as shown in FIG. 14. The screen display 102 may adjust the length of the video segment as a function of the instructions received by the media output manager 106A and/or video source 140, where these instructions correspond to the exercise burn rate pattern 113. The media output manager 106A transmits instructions to play the next video segment to the video source 140 as a function of the song edit data 101 and the time information received from the media output generator 120 (via the instruction relay module 106B). The screen display 102 plays then the next video segment as a function of the stream of video segment data received from the video source 140. The result is an arrangement of video segments providing a virtual trainer for the user, notifying the user of changes in the workout, the arrangement of video segments tailored to the user's selected workout parameters.

The trainer output instructions may be generated as a function of the song edit data 101 (i.e. the trainer sequence information) or from the workout configuration 103 (e.g. the instructions relating to the end of a core portion of the workout, a change in the workout style or burn time, or the end of the workout).

In the examples where the trainer includes an audio component, the audio notifications indicating the changes in the workout may be mixed or inserted into the stream of workout music 111 as a function of the audio output instructions and/or trainer output instructions, where the audio notification may be played at a specific decibel level, audible over the playing stream of workout music 111, the media output generator 120 receiving the audio output instructions and/or trainer output instructions and retrieving and assembling the audio files accordingly. For instance, the media output generator 120 may receive instructions to play an audio notification 10 seconds into the play time of an edited song recording. The media output generator 120 may retrieve and play the song segment of an original musical recording 110 from 0 sec. to 20 sec., as a function of audio output instructions (generated from the song edit data 101 and the workout configuration 103) and at 10 sec., retrieve from memory 125 (e.g. by analyzing the metadata of the audio files for the audio notifications) the audio file corresponding to the audio notification and overlay and play the audio file of the audio notification at 10 seconds into the playing of the song segment as a function of the trainer output instructions.

The user input interface 107A may also provide the user with a trainer enabler option 321 for each of the slot rows. The user may use the trainer enabler option 321 to disable or enable the trainer for a given song title 112 in a given slot row (e.g. each of slot rows 322, 205 and 323), such as by selecting "on" to enable the trainer or "off" to disable the trainer. In some examples, where the trainer is a video stream, disabling the trainer may only disable the notifications (e.g. audio or in video) of the changes in the workout, but not the streaming of the video for that workout.

In some examples, the video generated (e.g. the virtual trainer) may also be a real-time 3D rendered computer generated simulation of a trainer and/or scenery. The 3D rendered simulation may also combine the virtual trainer settings that, in some examples, may be part of the song edit data, with readings received from the GPS, biometric reader and/or accelerometer to alter the trainer's activity or scenery in real-time. As the data received by the GPS, the biometric reader and/or the accelerometer may provide indications on the user's performance while carrying out a workout as explained herein, adapting the 3D rendered simulation as a function of these readings may be carried out to provide the user with the impression that the 3D rendered simulation is adapted as a function of the user's performance during a workout. An example of adapting the 3D rendered simulation may be, when the 3D rendered simulation includes a moving scenery, having the image stream corresponding to the scenery accelerate (giving the impression that the user is moving faster) as a function of the accelerometer's readings (e.g. when the user is performing a greater frequency of movement as analyzed from the accelerometer data), or when the user is moving faster as determined from the geolocation data.

In some embodiments, when the screen display 102 is not playing a video corresponding to a virtual trainer, the screen display 102 may instead play a video of a music video when the original musical recording 110 is the audio portion of a music video. The video may be arranged and assembled similarly to that of the song segments constituting the edited song recording based on the song edit data 101 and the audio output instructions. The media output generator 120 may be configured to retrieve video data corresponding to said song recording data as a function of the audio output instructions, assemble the video segments of the video data according to the audio output instructions and send the stream of the video data to the screen display 102 via a wireless or wired (e.g. omnibus) connection wherein said original musical recording 110 is the audio of a music video. The screen display 102 may process the received video data, may decompress the video data, and play the video data as a video stream. The screen display 102 may switch from the video of the virtual trainer to the assembled music video based on the user's preferences and input provided before or during the workout.

The input user interface 107A may also have sub-tables, each sub-table associated with a different core portion of the workout, such as the warm up, the main workout and the cooldown. For instance, the slot rows 322 for the warm-up portion may be shown in a first warm up sub-table 302, the slot rows 305 for the main workout portion may be shown in a second main workout sub-table 303 and the slot rows 323 for the cooldown portion may be shown in a third cooldown sub-table 304. Each of the sub-tables may also be associated with a given sub-sequence of song titles 112. For instance, the first warm up sub-table 302 may display the song titles 112 for the warm up sub-sequence. The second main workout sub-table 303 may display the song titles 112 for the main workout sub-sequence. The third cooldown sub-table 304 may display the song titles 112 for the cooldown sub-sequence.

The user input interface 107A may also function as a visual display, allowing, for instance, to view a visual depiction of total exercise burn rate pattern as a function of time of the workout 316, showing for example the change in burn rates. The visual depiction of the total exercise burn rate pattern of the workout 316 may also show the sound audio volume as a function of time, define portions of the workout and the exercise burn rate pattern 113 corresponding to a given song title 112, and show the total time 114a of the workout. It will be appreciated that the visual depiction of total exercise burn rate pattern of the workout 316 may show other features of the workout without departing from the present teachings.

The user input interface 107A may also share with the user, such as through displaying same on the visual display of the workout music playback device 100 the workout statistics of the workout 317, such as the respective total times of the workout corresponding to low burn rate, medium burn rate and high burn rate. The workout statistics 317 may be compiled via instructions in the code of the application program to break the time attributed to each slot row 305 (may also include the time for the slots rows 322 and the slot rows 323) into low, medium and high burn rates, where this breaking of the time may be undertaken as a function of the parameters for each exercise burn rate pattern 113 associated to each song title 112 and each slot row 305, as well as the total workout time 114a. The respective times for each low, medium and high burn rates for each slot row 305 are then added up and a total number is provided respectively for the low, medium and high burn rates for the entire workout.

The user may also save into memory the workout configurations 103 of a given workout, these workout configurations 103 corresponding to the input provided by the user into the user input interface 107 as described herein. For instance, the user may designate the workout configurations 103 with a given name designation 300 and save a file under that name designation 300 in memory. The saved file may then be retrieved by searching for the saved file displayed, for instance, on a separate pull up menu (not shown) with a list of the save file name designations.

In some embodiments, the workout music playback device 100 may also provide a user input interface 107 for manually altering the volume parameters and equalization parameters of a given song title 112. In some examples, the volume parameters and equalization parameters for each song title 112 may be stored in memory of the workout music playback device 100, where workout music playback device 100 may store a user workout configuration 103. The workout configuration 103 may also include the alternate user volume parameters and equalization parameters, as adjusted by the user, for the original musical recording 110 corresponding to a song title 112.

The user input interface 107A may also provide notification displays 315 to auto-generate and communicate messages to the user as a function of the user input 114. For instance, the notification display 315 may notify the user that the user is to add more slot rows 305 and select more song titles 112 for a given selected workout time 309. The notification display 315 may also notify the user to remove slot rows 305 corresponding to song titles 112 for a given workout time 309. The notification display 315 may also notify the user at what time in the final edited song recording of the workout where the workout transitions to the cooldown core portion of the workout, and that the remaining duration of an edited song recording corresponding to a song title 112 selected by the user is played as the beginning of the cooldown core portion of the workout.

In some examples, the user input interface 107B may also present the user with an option to select a workout type, relating to the nature of the workout to be performed by the user (e.g. fixed interval workout), where a different selection of workout styles may be provided as a function of the selected workout type 301.

Reference is now made to FIG. 3B, illustrating another exemplary user input interface 107B. Exemplary user input interface 107B may allow the user to provide input 107 on the time in the workout associated to a given burn rate, such as a low, medium or high burn rate. The exercise burn rate pattern 113 may be adjusted as a function of the user input 114. In some examples of the exemplary workout music playback device 100 with a user input interface 107B, the user may only be available to select between a low and high burn rate, where a burn time button 324 allows the user to select the time for the higher burn rate portion of each interval and the lower burn rate portion of each interval.

The user input interface 107B provides a burn time button 324 for each slot row 305. The burn time button 324 may allow the user to set a burn time for a given song title 112, which is the duration of the burn rate intervals as a function of burn rate frequency at a given burn rate (time at a given burn rate before changing to another burn rate, where examples of burn rates are: high, medium or low burn rates; or high and low burn rates). The burn time button 324 may also allow the user to scroll through a set of burn times, each burn time providing a sequence of intervals, where each interval may be of a fixed duration corresponding respectively to a higher burn rate and a lower burn rate, where the change between the higher and lower burn rates is at a given frequency. Once the user selects the burn time button 324, a menu may appear on, for instance, the screen display 102, displaying a list of the available burn times. The user may select one of the burn times. The media output manager 106A may retrieve from memory song edit data 101 corresponding to burn time data with respect to a given arrangement of song segments for a given song title 112. The burn time data contains information on each of the possible selectable burn times. The media output manager 106A may retrieve from memory the song edit data 101 specific to the burn time selected by the user for a given song title 112. The song edit data 101 for that burn time may provide equalization parameters and time markers, the time markers indicating a shift in the equalization parameters as a function of the burn time. The change in equalization parameters may be as a function of the change in the burn rate of that specific burn time, corresponding to an exercise burn rate pattern 113 or be independent from the change in the burn rate.

In alternative embodiments, the song edit data 101 may not contain data on the burn times. In these alternative embodiments, once the user selects a burn time, the workout music playback device 100 may automatically generate a set of intervals for a portion of the workout with an interval frequency corresponding to the burn time, and, optionally, a series of time markers, indicative of a change in the equalization parameters which may vary as a function of the burn rate or be independent from the desired burn rate.

With respect to the burn times, for instance, the user may select amongst an exemplary given number of burn times, providing an interval frequency (a given time for a higher burn rate and a given time for a lower burn rate), such as those found in Table 3B. For instance, if the user selects the "2 m/2 m" option, then exercise burn rate pattern 113 will provide a first 2 minute portion corresponding to a higher burn rate, and a second 2 minute portion corresponding to a lower burn rate. The person of ordinary skill in the art will readily understand that the possible burn times are not limited to those provided in Table 3B.

TABLE 3B exemplary set of burn times that may be selected by the user when using the exemplary user input interface 107B.

| Burn time | Description |
|---|---|
| 2 m/2 m | 2 minute high burn rate, 2 minute low burn rate. The edited song recording with this burn time will be edited to the total 4 minutes since the 2 minute burn portion is too short to shrink a complete version of most edited song recordings within. |
| 4 m/2 m | 4 minute high burn rate, 2 minute low burn rate. These parameters target the edited song recording's optimum point to end a burn at 4 minutes. The remainder of the edited song recording is part of the 2 minute low burn rate. To completely fill out the remainder of the 2 minute low burn rate, the user's chosen 'Low Burn Recovery Filler Song' is played at low volume, cut short once it's time for the next high burn rate interval for a total 6 minutes. |
| 5 m/2 m | The same as '4 m/2 m'. But the targeted edited song recording for the higher burn rate is for 5 minutes. |
| 6 m/2 m | The music's playback version follow the above rules for '4 m/2 m' (there may also be '7 m/2 m' and '8 m/2 m' burn times.) |

The user may also select a volume pattern for a selected burn time using a volume pattern button 325. Each of the slots rows 305 (and, optionally, slot rows 322 and slots rows 323), may have an associated volume pattern button 325, where each possible volume pattern that may be selected may provide a different configuration of the equalization parameters than another possible volume pattern. In some examples, the volume pattern and the available volume pattern options depend on the exercise burn rate pattern 113 and the selected burn time. For instance, certain volume patterns may yield an increase in volume corresponding to the portions of the edited song recording with a high burn rate, while not affecting the volume of portions of the edited song recording with a low burn rate.

In some other embodiments, when a user selects the volume pattern button 325, the user may be prompted to select from a predefined number of volume patterns, displayed, for example, in a menu (e.g. a scrollable menu). The user may then select a volume pattern for the given portion of the workout associated to the slot row with the volume pattern button 325 receiving input 114 from the user. Exemplary volume patterns that may be selected by the user are found at Table3C. For instance, the user may select a "low-burn" volume pattern, where the edited song recording maintains a constant volume throughout its play duration. In another example, the user may select a "linear" volume pattern as described in Table 3C. The person of ordinary skill in the art will appreciate that the user input interface 107B may provide additional volume patterns from which the user may select than those presented at Table 3C.

TABLE 3C exemplary volume patterns that may be selected by a user when using exemplary user input interface 107B.

| Volume patterns | Description |
|---|---|
| Low-Burn | The entire edited song recording is set to a low burn rate. There are no audio volume effects associated with this volume pattern, the music will play at 1 volume level. This level is also generally used for warm-up/cool-down stages. See FIG. 6A. |
| Linear | For '2 m/2 m' burn time, the audio volume FX starts at low volume, going up to 100% at the first verse, then back down at or just after the 2 minute point, transitioning at the end of a vocal, sentence or beat. For '4 m/2 m' through '8 m/2 m', the playback volume effect begins low, increasing in time with each verse and chorus, up to 100% at the end of the edited song recording. This volume pattern matches FIG. 8A. |
| Exponential | Only for '4 m/2 m' through '8 m/2 m'. The playback volume effect starts very low, stepping up to only 25% just before the last verse and chorus. For the beginning of the final verse and chorus, the volume steps size increases and does so at every 2 lines sung reaching 100% by the climax just before the outro. This volume pattern matches FIG. 8B. |

The user input interface 107B may also provide the user with a low burn rate song title option 319, where the user may select a different song title 112 from the song database 108 for the low burn rate portion for each burn time selected by the user.

Figure 6:
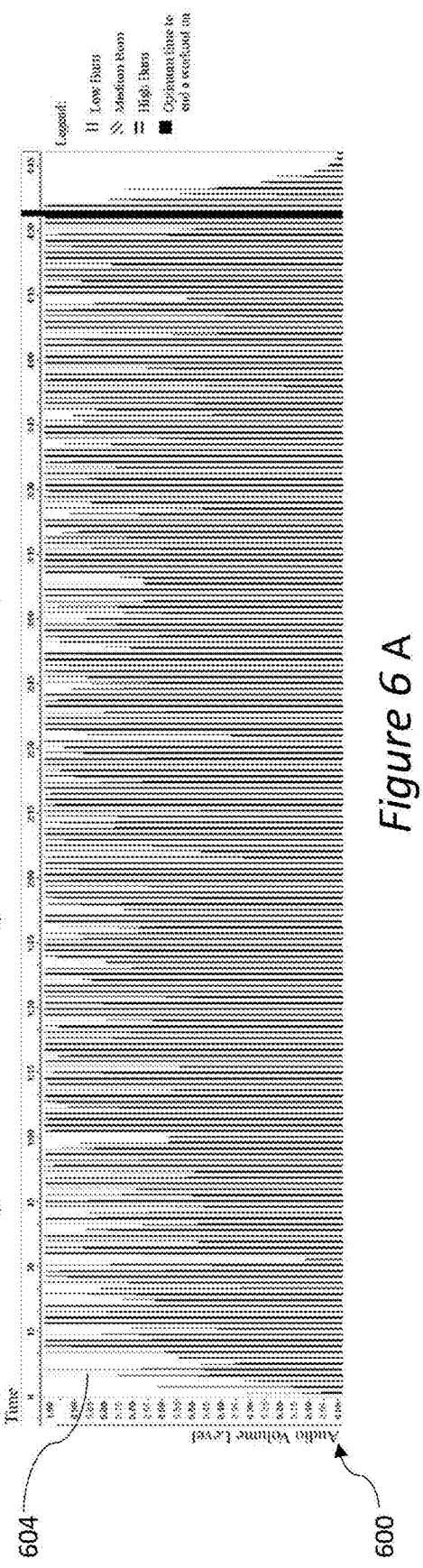
FIG. 6A is a visual representation of a sound wave of an exemplary edited song recording with a specific exercise burn rate pattern.
FIG. 6B is a visual representation of a sound wave of an exemplary edited song recording with a specific exercise burn rate pattern.
Figure 6:
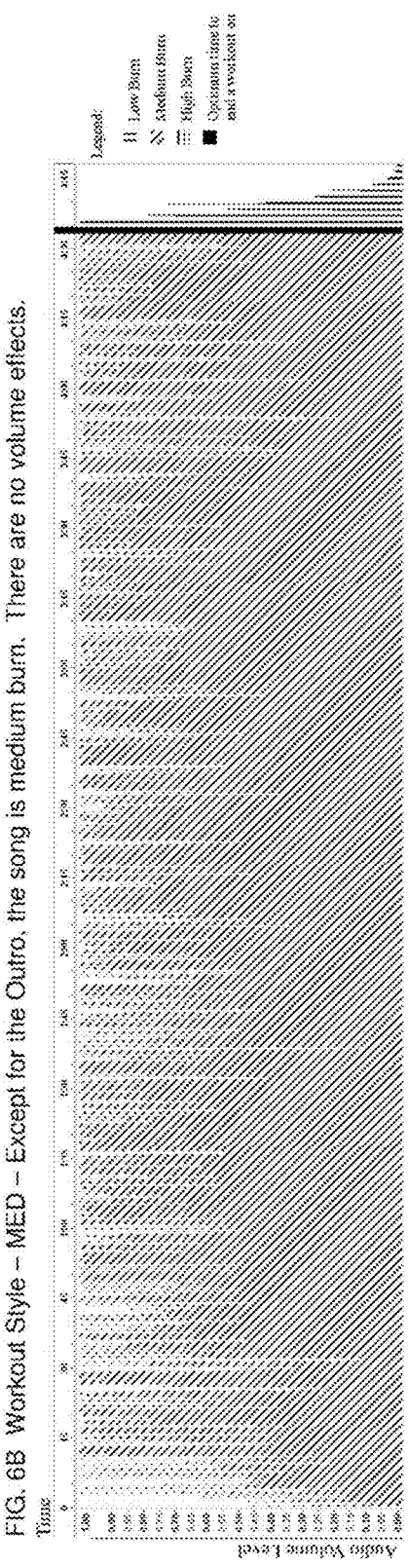
Figure 7A:
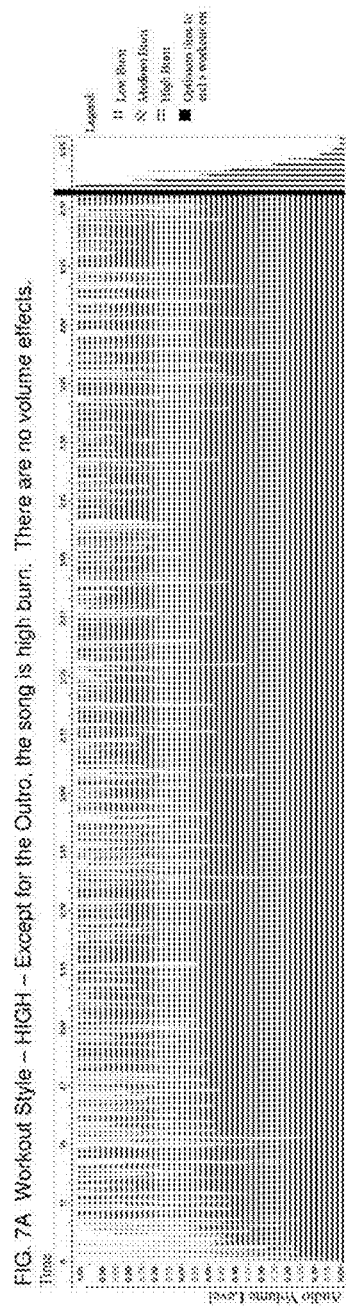
FIG. 7A is a visual representation of a sound wave of an exemplary edited song recording with a specific exercise burn rate pattern.

Song Segmentation:

FIGS. 6A to 11B are visual representations of sound waves of exemplary arrangements of song segments each with an exercise burn rate pattern. For example, FIG. 6A is a visual representation of sound waves of an exemplary edited song recording 600 composed from an arrangement of song segments of an original musical recording 110 associated with a given workout style 114c. The edited song recording 600 has a specific exercise burn rate pattern 604 corresponding to a given workout style 114c. The exemplary exercise burn rate pattern 604 is uniform throughout the arrangement of sound recording 600 and corresponds to a low burn rate. The audio volume level for the entire edited song recording 600 is also unaltered, remaining, in this example, at full volume.

Figure 7B:
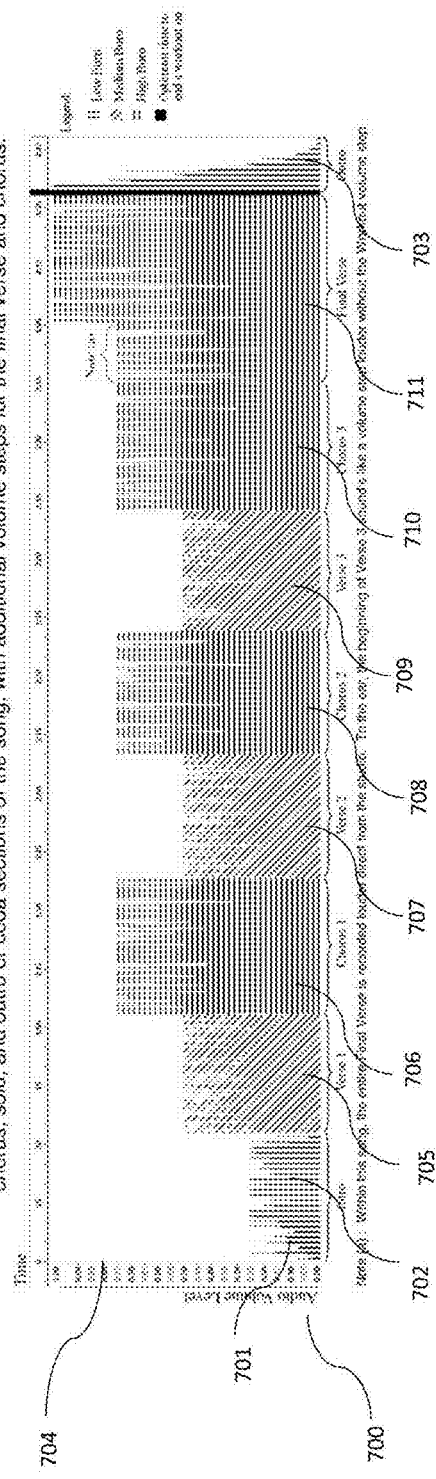
FIG. 7B is a visual representation of a sound wave of an exemplary edited song recording with a specific exercise burn rate pattern.

FIG. 7B illustrates another exemplary edited sound recording 700 arranged from song segments of an original musical recording 110, associated to a given workout style. In this example, the exemplary exercise burn rate pattern 704 corresponds to a burn rate that varies throughout the edited sound recording 700. For instance, the intro portion 701 of the edited song recording 700 and the outro portion 703 of the edited song recording 700 correspond to a low burn rate. The verse 1 portion 705, the verse 2 portion 707, the verse 3 portion 709 correspond to a medium burn rate. The chorus 1 portion 706, the chorus 2 portion 708, the chorus 3 portion 710 and the final verse portion 711 correspond to a high burn rate. The audio volume level for different portions 702 of the edited sound recording 700 may be adjusted depending on the exercise burn rate pattern 704. For example, the audio volume level of the intro portion 701, corresponding to a low burn rate as a function of the exercise burn rate portion 704, is lower than the audio volume level of the verse 1 portion 705, corresponding to a medium burn rate as a function of the exercise burn rate pattern 704, which is in turn lower than the chorus 1 portion 706 corresponding to a high burn rate as a function of the exercise burn rate pattern 704. In some embodiments, the audio volume level of each portion 702 of the edited song recording 700 may be modulated by the media output generator 120 as a function of instructions received from the media output manager 106A, such as by obtaining the burn rate for a specific portion 702 of the edited song recording 700 as a function of the exercise burn rate pattern 704, and applying a volume modulation factor on the audio volume level parameter for the portion 702, such as, for example, an audio volume level parameter or equalization parameter for the portion 702 stored in the song edit metadata for the edited song recording 700, the portion of the song edit data 101 associated to the edited song recording 700 corresponding to the selected workout style 114c with the given exercise burn rate pattern 704. The equalization parameters may also alter the volume of the edited song recording 700 for a given portion corresponding to an interval with a same burn rate. For instance, without portions 710 and 711 of the edited song recording 700, the burn rate is maintained at high. However, the volume increases from portions 710 to 711, within an interval with a constant burn rate. In some embodiments, the volume may also decrease within a portion of an edited song recording with the same burn rate, such as when a cooldown portion of an edited song recording is set at a low burn rate and the decrease in volume contributes to the user cooling down.

Figure 5:
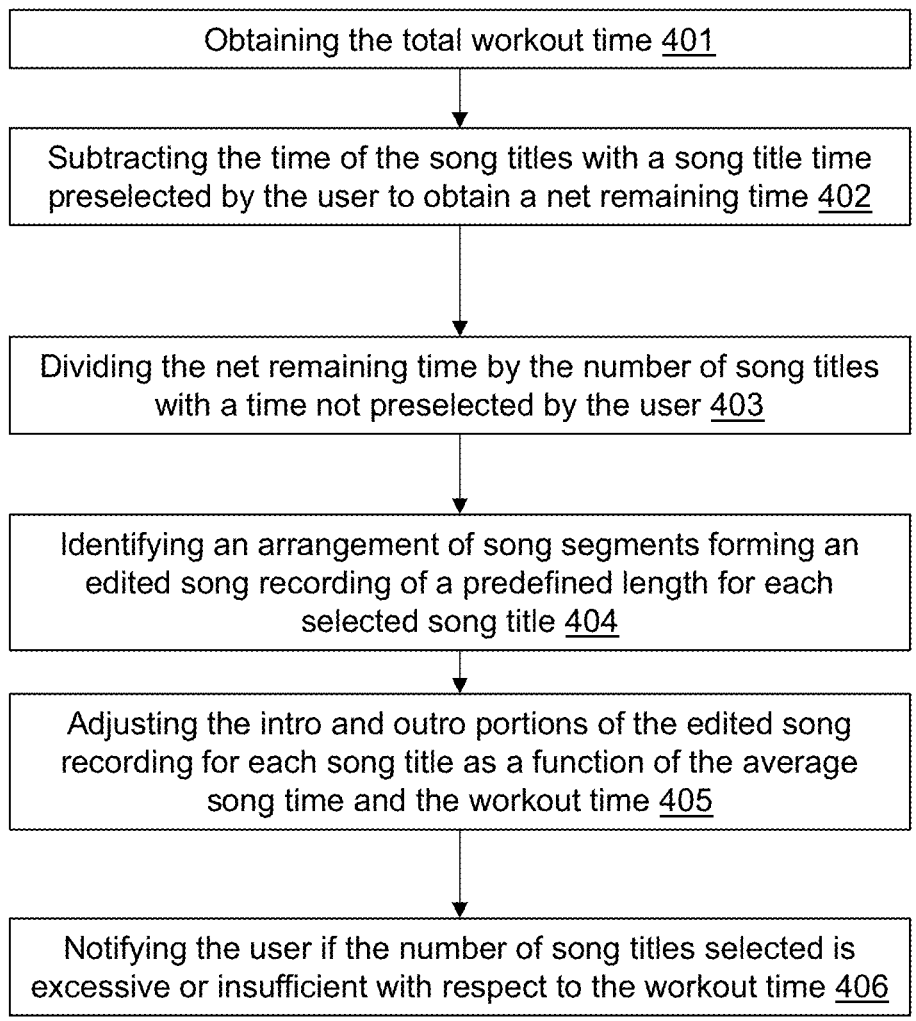
FIG. 5 is a flowchart diagram of an exemplary method for producing an arrangement of song sequences for a stream of workout music.

Methods for Arranging Song Segments:

Reference is now made to FIG. 5, an exemplary method 400 for producing audio output instructions transmitted to a media output generator 120 for producing a stream of workout music 111.

The media output manager 106A first obtains from, for instance, the workout configuration 103, the total workout time such as the total workout time 114a input by the user at step 401.

Then the media output manager 106A subtracts from the workout time 114a the time value for each song title 112 of which the time of the song title 112 was preselected by the user at step 402 (e.g. when the user elects to use the song title time buttons 312 to set the time for a song title 112 to a preselected time). As the time of these song titles 112 have been preselected by the user, the time associated with each of these song titles 112 is fixed. Once the time value associated to the song titles 112 preselected by the user have been subtracted from the workout time value, this subtraction yields a net remaining time.

The time value of the net remaining time is then divided by the number of song titles 112 in the selection 114b of song titles where the time for the song titles 112 have not been preselected by the user at step 403. This operation provides the average time value for each of the song titles 112 where the time for these song titles 112 has not been preselected by the user (the "average time value").

In some embodiments, the media output manager 106A retrieves the master song edit metadata corresponding to each of the song titles 112 selected by the user for which the time for these song titles 112 has not been preselected by the user. The retrieval may be performed by parsing the characters of the song title 112 selected by the user and comparing this sequence of characters with those stored in memory in the identifier portion of each master song edit metadata of the song edit data 101 for each song title 112. If the comparison yields a positive result, then song edit metadata for the song edit data 101 is analyzed. The information on play duration in the song edit data 101 for each possible arrangement of song segments for the song title 112 is then retrieved and compared to the average time value. In some embodiments, the media output manager 106A identifies from the portion of the song edit data 101 with instructions for producing the edited song recording with the nearest yet higher play duration to that of the calculated average time value. In alternative embodiments, the media output manager 106A may identify the data for producing the edited song recording corresponding to the song title 112 with the nearest play duration to that of the average time value, may it be lower or higher to the average time value, taking into account, for instance, the duration of the possible other edited song recordings for the other song titles 112 selected by the user for the workout.

In the case where the user has pre-selected a time duration for a given song title 112, such as by using song title time button 312, the media output manager 106A compares the time duration values of the different arrangements of song segments of the song title 112 with a time pre-selected by the user. The media output manager 106A may retain the song edit data 101 corresponding to the arrangement of song segments for each song title 112 with a play duration closest to the time duration of the song title 112 as pre-selected by the user. In some embodiments, the media output manager 106A may select the song edit data 101 corresponding to the arrangement of song segments for each song title 112 corresponding to the nearest yet longer song duration such as when the time duration for the song title 112 is pre-selected by the user (e.g. the user chooses a song duration input using the song title time button 312). The selected song edit data for producing an edited song recording of a desired length from an arrangement of song segments may have safe trimming portions (such as portion 18C shown in FIG. 13), corresponding to portions of the edited song recording which may be trimmed by, for instance, the media output generator 120 as a function of the audio output instructions received from the media output manager 106A, to reach the desired duration as selected by the user. The locations in the edited song recording of the safe trimming portions may be identified and stored in the song edit data 101 for producing each possible arrangement of song segments for an original musical recording 110. For instance, if the duration of the edited song recording is too long by a number of seconds when compared to the time duration for the song title 112 pre-selected by the user, then the media output manager 106A may include instructions in the audio output instructions to trim the edited song recording by skipping a portion of the edited song recording, where the duration of the skipped portion is equal or near to the time needed to reach the time duration for the song title 112 pre-selected by the user (and/or by ending the edited song recording prematurely within the safe trimming portion found in the outro portion of the arrangement of song segments), as long as the edited song recording begins within what is identified as its safe trimming portion. The safe trimming portions of the edited song recording may correspond respectively to its intro and outro.

In the embodiments where the arrangement of song segments selected by the media output manager 106A has the nearest yet higher play duration to that of the average time value, if the selected arrangement of song segments does not have a play duration equal to the average time value, then the media output manager 106A may adjust the play duration of the selected arrangement of song segments for constituting the edited song recording. For instance, the arrangement of song segments may have certain song segments identified as safe trimming portions. The safe trimming portions of the arrangement of song segments may be identified and stored as part of the song edit data 101 for generating the edited song recording. The safe trimming portions may be identified with time markers corresponding to the start and finish of the safe trimming portions, these time markers stored as information in the song edit data 101 for each arrangement of song segments of an original musical recording 110, retrievable by the media output manager 106A when obtaining information for producing the information sent by the instruction relay module 106B as the audio output instructions. There may be one, or more than one safe trimming portion, for each arrangement of song segments of an original musical recording 110. The duration and/or number of the safe trimming portions may vary between different arrangements of song segments for a same original musical recording 110. The duration and/or number of safe trimming portions may also vary between different arrangements of song segments of original musical recordings 110. In some exemplary embodiments, the safe trimming portions may correspond to the intro and outro portions of the selected edited song recording.

In some embodiments, when the average time value is less than the play duration of the arrangement of song segments selected by the media output manager 106A to form the edited song recording, then the media output manager 106A may include instructions to trim a portion of the play duration of the arrangement of song segments (e.g. by not including in the edited song recording some of the song segments) to the extent necessary to match the average time value. For instance, the media output manager 106A may transmit instructions (e.g. via the instruction relay module 106B) to skip certain first song segments in the arrangement of song segments (e.g. starting with song segment corresponding to the 2 second time marker in the arrangement of song segments, and not the time marker at 0 seconds), the time of the skipped song segments corresponding to the difference between the original play duration of the arrangement of song segments and the average time value. In this example, the designated time for starting the arrangement of song segments is to fall within the safe trimming portion (e.g. in the case when the safe trimming portion corresponds to the intro of the selected edited song recording or is a designated portion at the beginning of the arrangement of song segments). In another example, the selected arrangement of song segments may end prematurely, skipping at least one segment towards the end of the arrangement of song segments, in order for the play duration of the edited song recording to match the average time value, as long as the ending falls within the safe trimming portion (e.g. in the case when the safe trimming portion corresponds to the outro of the arrangement of song segments). In other examples, in order for the play duration of the edited song recording to equal the average time value, the edited song recording may both start at a designated time within the intro safe trimming portion of the arrangement of song segments and end prematurely within the outro safe trimming portion of the arrangement of song segments.

The trimming of the play duration of the arrangement of song segments may be repeated for each song title 112 selected by the user and may apply to arrangements of song recordings corresponding to a song title 112 with a time value that has not been preselected by the user and with a time value that has been selected by a user. When calculating the trimming of each arrangement of song recordings, the media output manager 106A may consider the time marker of the optimal point to end the workout of the arrangement of song segments for the last song title 112 to be played in the selection of song titles 114b. The optimal point to end the workout may be stored in the song edit data 101 for the edited song recording to be played last in the stream of workout music 111, the identification in memory of the song edit data 101 corresponding to the optimal point to end a workout provided by accessing the song edit metadata of the song edit data 101 corresponding to the arrangement of song segments for constituting the edited song recording to be lastly played in the stream of workout music 111. The media output manager 106A may transmit audio output instructions via the instruction relay model 106B to play the portion of the last edited song recording following the optimal point to end the workout after the core workout portion (e.g. the cooldown portion of the workout), by, for example, adding the time of the portion of the edited song recording following the optimal point to end a workout to the cooldown portion of the workout, and to the total time of the workout. The media output manager 106A may also select song edit data 101 to create an edited song recording with a longer length to account for the loss resulting from applying the time marker for the optimal point to end the workout, and in order to match and equal the user's selected workout time for the core portion of the workout. For instance, if the optimal point to end a workout marker ends an edited song recording 10 seconds prematurely, then the edited song recording for arrangement selected by the media output manager 106A may take into account the 10 seconds following the optimal point to end the workout and add this time to the cooldown portion of the workout. In some embodiments, when trimming the arrangement of song segments so as to fit the length of all of the edited song recordings corresponding to the selection of song titles 114b into the total workout time, the trimming may be done to both the arrangement of song titles corresponding to song titles with a time that has been pre-selected by a user and with a time that has not been pre-selected by a user.

Once the adjustment of the arrangements of song segments is complete, the media output manager 106A then compares the non-final total workout music time value with the total time of the workout selected by the user. If both values are equal, the media output manager 106A may then proceed with sending the information to the instruction relay module 106B for relaying the audio output instructions to the media output generator 120 for generating the audio data stream corresponding to the stream of workout music 111. If both values do not equal, then the media output manager 106A may further adjust the arrangement of song segments for producing the edited song recordings as described herein.

The media output manager 106A may be unable to assemble edited song recordings corresponding to the selection of song titles 112 with a total time value that matches the input time value of the workout time 114a because, for example, the selected workout time may be too long or too short with regard to the number of song titles 112 (and the lengths of their possible edited song recordings). In these cases, the workout music playback device 100 may either notify the user to add or remove song titles 112 from the user's selection of song titles 112, or to increase or decrease the input time value of the workout time value 114a at step 406. For example, the total time value of the shortest available edited song recording for a given original musical recording 110 for a selected song title 112, following trimming of the safe trimming portions of each of its arrangements of song segments, may still be greater than the input time value of the workout time 114a. In this example, the workout music playback device 100 may notify the user to either increase the input time value of the workout time 114*a*, or remove song titles 112 from the user's selection of song titles 114*b*. In another example, the total time value of all of the longest edited song recordings for an original musical recording 110 for a selected set of song titles 112, without trimming any of the safe trimming portions of each of the edited song recordings, may still be less than the input time value of the workout time 114*a*. In this example, the workout music playback device 100 may notify the user to either decrease the input time value of the workout time 114*a*, or add song titles 112 from the user's selection of song titles 114*b*. In these examples, the user may have to alter the user's selection 114*b* of song titles 112, or the time value of the workout time 114*a* before reinitiating the creation of the stream of workout music 111.

The method for arranging song segments described herein permits the lengthening or shortening of an original musical recording 110 without altering the beats per minute or the speed of the original musical recording 110.

The media output manager 106A may also provide information on the equalization parameters for the song segments in the arrangements of song segments, the change in equalization over time corresponding to the equalization parameters for each selected arrangement of song segments. The exercise burn rate pattern 113 may also vary as a function of the workout style 114*c* selected by the user.

The media output manager 106A retrieves from the workout music playback device's memory 125 the song edit data 101 corresponding to the arrangement of song segments to form the edited song recording with the desired play duration for a given song title 112. This may be done by first identifying the master song edit metadata corresponding to song title 112 selected by the user by comparing, for instance, a string of characters of the song title with the identifier for the arrangements of song segments of the corresponding original musical recording 110 found in its master song edit metadata. Once the master song edit metadata has been identified, the corresponding song edit metadata for the selected arrangement of song segments with the desired play duration may be retrieved and analyzed. The song edit data corresponding to the selected workout style 114*c* or burn time may be further identified by, for example, comparing the characters of the name of the selected workout style 114*c* or burn time with that of the identifier in the song edit metadata portion for each workout style or burn time. Once the song edit data portion corresponding to the selected workout style 114*c* or burn time has been identified, the media output manager 106A may retrieve the song edit data 101 corresponding to the exercise burn rate pattern 113, such as the given burn rate intervals and time markers indicating a shift in the burn rate for the given workout style, and the equalization parameters as a function of play duration, the time markers of the arrangement of song segments identifying a change in the equalization of the arrangement of song segments and data to generate a visual representation of the change in burn rate as a function of time (and in some cases to generate a visual representation of the equalization parameters and volume as a function of time). The media output manager 106A may then transmit to the instruction output relay 106B, along with the song title 112 and the time markers for generating the arrangement of song segments for each of the song titles 112 in the selection of song titles, the corresponding equalization parameters and time markers indicating a change in the equalization parameters, and the burn rate (e.g. low, medium or high burn rate) over time for generating the exercise burn rate pattern 113.

Figure 2:
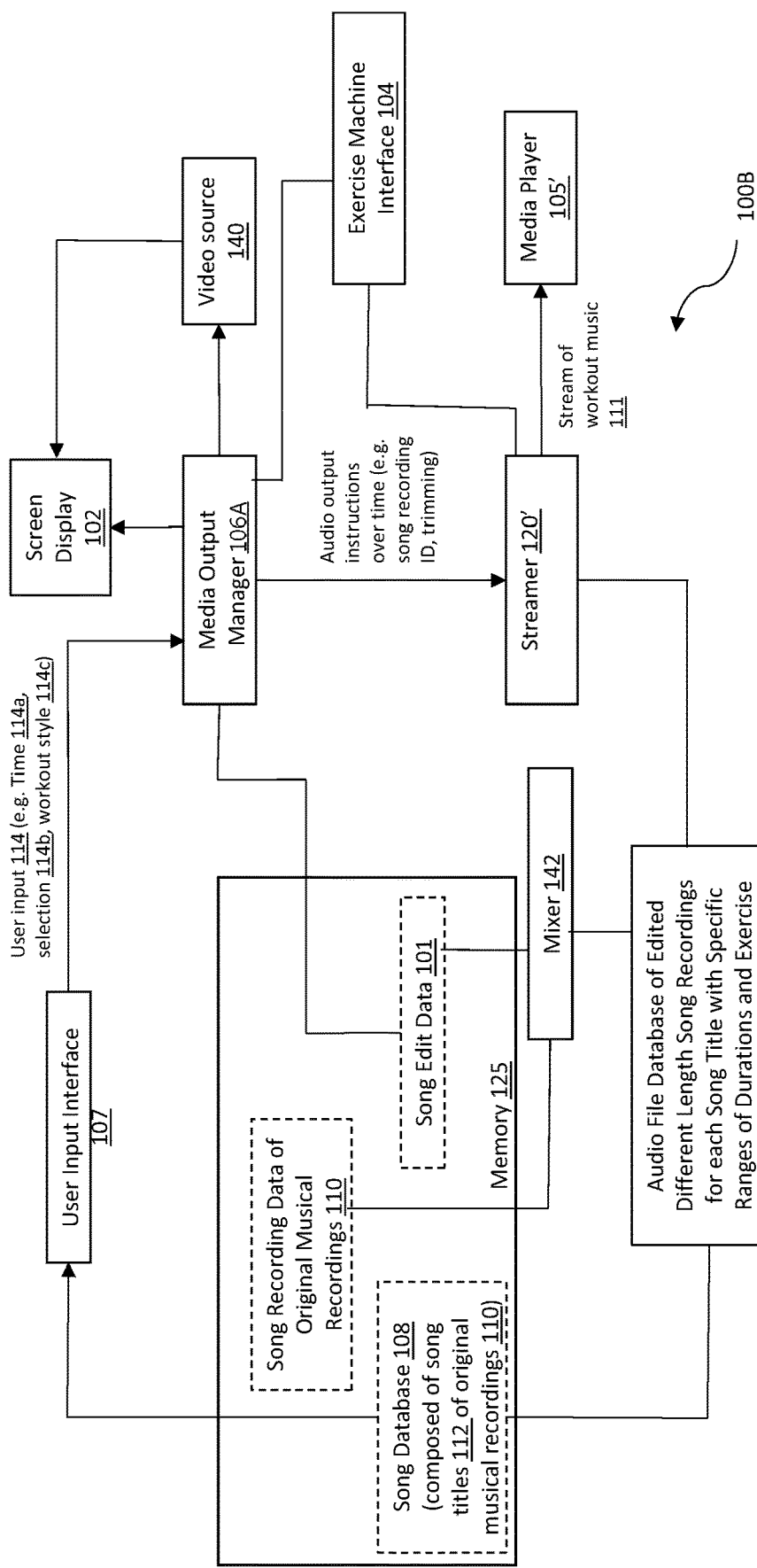
FIG. 2 is a modular diagram of another exemplary workout music playback device with an audio file database of edited song recordings with specific ranges of durations and exercise burn rate patterns for each song title.

Workout Music Playback Device 100B:

Reference is now made to FIG. 2 providing an exemplary workout music playback device 100B. The workout music playback device 100B has a memory 125 for storing a song database 108 listing song titles 112 of original musical recordings 110 having also song edit data 101 that has been generated for these original musical recordings 110. The memory 125 also stores song recording data of the original musical recordings 110 and song edit data 101 corresponding to the original musical recordings 110.

The workout music playback device 100B has a mixer 142, an audio file database of remixed edited song recordings for each song title with specific ranges of durations and exercise burn rate patterns 141, a user input interface 107', a media output manager 106A, a streamer 120', an exercise machine interface 104 and a media player 105'.

The mixer 142 may use the song recording data stored in memory 125 to generate different length edited song recordings corresponding to the original musical recordings 110, as a function of song edit data 101. The mixer 142 may retrieve from song edit data 101 with respect to a given original song recording 110 information on an arrangement of song segments and equalization parameters for generating edited song recordings. The mixer 142 may then assemble an edited song recording (corresponding to the arrangement of song segments) from the song recording data of the original musical recordings 110 in accordance with information on producing the arrangement of song segments retrieved from the song edit data 110. The mixer 142 may generate a series of different length edited song recordings for a given original musical recording 110, where each of the edited song recordings corresponds to a different arrangement of song segments, the arrangement of song segments generated as a function of arrangement information stored in the song edit data 101. For a given arrangement of song segments, the mixer 142 may produce a plurality of edited song recordings, where each of these edited song recordings is composed of the same song segments while possessing different equalization parameters from the other edited song recordings. The differences between the edited song recordings with a same arrangement of song segments are with respect to their equalization parameters and their exercise burn rate patterns. The different equalization parameters (and corresponding time markers) may correspond to the different workout styles 114*c* or burn times that a user may select for a given song title 112, where each of the workout styles 114*c* or burn times may yield a different exercise burn rate pattern 113.

The edited song recordings, including the edited song recordings with different equalization parameters, may be stored as memory in an audio file database of edited song recordings for each song title with specific ranges of durations and exercise burn rate patterns 141. The audio file database 141 may be separate from the workout music playback device 100, and may be accessed remotely via a wireless connection (e.g. Bluetooth, WiFi). The audio file database of remixed different length song recordings for each song title with specific ranges of durations, equalization parameters and exercise burn rate patterns 141 may also be accessed via a wired connection by the workout music playback device 100.

Once the media output manager 106A receives the input 114 from the user input interface 107', the media output manager 106A may provide audio output instructions to the streamer 120'. While processing the user input 114, the media output manager 106A may access the song edit data 101 to identify which edited song recordings may be retrieved from the audio file database of edited different length song recordings for each song title with specific ranges of durations and exercise burn rate patterns 141, as the different length edited song recordings stored in the audio file database 141 correspond to the song edit data 101 as edited song recordings are generated in accordance with the song edit data 101. The media output manager 106A may retrieve from the song edit data 101 the identifier of the edited song recording to be retrieved by the streamer 120' from the audio file database 141, as a function of the song title 112, workout style 114 or burn time, and time selected by the user. The media output manager 106A may also determine if any trimming of the selected edited song recording is necessary, depending on the base play duration of the edited song recording to be selected and the time in the workout to be associated with the edited song recording as a function of the user input 114. The trimming may be sent with the audio output instructions to the streamer 120', such as, for instance, instructing the streamer 120' to retrieve from the audio file database 141 a specific edited song recording corresponding to a song title 112, but to skip a certain number of seconds at the beginning of the edited song recording. The audio output instructions may also include other instructions, such as the optimal time to end a workout for a given edited song recording to be played at the end of the core portion of a workout.

The streamer 120' then receives the audio output instructions from the media output manager 106A and retrieves the audio file corresponding to the specific edited song recording (by analyzing, for instance, metadata, to identify the correct audio file in memory corresponding to the desired different length edited song recording) to be played and applies, if necessary, the trimming parameters by skipping a portion of the beginning or end of the edited song recording. The streamer 120' then transmits the audio data of the stream of workout music 111 (corresponding to the retrieved edited song recordings), in for example, a compressed digital format, to the media player 105'. In alternative embodiments, the audio data of the stream of workout music 111 may be converted by the streamer 120' into an analog audio format.

The media player 105' may be part of the workout music playback device 100B or may be separate from the workout music playback device 100B (e.g. part of the workout machine), receiving the audio file of the stream of workout music 111 remotely, where the connection between the media player 105' and the workout music playback device 100B may be a wireless connection. The media player 105' receives the audio file of the stream of workout music 111, in for instance, a compressed digital format. The media player 105' may decompress the digital audio data of the stream of workout music 111 using a codec (having, e.g. a processor), may convert the digital audio into an analog format, and play the workout music. The media player 105' may be, for example, a pair of digital headphones, receiving digital audio data wirelessly (such as via Bluetooth) from the workout music playback device 100B, such as when the streamer 120' transmits the digital audio corresponding to the stream of workout music 111 to a wireless interface that is wirelessly connected to, for example, the digital headphones, transmitting the digital audio data wirelessly to the digital headphones (e.g. via a Bluetooth connection).

In some embodiments of the workout music playback device 100B, the mixer 142 may be connected to the media output manager 106A and to the streamer 120'. The media output manager 106A may send the mixer 142 audio output instructions including a sequence of different length song recording identifications and, for instance, instructions on trimming certain portions of the edited song recordings and instructions on an optimal time to end a workout. The mixer 142 may process the audio output instructions, retrieve using the edited song recording identifications the corresponding song recording data for each of the edited song recordings in the audio file database 141, assemble the song recording data of the edited song recordings and apply the trimming and optimal point to end a workout instructions when necessary to the song recording data. The mixer 142 may then assemble as a single audio file a mix corresponding to the audio output instructions, containing the audio data for the sequence of edited song recordings in accordance with the audio output instructions. In this example, the streamer 120' may receive the stream of audio data of the single audio file created by the mixer 142 corresponding to the audio output instructions, and transmit the corresponding stream of workout music 111 to the media player 105'.

In some examples, the input user interface 107' may be either part of a hand held music player, or be a webpage accessible via a server on a computing device, a display on an exercise machine or an input device on an exercise machine.

Workout Music Interface:

FIG. 14 is an illustration of an exemplary workout user interface 500 of an exemplary workout music playback device 100. In some examples, the screen display 102 of the workout music playback device 100 may switch the graphical display from the user input interface 107 to the workout user interface 500 when the user selects an option corresponding to the beginning of the workout (e.g. a "begin workout" button 326).

The workout user interface 500 may have a workout name display 520, showing the name of the workout configuration 103. When the workout configuration 103 is saved in memory, the workout name display 520 may retrieve the file name of the workout stored in the metadata for the saved file corresponding to the workout configuration 103 and display the file name. The core portion display 514 may display the stage of the workout, i.e. which core portion of the workout is being currently completed (e.g. warm up, main workout or cooldown). This information may be determined from the workout configuration 103 (indicating the time per core portion of the workout) and the current time transmitted by the media output generator 120 corresponding to the time lapse of the workout.

The workout user interface 500 may also have a song number indicator 501, indicating the current number of the song title 112 being played out of the total number of song titles 112 selected for a core portion of the workout. In some examples, the song number indicator 501 may also display the current number of the song title 112 being played out of the total number of song titles 112 selected for the entire workout. In some examples, the number of song titles 112 for a core portion of the workout or for the total workout may be calculated from the workout configuration 103, where each slot row 305 (or slots rows 322 and 323) may increase a counter by "1" for each slot row 305. In some examples, the current number of the song title 112 being played may be calculated by having a counter set at "1" at the beginning of the workout, or of a core portion of the workout. For each subsequent song title 112 that is played in the stream of workout music 111, the counter for the current number of the song title 112 being played may be increased by "1", yield the new and current song title number for the given song title 112.

The workout user interface 500 may also display a song time remaining indicator 502, indicating the play duration remaining for a particular song title 112 currently being played. In alternative embodiments, the song time remaining indicator 502 may instead show the time of the current song title 112 that has been played. The song time remaining indicator 502 may, in some examples, show the time of the current song title 112 that has been played, and how much time remains to be played for the given song title 112. In some examples, the duration time of the song title 112 may be retrieved from the workout configuration 103, providing information on the play duration for a given selected arrangement of song segments for a selected song title 112. The workout music playback device 100 may also have a chronometer function, calculating the lapse of time since the beginning of the play of the current song title 112 to output the remaining play duration for the current song title 112.

The workout user interface 500 may also have song title 112 information display 515, displaying, for instance, the artist's name and the song title name of the song recording currently being played. This information may be retrieved from the workout configuration 103.

The workout user interface 500 may also have a workout style display 503, displaying the name of the current workout style 114c or the current burn time of the workout. In some embodiments, the information regarding the current workout style 114c and/or the current burn time may be retrieved from the workout configuration 103, the workout style 114c and/or burn time identification information corresponding to each portion of the workout, or as a function of the song title 112 or the time lapse of the workout, being stored in workout configuration 103 information, retrieved by the media output manager 106A.

The workout user interface 500 may also display the current interval number and the total number of intervals in the current workout style 114c or current burn time in an interval number display 504. Some workout styles 114c or burn times may have a fixed number of exercise intervals, corresponding to a repeated sequence of burn rates. This information may be originally stored in the song edit data 101 for each arrangement of song segments, such as the portion of the song edit data 101 corresponding to information on the different possible workout styles or burn times. The interval information may be as a function of the exercise burn rate pattern 113 for each workout style or burn time. The total number of intervals and the beginning and end of the different burn rate intervals in the exercise burn rate pattern 113 for the workout style and burn times may also be stored in the song edit data 101 corresponding to the different workout styles and burn times. The current number of the interval for a given workout style or burn time may be calculated as a function of the saved time markers for the beginning and start of the intervals as a function of the exercise burn rate pattern 113 and the total number of intervals, as a function of the number of interval burn rate levels in the current song title 113 associated to the workout style 114c or burn time. The workout user interface 500 may also display the current burn rate on a burn rate display 505. The burn rate display information may be retrieved from the exercise burn rate pattern 113 information stored with the song edit data 101 or the workout configuration 103. The workout music display 500 may also have an interval countdown timer 506, showing the amount of time left for the current interval in a number of intervals of an exercise burn rate pattern 113 associated with the workout style 114c and/or burn time. The information may be saved and retrieved from the workout configuration 103 as part of the exercise burn rate pattern 113, which may include time markers for the beginning and finish of each interval in the exercise burn rate pattern 113.

The workout user interface 500 may also have a countdown window 507. The countdown window 507 may indicate, for example, the time remaining in the workout, or of a core portion of the workout. The workout music playback device 100 may retrieve from, for example, the workout configuration 103, information relating to the time for a core portion of the workout or the total time of the workout. The music playback device 100 may then subtract from the time for a core portion of the workout or the total time of the workout the time lapsed for the workout or the time lapsed for the core portion of the workout, such as calculated from a chronometer function, in order to arrive at the time remaining for the total workout or the time remaining for a current core portion of the workout, displayed in the countdown window 507. In alternative embodiments, the countdown window 507 may display the time lapsed of the workout or the time lapsed since the start of a core portion of the workout. In other embodiments, the countdown window 507 may display the time remaining for the workout and/or the core portion of the workout, as well as the time lapsed since the start for the workout and/or the core portion of the workout.

The workout user interface 500 may have a trainer display window 521 on, for example, a screen display 102, for showing the streamed video of the trainer when the user selects a video trainer amongst the trainer options 308. The trainer display window 521 may receive the video data from the video source 140, such as a stream of video segment data, and play the video segment data as a function of instructions received from the media output manager 106A and/or the video source 140. In some embodiments, when the trainer for a song title is set of 'Off' or the user has selected an audio-based trainer (e.g. no video), and the original musical recording is a music video, the video of the music video may be displayed on screen display 102 and/or in the trainer display window 521.

The workout user interface 500 may also have an exercise burn rate pattern visualization window 508, displaying the exercise burn rate pattern 113 and the equalization parameters or relative volume as a function of the progress of the exercise burn rate pattern 113 (e.g. the change in burn rates over time). The exercise burn rate pattern visualization window 508 may also display the current point in the exercise burn rate pattern 113 at which the user has reached in the progress of the workout with progress indicator 509. The exercise burn rate pattern 113 may be retrieved from the workout configuration 103. The visualization of the exercise burn rate pattern 113 may be generated as a function of the stored equalization parameters of the exercise burn rate pattern 113 and the information on the burn rates stored as information on the exercise burn rate pattern 113. In other embodiments, the exercise burn rate pattern 113 information, stored in the workout configuration 103, may contain information for generating a visualization of the exercise burn rate pattern 113, such as a pre-generated image file of a visual representation of exercise burn rate pattern 113, which may be retrieved by the workout music playback device 100 and displayed in exercise burn rate visualization window 508. The progress indicator 509 may be generated with a chronometer timing the beginning of the current portion of the workout corresponding to the workout style 114c with the current exercise burn rate pattern 113, the progress indicator 509 displacing across the visual representation of the exercise burn rate pattern 113 as a function of the time calculated by the chronometer. The chronometer may be set back to "0" sec at the end of the current portion of the workout associated to a given workout style 114c, the time for the current portion of the workout associated to a given workout style 114c stored, for instance, as information in the workout configuration 103.

In some embodiments where the workout music playback device 100 may receive and process audio instructions provided by the user, the workout user interface 500 may have an audio song swap feature 517. The user may provide audio instructions, such as a song title 112 name while, for instance pressing (or not pressing) a button on the workout user interface 500, for changing the song title 112 currently being played with the song title 112 corresponding to the audio instructions provided by the user. The workout music playback device 100 may process the audio instructions and convert the audio instructions to commands that may be processed by the workout music playback device 100. The commands, information regarding the song title 112 selected by the user, may then be compared with the identifiers for the song titles 112 present in the current sequence of song titles 112 as selected by the user for the workout, and the media output manager 106A, via the instruction relay module 106B, may transmit audio output instructions to stop playing the current song title 112 and begin playing the song recording corresponding to the song title 112 matching the command provided by the user. The media output manager 106A, along with the user input to change the song title 112 received, may also receive from the instruction relay module 106B (originating from the media output generator 120) information on the current play time of the edited song recording that is being swapped. The media output manager 106A may then retrieve song edit data 101 of the arrangement of song segments for creating the edited song recording to be swapped in, where in some examples the workout style 114c between the swapped out and swapped in edited song recordings remain the same. In accordance with the current time information received from the media output generator 120, the media output manager 106A, via the instruction relay module 106B, may also provide audio output instructions to play the song segment corresponding to the time in the arrangement of song segments so that the newly selected edited song recording begins to play at a given point so that no additional time is added to the total workout time (e.g. at the same relative position where the edited song recording that has been swapped out stopped playing). Trimming of the new arrangement of song segments that has been swapped in may also be applied if necessary to match the play duration of the swapped in edited song recording with the desired total workout time. In some examples, the burn rate of the swapped in edited song recording is the same as the burn rate of the swapped out edited song recording. In some embodiments, the workout configuration received by the media output manager 106A may be altered as a function of the received swap instructions, so as to replace the song title 112 being played (and part of the former workout configuration) with the newly selected song title 112 made by the user, where the changes are stored, for instance, as information in the workout configuration 103.

If no song titles 112 in the sequence of song titles 112 for the workout match that provided in the user's command, the workout music playback device may prompt the user to provide new user input in the form of audio instructions regarding the user's choice of a song title 112 to be played.

The workout user interface 500 may also have a song swap button 513 providing a random song title 112 shuffle feature. The song swap button 513 may result, once selected, to randomly select a song title 112 to be played from the selection of song titles 114b made by the user instead of the currently played song title 112. Once the media output manager 106A receives the user input to swap a song, the media output manager 106A may use a random number generator, as is known in the art, where the random number generator may output a fixed set of numbers, each of these number associated to a song title of the selection of the song title 114b. The media output manager 106A may then retrieve the song edit data 101 for the song title 112 corresponding to the number randomly generated by the random number generator. The media output manager 106A, via the instruction relay module 106B, may provide audio output instructions to stop playing the current song title 112 and play the edited song recording from the arrangement of song segments (information on the arrangement of song segments retrieved from the song edit data 101 of the song title 112 corresponding to the randomly generated number) of the song title 112 corresponding to the randomly generated number, starting with the song segment in the arrangement of song segments with a remaining play time that may correspond to that of the song title 112 that is being shuffled out, so as not to add any extra time to the total workout time. The play time of the song title 112 that is being shuffled out may be obtained from the current time information received from the instruction relay module 106B, generated from the media output generator 120. In some examples, the burn rate of the shuffled in edited song recording is the same as the burn rate of the shuffled out edited song recording. In some embodiments, the workout configuration 103 received by the media output manager 106A may be altered as a function of the received shuffle instructions, so as to replace the song title 112 being played (and part of the former workout configuration) with the newly selected song title 112 made by the shuffle option.

In alternative embodiments, selecting the song swap button 513 may randomly generate a new complete sequence of the song titles 112 by rearranging the song titles 112 selected by the user for a given workout. In these embodiments, the stream of workout music 111 will no longer follow the order of song titles 112 as provided by the user as user input 114 when using the user input interface 107, instead shuffling and generating a new sequence of song titles 112 randomly generated. For example, the random sequence of song titles 112 may be provided by using a random number generator, as is known in the art, processed by the workout music playback device 100, where the random number generator may output a fixed set of numbers, where the number of numbers in the fixed set of numbers corresponds to the number of song titles 112 in the sequence of song titles 112 selected by the user for the workout. The sequence of numbers generated by the random number generator may correspond to the new sequence of song titles 112 when using the song swap option 513, where each number is associated to a song title 112. Deactivating the random shuffle song title 112 feature by, for instance, selecting the song swap option 513, would return the stream of workout music 111 to the original sequence, as selected by the user and which may be saved as part of the workout configuration 103 for the given workout. The media output manager 106A, via the instruction relay module 106B, may transmit audio output instructions to the media output generator 120 to play the edited song recording corresponding to the song title 112 and the required play time, where the first song segment of the arrangement of song segments played as the edited song recording may be based on the current time lapse of the workout if the song swap button 513 and the random shuffle song title 112 feature was not selected by the user (e.g. not altering the total workout duration).

The workout user interface 500 may also have a play/pause feature 510. Selecting the play/pause feature 510, such as be pressing the button on the screen display 102, may play a previously paused workout, or may pause a workout that was, since the selection of the play/pause feature 510, was playing. In some examples, once the workout music playback device 100 generates the workout configuration 103 and the workout is ready to begin, the workout may not begin until the user selects the play/pause feature 510, starting the workout (the media output manager 106A and the instruction relay module 106B transmitting audio output instructions to the media output generator 120 to start generating the first song segments in the stream of workout music 111).

The workout user interface 500 may also have a song title skip feature 511, allowing the user to either skip to the next song title 112 in the sequence of song titles 112 as provided in the workout configuration 103 by selecting the appropriate feature (e.g. button) of the song title skip feature 511. The song title skip feature 511 may also allow the user to play the previous song title 112 in the sequence of song titles 112 by selecting the appropriate feature (e.g. button) of the song title skip feature 511. In the alternative embodiments where the user has selected the random shuffle song title 112 feature by using the song swap feature 513, then the workout music playback device may, for example, play the next song title 112 in the randomly generated list of song titles 112 generated when selecting the song swap feature 513 or the previous song title 112 played before the currently played song title 112 in the randomly generated list of song titles 112.

The workout user interface 500 may also have a master volume feature 512, allowing the user to increase or decrease the volume of the currently played edited song recording with a given song title 112, where the new volume input is sent to the media output manager 106A, and may update in the workout configuration 103 processed by the media output manager 106A the volume for that given song title 112. In alternative embodiments, the master volume feature 512 may allow the user to increase or decrease the volume for the entire stream of workout music 111, where selecting the master volume feature 512 may increase or decrease the volume of the stream of workout music 111 in accordance with the user's input, by adjusting the equalization parameters of the stream of workout music 111.

In some embodiments, once a user has adjusted the volume of a song title 112 using, for example, the master volume feature 512, the updated volume feature may be saved in memory by the media output manager 106A as part of the workout configuration 103 for a given workout. When the workout configuration 103 is retrieved from memory, e.g. when the user wants to start a workout corresponding to the workout configuration (e.g. the user selecting a file name corresponding to the workout configuration 103, the parameters of the workout configuration 103 set for the given workout), the workout configuration 103 is uploaded, including the volume parameters of the song title(s) 112 that were adjusted by the user during the previous workout.

Figure 12:
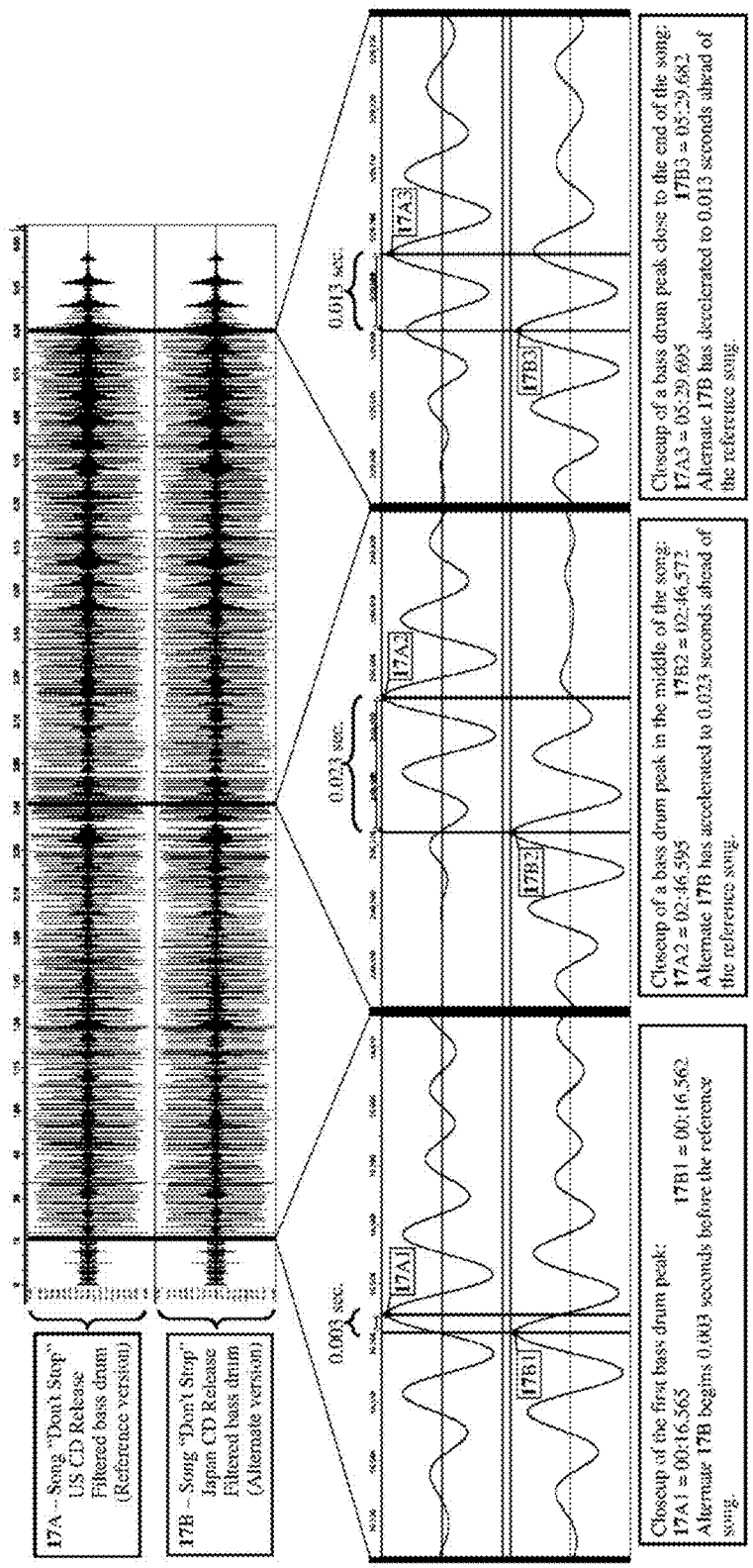
FIG. 12 is a visual representation of two respective sound waves of two exemplary original musical recordings corresponding to a same song title, where one original musical recording possesses playback differences with the other original musical recording.

Reference will now be made to FIG. 12, illustrating an original musical recording 110 correction feature 1200 of an exemplary workout music playback device 100. The original musical recording 110 correction feature 1200 allows the workout music playback device 100 to correct the differences between, for instance, two original musical recordings 110 corresponding to a same song title 112. For example, the original musical recording 110 for a same song title 112 made by one record label may be of a slightly different playback than that from a different record label. As another example, there may be two versions or two releases of an original musical recording 110, each version of release corresponding to a release in a different part of the world. Each version of the original musical recording 110 may have slightly different properties from the other, such as playback differences. For example, the original musical recording 110 for a first release may start X seconds earlier than the original musical recording 110 for the second release. For instance, FIG. 12 shows two different releases 17A and 17B of an original musical recording with certain playback differences. For instance, at a first bass drum peak, the release 17B is 0.003 seconds ahead of release 17A. At a second bass peak near the middle, the release 17B is 0.023 seconds ahead of the release 17B. At another bass peak close to the end of each of the releases, release 17B is 0.013 seconds ahead of the release 17A.

This correction feature may be useful when the song edit data 101 for a given original musical recording 110 has been produced using one version of the original musical recording 110, but the user has, in the user's personal library, a second version of the original musical recording 110 (where the song recording data of this second version of the original musical recording 110 is used by the workout music playback device 100 to generate the edited song recordings). The workout music playback device 100 may then take into account the differences between the two versions so that the arrangement of song segments yield the intended edited song recording based on the song edit data produced from the first version of the original musical recording 110. The workout music playback device 100 may analyze the audio pattern at a given audio frequency of the first version of the original musical recording 110. The song edit data 101 or master song edit metadata may store a copy of the peak points from the first version of the original musical recording 110 that has already been analyzed for the workout music playback device 100. When the user selects the user's copy of the original musical recording 110 to be played (e.g. corresponding to the second version of the original musical recording 110), the workout music playback device 100 runs a peak analysis on the user's copy of the original musical recording 110 and the workout music playback device 100 then automatically compensates for any difference between the two versions by comparing the peak data from the first version with that of the second version that is to be used by the workout music playback device 100.

Means of Use:

In some embodiments, the workout music playback feature may be provided as an annual subscription, where a user pays an annual fee for the use of the workout music playback service as described herein. In other examples, the user may pay a fee per original musical recording 110 processed as part of the workout music playback service, where, for example, the original musical recording 110 is processed remotely, and the processed version of the original musical recording 110 generates different length edited song recordings of the original musical recording 110 and its corresponding master song edit metadata and song edit metadata sent remotely, e.g. over a wireless or wired connection, to the user. In other examples, the song edit data 101 for original musical recordings may be prepared and sent remotely to a user.

In other examples, the user may pay a fee per stream of workout music generated. In these examples, the user may provide input corresponding to the desired workout and stream of workout music 111, for example, by using a user input interface 107, such as, for example, a graphical user interface on a computer device such as that generated by a software application, or a website page. The user may then provide the input, this input sent as information, in some examples, remotely via a wireless or wired connection to a remote service provider. The remote service provider receives the user's input and generates a workout corresponding to the input provided by the user. The remote service provider may then transmit the generated workout to the user, via, for example, a remote wired or wireless connection. The generated workout may then be played using, for example, a workout music playback application on a computer device, the computer device with the music playback application acting as the workout music playback device 100.

Figure 15:
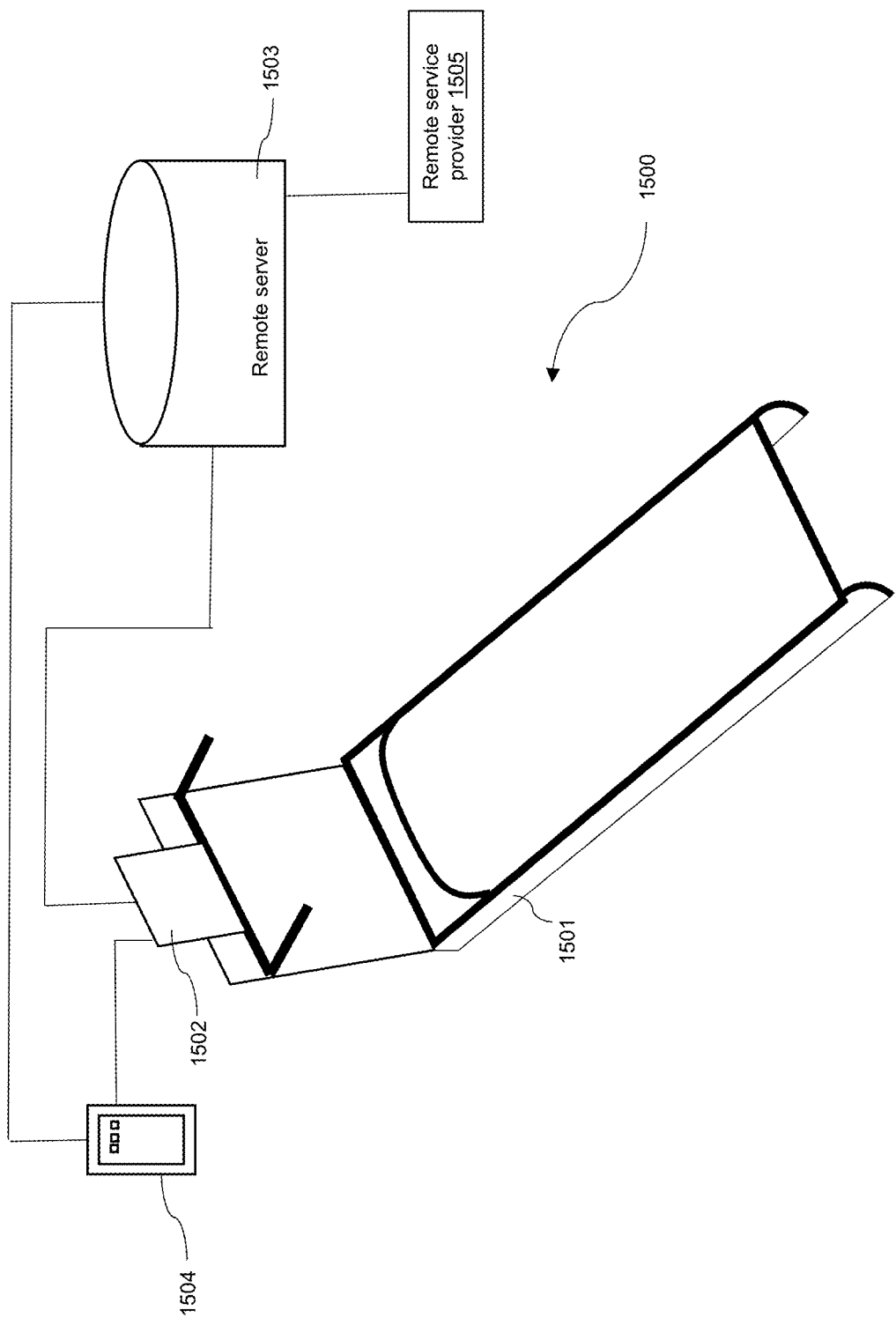
FIG. 15 is a graphical modular representation of an exemplary workout music playback system with an exemplary exercise machine.

In some examples, the workout music playback service may be adapted to an exercise machine. Reference is made to FIG. 15 illustrating an exemplary workout music playback system 1500 with an exemplary exercise machine 1501. In FIG. 15, the exemplary workout machine 1501 is illustrated as a treadmill, however, the exemplary workout machine 1501 is not limited to treadmills, and may be any exercise machine, such as, for example, a stationary bike, a rowing machine or a weights machine.

The exemplary workout machine 1501 may include a computing device 1502. The computing device 1502 may have a display, showing the user certain features of the workout and the user's metabolic statistics, such as the user's heartrate or the amount of calories burnt. The computing device 1502 may also function as the workout music playback device 100. The computing device 1502 may establish, for example, a wired or wireless connection (e.g. via Bluetooth or WiFi) with the user's portable computer 1504 (e.g. smartphone, tablet) via a wireless interface. The computing device 1502 may then be allowed to access the user's song title database found on the portable computer 1504, where each song title corresponds to an original musical recording 110. The computing device 1502 may access the song title database on the portable computer 1504, where the user may input features of the workout from the song title database found on the user's portable computer 1504. In some other examples where the workout music playback system 1500 is offered in a gym setup, the gym or exercise center may have a fixed song title database stored and accessible, for instance, on a remote server 1503 (e.g. a remote gym server), where each song title may be associated to an original musical recording 110. In some examples, the different length edited song recordings of each of the original musical recordings 110 as well as the corresponding song recording metadata, master song edit metadata and song edit metadata may be stored on the remote server 1503. The user, while using the exercise machine 1501, may access the song database found on remote server 1503 and select from the song titles 112 available on the remote server 1503, where song titles 112 may be selected, for instance, by using the visual display on the computing device 1502, such as by allowing the user to provide input in the form of pushing buttons, finger movements registered on a touch screen, or audio commands received by an audio input interface of the computing device 1502. The computing device 1502 may then prompt the user for additional user input 114, such as by using an user input interface 107 as described herein, and the computing device 1502 may generate the stream of workout music 111 as a function of the workout configuration 103 provided by the user. In some other examples, the remote server 1503 may provide the processing function of generating the stream of workout music 111 and other workout parameters in accordance with the input provided by the user while using the computing device 1502. In these examples, the remote server 1503 receives the user input from the computing device 1502 via, for instance, a wireless connection, processes the user input, acting as the media output manager as described herein, and transmits the stream of workout music 111 either as a live stream of audio data or as a complete audio file, where the computing device 1502 reads the complete audio file and plays the stream of workout music 111 corresponding to the complete audio file. In some other examples, the user input 114 may originate from the user's portable computer 1504 via, for instance, a wireless connection, processes the user input 114, and transmits a stream of workout music 111 either as a live stream of audio data or as a complete audio file to, for example, the computing device 1502 (or back to the user's portable computer 1504), where the computing device 1502 (or user's portable computer 1504) reads the complete audio file and plays the stream of workout music 111 corresponding to the complete audio file. In some embodiments, the user's portable computer 1504 may stream music from the remote server 1503, or receive an audio file (e.g. a compressed digital audio file, such as an MP3, MP4 file) from the remote server 1503 for playing on the user's portable computer 1504 or via the exercise machine's computing device 1502.

In some embodiments, the exercise burn rate pattern information may also contain information on configuring certain parameters of an exercise machine 1501, such as those tied to the difficulty of the exercise (e.g. the incline or speed of a treadmill, the resistance of a stationary bike, the resistance of a stationary rowing machine). The exercise machine 1501 may receive information via, for instance, the computing device 1502, to adjust the exercise difficulty parameters at every time marker in the exercise burn rate pattern 113 corresponding to a change in the burn rate (e.g. low, medium and high). The exercise burn rate pattern 113 information may contain information for every change in the burn rate in the exercise burn rate pattern 113 to provide instructions to configure exercise difficulty parameters of the workout machine 1501, where the configurations of the exercise difficulty parameters may be set by the user at the beginning of a workout on, for example, the user input interface. The configurations of the exercise difficulty parameters may also be input and/or stored in the computing device 1502. In some examples, the configurations of the exercise difficulty parameters may be provided by a remote service provider 1505 and/or the manufacturer of the exercise machine 1501 and/or the manufacturer of a component of the exercise machine 1501 for providing or allowing the provision of workout music playback services. In some examples, where the exercise burn rate pattern 113 does not contain specific instructions to adjust the exercise difficulty parameters of an exercise machine 1501, instead the exercise machine 1501, while receiving the exercise burn rate pattern 113 for a given portion of a workout, processes the time markers and the burn rate for given time intervals, and adjusts the exercise difficulty parameters as a function of the exercise burn rate pattern 113. In these examples, the data for providing instructions to adjust the exercise difficulty parameters as a function of the exercise burn rate pattern 113 may be stored in the exercise machine 1501, such as its computing device 1502.

The connection between the computing device 1502 and the remote server 1503 may be, in some examples, wireless, such as WiFi connection or Bluetooth connection.

In some examples, the remote server 1503 may be connected to a remote service provider 1505. The remote service provider 1505 may update, for example, the song title 112 database, the song recording data, the song recording metadata, the song edit data, master song edit metadata and song edit metadata stored in the remote server 1503. The remote service provider 1505 may also update the software application corresponding to the workout music playback service stored and/or provided by the remote server 1503, or the workout music playback device stored and/or provided by the computing device 1502, where the remote server 1503 would transmit in turn the updates to the computing device 1502 connected to the remote server 1503. In other examples, the remote service provider 1505 may communicate directly with the computing device 1502 to update the software applications corresponding to the workout music playback service.

In some embodiments, the user may access statistics pertaining to the user's workout statistics for each workout, with specific statistics relating to each song title 112 and configurations selected for that given song title, such as the workout style (and exercise burn rate pattern), burn time, volume pattern, volume effect options. The statistics may show the song titles selected for that workout, the workout style chosen and exercise burn rate pattern applied, and the user's performance for each portion of the workout corresponding to a given song title 112 as well as the overall performance of the user for that given workout. The user may also access statistics for a given song title 112, such as the performance of the user each time the song title 112 is played during a workout, as well as an average performance for all the workouts when the song title 112 has been played. These statistics may allow the user to compare the user's performance, calorie consumption, heart rate, and so forth, as a function of the input workout parameters and the song title 112 selected. For instance, the user may realize that a certain song title 112 played towards the end of the workout yields a far better performance than another song title 112. As another example, the statistics may share with the user that selecting a given song title 112 with a certain workout style leads to greater calorie consumption (e.g. as a result of exercise intensity as that particular song title 112 played) than when the user selects another song title 112 with that same workout style. Furthermore, another example is that the user may view the user's performance drop when the interval volume effect option 320 reduces the effect of the equalization parameters for a given workout style than when the equalization parameters are fully applied. These statistics may be transmitted wirelessly (or, in some cases, via a wired connection) by the exercise machine 1501 to the workout music playback device or to external memory storage, such as cloud storage, which may then be retrieved by the user via, for example, a webpage or a graphical interface of the workout music playback device, the computing device 1502 or the user's portable computer 1504. The statistics feature may be available for a gym setup, for private home exercise equipment or when using mobile devices such as a GPS receiver or biometric reading devices. For instance, in some embodiments, these statistics (or some of these statistics) may be provided by a biometric reading device (e.g. smart watch, biometric smart clothing, GPS receivers and accelerometers, etc.) via a wireless connection, to the workout music playback device or to a server.

In some examples, the user may access at the end of a workout statistics corresponding to the user's workout, such as the length of the workout, the equivalent to the vertical distance travelled (e.g. if the treadmill carpet is angled or inclined), the distance travelled, the calorie consumption, the average speed, watts generated, true torque generated. These statistics may be stored with the workout configuration 103 and accessed, for instance, from a website page requiring, for example, that user generate a user name and password, or via the workout music playback service application software stored on the user's portable computer 1504 or on computing device 1502.

In some other examples, in order for a user to use a software application stored on the user's portable computer 1504 for providing a workout music playback service as described herein, the portable computer 1504 may first establish a connection with a licensed exercise machine 1501 via, for example, the exercise machine's computing device 1502. The licensed exercise machine 1501 may have authorization hardware, where the software application for providing a workout music playback device would first require authentication from an authorized exercise machine 1501 via the exercise machine's 1501 authorization hardware, establishing for instance, a wireless or wired connection with the exercise machine 1501.

The workout music playback system 1500 may be used in a gym setup or in a home setup. In the examples where the workout music playback system 1500 is used in a home setup, the remote server 1503 is a home server. In the home setup examples (and in some gym setup examples), the computing device 1502 of the exercise machine 1501 may also directly communicate with the remote service provider 1505 (e.g. for receiving a stream of workout music or a workout music audio file; sending statistics regarding the workout; receiving software updates regarding the workout music playback system 1500; etc.) For example, the computing device 1502 may communicate directly with the remote service provider 1505 via a wired or wireless connection (e.g. WiFi connection), the computing device 1502 of the exercise machine 1501 (e.g. home purchased treadmill) having, for example, a WiFi interface. In other examples, the computing device 1502 may communicate with the remote service provider via the user's portable computer 1504. In these examples, the computing device 1502 may establish a wireless connection with the user's portable computer 1504 (e.g. a Bluetooth connection) and the user's portable computer 1504 may in turn establish a connection with the remote service provider 1505 (e.g. a WiFi connection).

Furthermore, in some examples where the workout music playback device or workout music playback service offers a trainer feature as described herein, the user may download additional trainer options that the user may select from for the workout. These trainer options may be additional trainer videos or audio segments, such as for different sports or a greater selection of trainer features in the videos or the audio segments. In some examples, the user may download the new trainer options directly from a third party server 1505 to the user's portable computer 1504, or to the computing device 1502. In some other examples, the new trainer options may be available for download via a remote server 1503. In some examples, the gym may upload its own trainer options, such as by filming some of the coaches working at that gym that may be accessible via the workout music playback service.

In some other examples, the user may stream the video trainer (or audio trainer) on the computing device 1502 or on the user's portable computer 1504 from a remote service provider 1505 or via/from a remote server 1503.

In some examples, a specific trainer selected by the user may provide its own workout configuration (e.g. pre-selecting for the user options that may be processed as user input by the workout music playback device), where the user selects a trainer from the trainer option and the workout music playback device loads a set of default workout configurations corresponding to that trainer options (workout configurations may include e.g. exercise burn rate pattern, song title selection, etc.). The user may then alter the default workout configuration settings as a function of the user's personal preferences.

Figure 17:
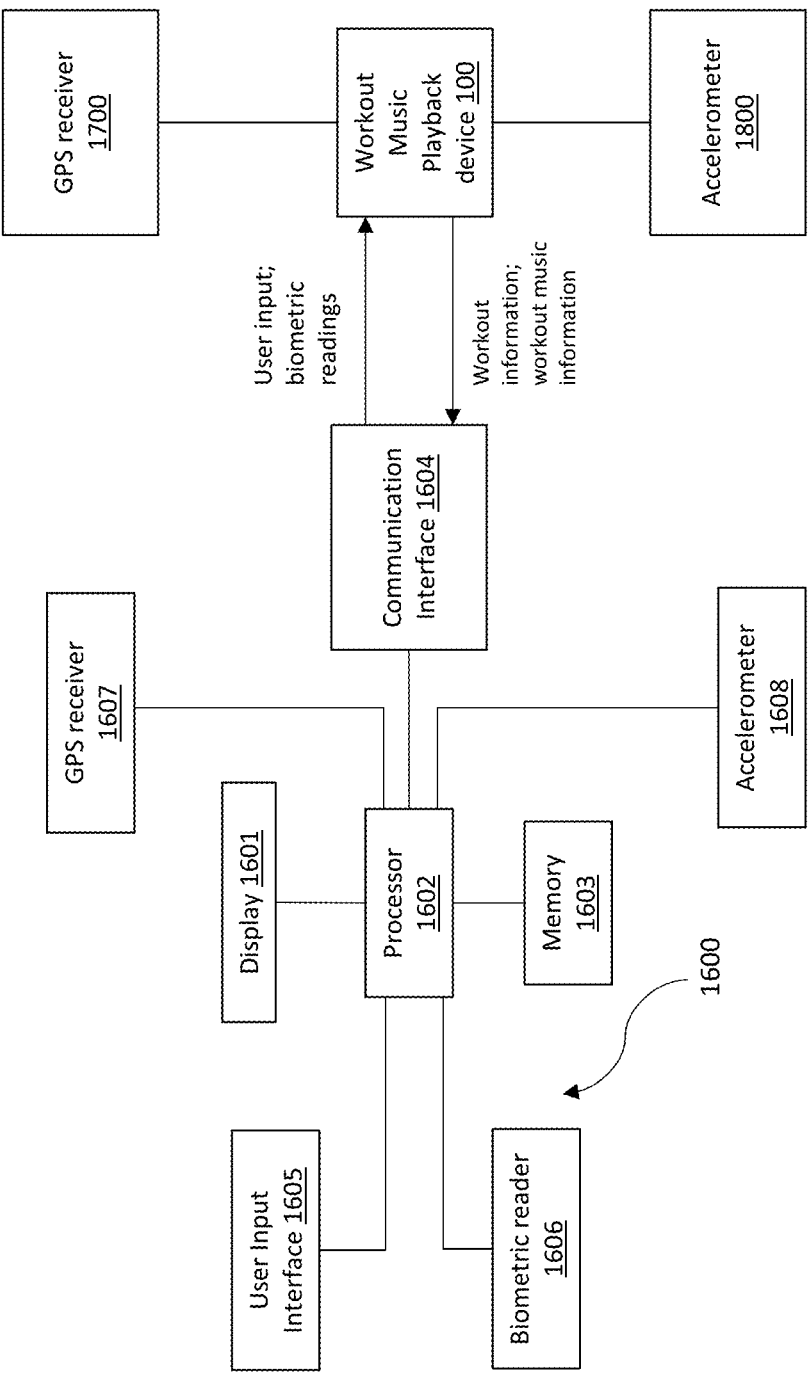
FIG. 17 is a block diagram of an exemplary biometric reading device in communication with an exemplary workout music playback device.

Reference is now made to FIG. 17, illustrating an exemplary biometric reading device 1600 in communication with an exemplary workout music playback device 100.

The biometric reading device 1600 has a processor 1602, memory 1603 and a biometric reader 1606. The biometric reading device 1600 may have a communication interface 1604. The biometric reading device 1600 may have a user input interface 1605. The biometric reading device 1600 may have a display 1601. The biometric reading device 1600 may have a GPS receiver 1607. The biometric reading device 1600 may have an accelerometer 1608.

The user input interface 1605 is adapted to receive input provided by the user. The user input interface 1605 may be and/or include buttons, a touchscreen, a microphone combined with voice processor, etc.

The biometric reader 1606 may be a hardware/software component adapted to obtain biometric measurements of a user. For instance, the biometric reader 1606 may have a heart-rate monitor, a temperature sensor, etc. The biometric reader 1606 may be adapted to take measurements of heart-rate, temperature, respiration, etc. of the user.

The display 1601 is adapted to display certain information to the user, such as the user's biometric readings, workout information, workout music information, etc.

The memory 1603 is configured to store computer-programmable instructions that are processed by the processor 1602. The memory 1603 may also store biometric readings, the workout music information, workout information, etc.

The processor 1602 may be a general-purpose programmable processor. In some examples, the processor 1602 may be a microprocessor.

The biometric reading device 1600 may have a communication interface 1604 to communicate with an external device such as, for instance, the workout music playback device 100. The communication interface 1604 may be adapted to establish a wired or wireless connection with the workout music playback device 100. In some examples, the communication interface 1604 may be a transceiver, or a transmitter and/or a receiver. The communication interface 1604 may be adapted to transmit user input (e.g. input corresponding to controlling the music playing during a workout—start the music, stop the music, change song title, increase or decrease volume, etc.) and/or biometric readings to the workout music playback device 100 via its connection with the workout music playback device 100. It will be understood that other information may be sent to the workout music playback device 100 via the biometric reading device 100 without departing from the present teachings. The communication interface 1604 may also be further configured to receive, for instance, workout information (e.g. time left in the workout; time lapsed in the workout; the current burn rate; a visual depiction of the exercise burn rate pattern; etc.) and/or workout music information (e.g. time left and/or time lapsed for the song recording that is presently playing; song title; etc.) via the connection with the workout music playback device 100 from the workout music playback device 100. In some embodiments, the communication interface 1604 may be adapted to communicate with the workout music playback device 100 (e.g. where the workout music playback device 100 may be a smartphone and, e.g., an application program running on a smartphone), communicating the biometric readings to the smartphone, that can then be transmitted, in some examples, to the application program that, in some examples, combined with the smartphone, may constitute the workout music playback device 100.

The GPS receiver 1607 is, as is known in the art, capable of receiving information from GPS satellites and then calculate its geographical position.

The accelerometer 1608 is used to measure proper acceleration, and may be adapted, for instance, to measure the number of steps taken by the user.

As shown in FIG. 17, the biometric reading device 1600 may be connected to the workout music playback device 100. The biometric reading device 1600 may provide for a user input interface 1605 that allows, in some examples, for the user to control the workout music playback device 100. In one exemplary embodiment, the biometric reading device 1600 may have at least one button for allowing the user to start and/or stop playing music generated by the workout music playback device 100. In some embodiments, the workout music playback device 100 may be controlled as a function of readings taken by the biometric reading device 1600, where, for instance, the equalization parameters (and/or the burn rate), the volume, the length of certain segments of the edited song recording, the length of the workout, the recording that is playing, starting and stopping the playing of music (indicative of the beginning or of the end the workout), etc., may be controlled as a function of input received at the biometric reading device, such as the biometric readings or user input. Examples of biometric readings may be, for example, the heart rate, respiratory rate, temperature, etc. In some examples, the biometric reading device 1600 may be an activity tracker (e.g. a FitBit® tracker), a smartwatch, biometric smart clothing, etc. In some embodiments, the biometric reading device 1600 may also have a display 1601 for displaying workout parameters (e.g. time of workout lapsed and/or remaining; workout interval style; burn rate; calories burnt since beginning of workout; the title of the edited song recording that is playing).

In some examples, the biometric reading device 1600 is connected (either wirelessly or wired) to the workout music playback device 100, where user input (e.g. button press; biometric readings) are sent via the connection to the workout music playback device 100, the workout music playback device 100 processing the input to control the workout music playback device 100. The workout music playback device 100 may also have a communication interface 1604 configured to transmit (and/or receive) information to and/or from a device (or component) such as the biometric reading device 1600 (e.g. song title of the edited song recording; time since the beginning of the workout; time left in the workout, etc.), where the information received from the workout music playback device 100 may be displayed, for instance, on the display of the biometric reading device 1600.

In some embodiments, the biometric reading device 1600 may incorporate the workout music playback device 100, where the biometric reading device 1600 provides the functionality of workout music playback device 100. In some examples where the biometric reading device 1600 incorporates the workout music playback device 100, the biometric reading device 1600 may not have a communication interface 1604.

In some examples, as shown in FIG. 17, the workout music playback device 100 may also be adapted to receive geolocation and/or time information from a global positioning system (GPS) 1700. The GPS 1700 may be, or may be part of, a remote device (e.g. a smartwatch; a smartphone). In some examples, the GPS 1700 may be a component of the workout music playback device 100. For example, the GPS readings may indicate the distance travelled by a user during the course of a workout (e.g. when the user is jogging or biking).

In some examples, as shown in FIG. 17, the workout music playback device 100 may also be adapted to receive acceleration readings from an accelerometer 1800. The accelerometer 1800 may be, or may be part of, a remote device (e.g. a smartwatch; a smartphone). In some examples, the accelerometer 1800 may be a component of the workout music playback device 100. For example, the accelerometer 1800 may provide information that may be processed to calculate the number of steps carried by a user during the course of a workout.

The description of the present invention has been presented for purposes of illustration but is not intended to be exhaustive or limited to the disclosed embodiments. Many modifications and variations will be apparent to those of ordinary skill in the art.

What is claimed is:

1. A workout music playback device for playing workout music during a workout from song recording data comprising:
   a user input interface configured to receive input from a user, and permitting the definition of a workout style corresponding to a variation in exercise intensity over the course of a workout duration, and of a selection of song titles;
   a media output manager configured to receive said user input, and to output to an instruction relay module an exercise burn rate pattern according to said workout style defining a variation over time of equalization parameters corresponding to an exercise intensity variation including periods of lower intensity exercise and periods of higher intensity exercise to be performed over the course of a workout duration;
   said instruction relay module configured to receive said exercise burn rate pattern from said media output manager and generate audio output instructions in accordance with said exercise burn rate pattern;
   a media output generator configured to receive said audio output instructions and said song recording data, and output an audio signal of said workout music from said song recording data while adjusting the equalization parameters of said audio signal of said workout music, the adjusting of the equalization parameters comprising adjusting an amplitude differently in different frequency ranges or adjusting the amplitude the same for all audio frequencies, as a function of said audio output instructions over the course of said workout duration, and
   GPS interface that is adapted to receive geolocation information from a global positioning system, and wherein said media output manager is further configured to receive said geolocation information and adapt said exercise burn rate pattern further in accordance with said received geolocation information; or
   an accelerometer interface that is adapted to receive acceleration readings from an accelerometer, and wherein said media output manager is further configured to receive said acceleration readings and adapt said exercise burn rate pattern in accordance with said received acceleration readings.

2. The workout music playback device of claim 1, wherein said workout music playback device comprises said GPS interface that is adapted to receive geolocation information from a global positioning system, and wherein said media output manager is further configured to receive said geolocation information and adapt said exercise burn rate pattern further in accordance with said received geolocation information.

3. The workout music playback device of claim 2, wherein said workout music playback device further comprises said global positioning system.

4. The workout music playback device of claim 1, wherein said workout music playback device comprises said accelerometer interface that is adapted to receive acceleration readings from an accelerometer, and wherein said media output manager is further configured to receive said acceleration readings and adapt said exercise burn rate pattern in accordance with said received acceleration readings.

5. The workout music playback device of claim 4, wherein said workout music playback device further comprises said accelerometer.

6. A method of generating workout music during a workout from song recording data comprising:
   receiving input from a user corresponding to a workout style selection;
   outputting an exercise burn rate pattern according to said workout style defining a variation over time of equalization parameters corresponding to an exercise intensity variation including periods of lower intensity exercise and higher intensity exercise performed over the course of a workout duration;
   generating audio output instructions in accordance with said exercise burn rate pattern; and
   outputting an audio signal of workout music from said song recording data while adjusting the equalization parameters of said audio signal, the adjusting of the equalization parameters comprising adjusting an amplitude differently in different frequency ranges or adjusting the amplitude the same for all audio frequencies, as a function of said audio output instructions over the course of said workout duration.

7. The method as defined in claim 6, wherein said input is received at a user input interface of an exercise machine.

8. The method as defined in claim 6, further comprising receiving input from said user corresponding to a selection of song titles, and wherein said exercise burn rate pattern further defines said variation over time of equalization parameters as a function of song edit data specific to a song title of said selection of song titles and said workout style.

9. The method as defined in claim 8, wherein said song edit data comprises information on arranging song segments of an original musical recording into at least one edited song recording of said original musical recording, and wherein said outputting an audio signal of workout music comprises arranging song segments of said original musical recording into at least one edited song recording of said original musical recording as a function of said song edit data.

10. The method as defined in claim 9, wherein said song edit data correspond to a first version of a corresponding original musical recording and said song segments correspond to a second version of said original musical recording, further comprising correcting said audio signal generated from song segments of said second version of said original musical recording to account for differences between said first version and said second version.

11. The method as defined in claim 8, wherein said song edit data further comprises a timestamp corresponding to a corresponding original musical recording indicative of an optimal point to end a workout, and wherein said audio signal of workout music outputted for a workout portion ends at said timestamp corresponding to said original musical recording indicative of an optimal point to end a workout.

12. The method as defined in claim 11, further comprising playing the portion of said original musical recording following said timestamp indicative of an optimal point to end a workout in a cooldown portion following said workout portion.

13. The method as defined in claim 6, further comprising transmitting said audio signal to an exercise machine.

14. The method as defined in claim 6, further comprising transmitting said exercise burn rate pattern to an exercise machine for causing said exercise machine to adjust certain difficulty parameters of said exercise machine in accordance with said exercise burn rate pattern.

15. The method as defined in claim 6, further comprising receiving biometric information of said user while performing a workout, and where said adjusting of at least one of said equalization parameters and edited song recording length of said audio signal may be further adjusted as a function of said received biometric information.

16. The method as defined in claim 6, wherein said input is received at a user input interface of a biometric reading device.

17. The method as defined in claim 16, wherein said biometric reading device is an activity tracker.

18. A non-transitory computer-executable storage medium comprising:
song edit data comprising information for arranging song segments of an original musical recording into at least one edited song recording of said original musical recording, wherein a song duration of an edited song recording of said at least one edited song recording is different from a song duration of said original musical recording, said song edit data further comprising equalization parameters specific to a workout style and to an original musical recording for adjusting equalization of said song segments of an original musical recording arranged into at least one edited song recording of said original musical recording, the adjusting of the equalization parameters comprising adjusting an amplitude differently in different frequency ranges or adjusting the amplitude the same for all audio frequencies.

19. The non-transitory computer-executable storage medium as defined in claim 18, said song edit data further comprising a timestamp associated with said original musical recording indicative of an optimal point to end a workout.

* * * * *